Figure 7:
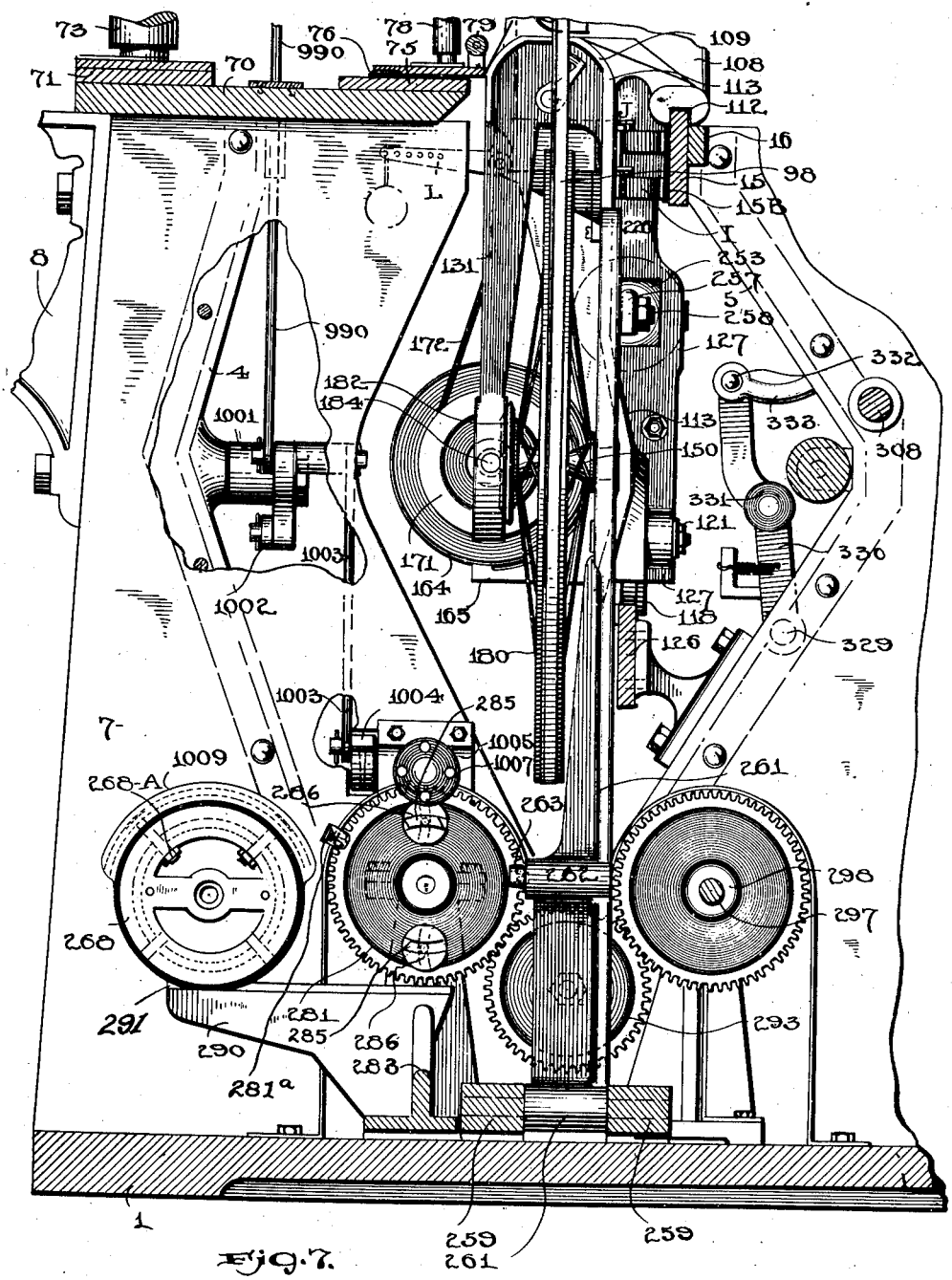

J. P. WEIS.
COMBINED CUTTING AND SEWING MACHINE.
APPLICATION FILED MAY 29, 1913.
1,114,082.
Patented Oct. 20, 1914.
33 SHEETS—SHEET 1.
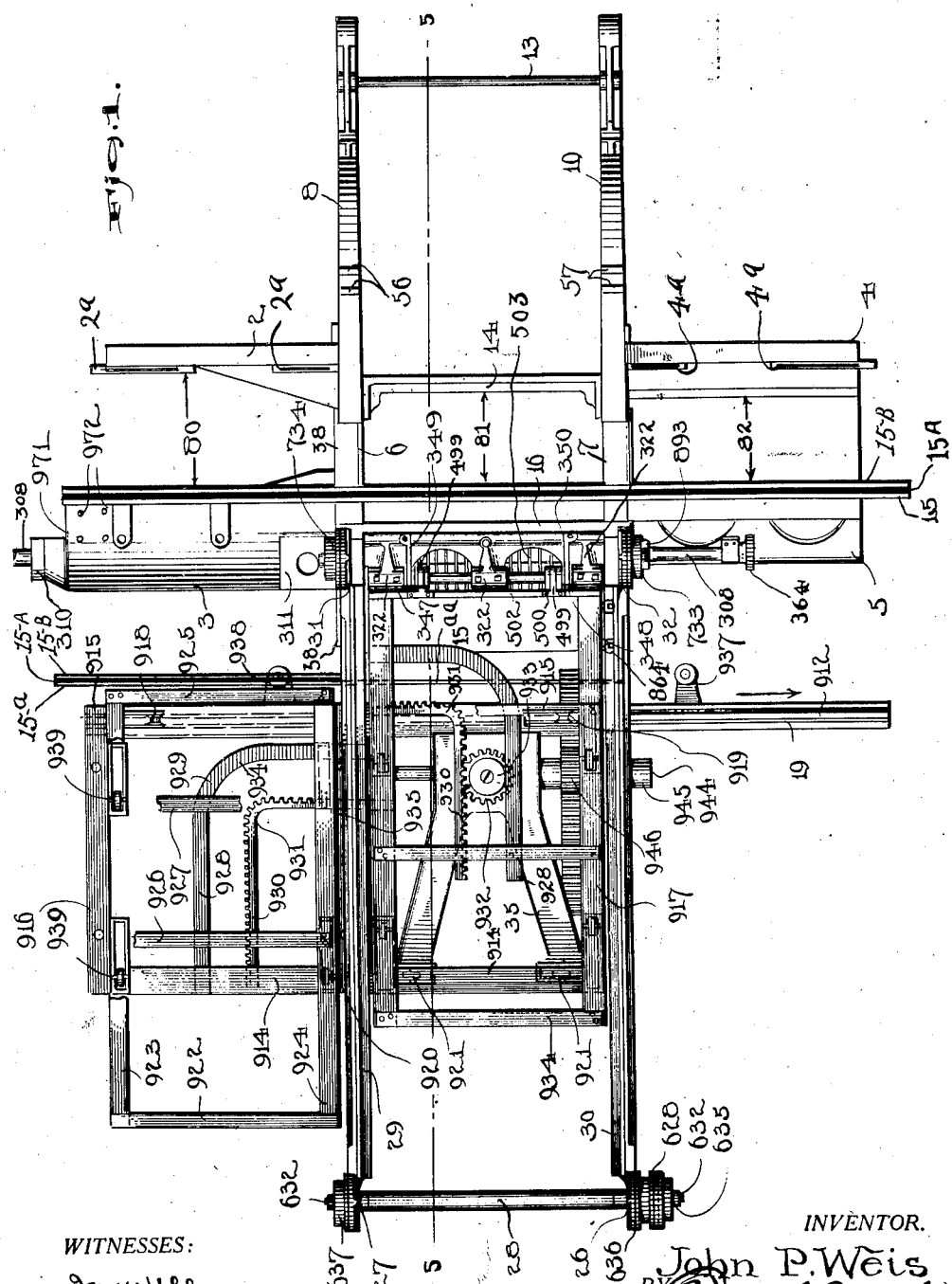
WITNESSES:
INVENTOR.
John P. Weis
BY
ATTORNEYS.

J. P. WEIS.
COMBINED CUTTING AND SEWING MACHINE.
APPLICATION FILED MAY 29, 1913.
1,114,082.
Patented Oct. 20, 1914.
33 SHEETS—SHEET 2.
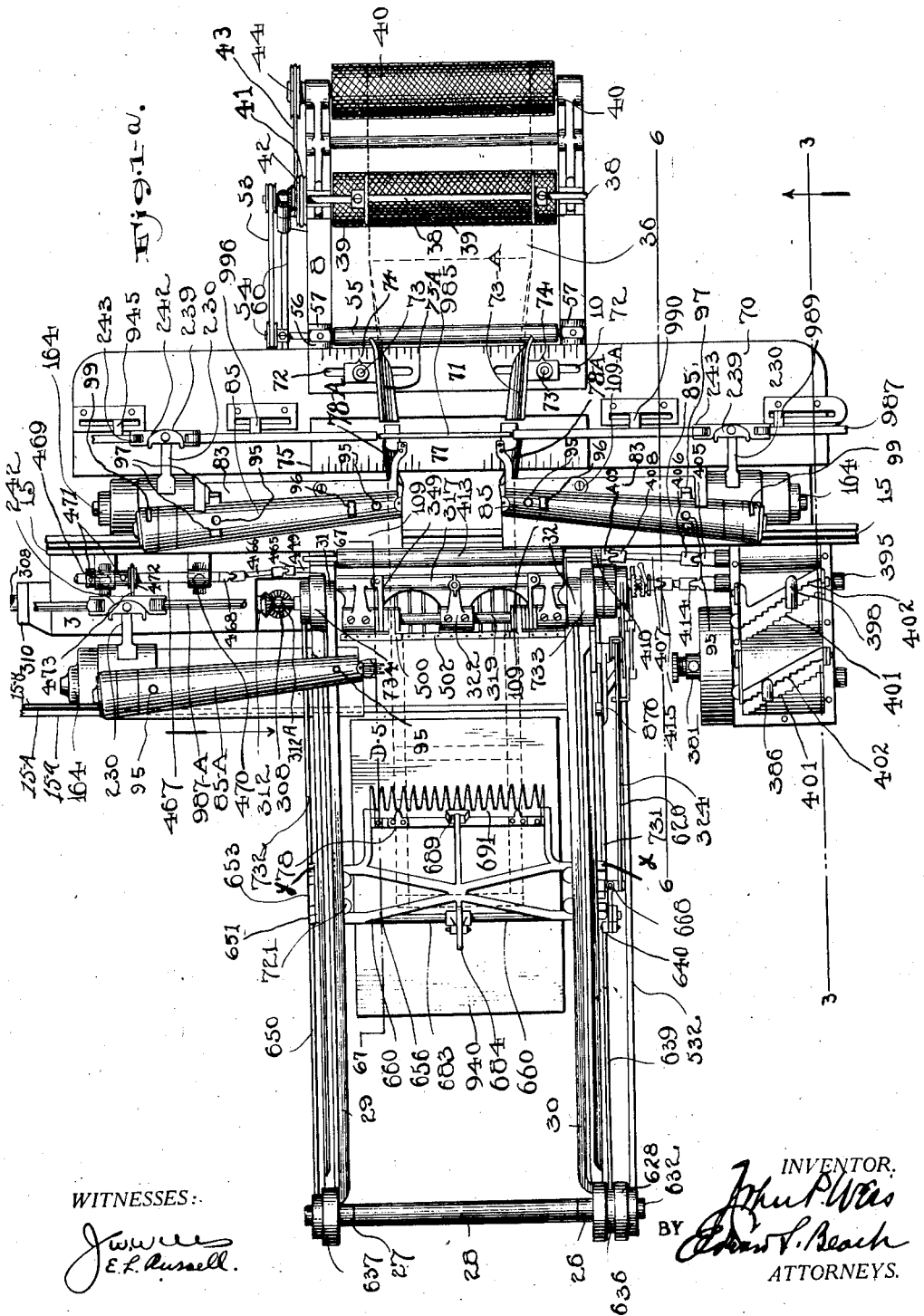
WITNESSES:
INVENTOR.
John P. Weis
BY
ATTORNEYS.

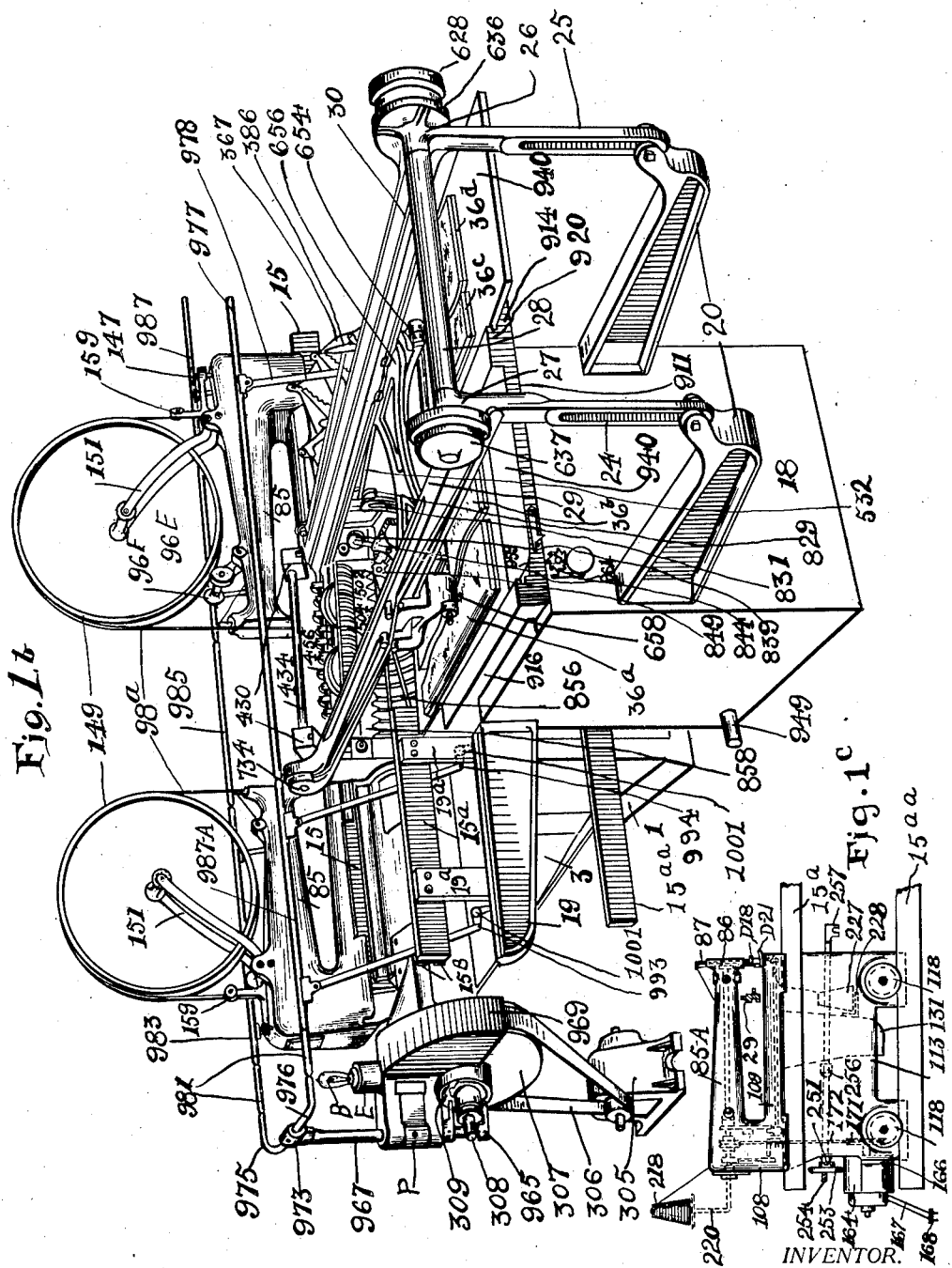

J. P. WEIS.
COMBINED CUTTING AND SEWING MACHINE.
APPLICATION FILED MAY 29, 1913.
1,114,082.
Patented Oct. 20, 1914.
33 SHEETS—SHEET 4.
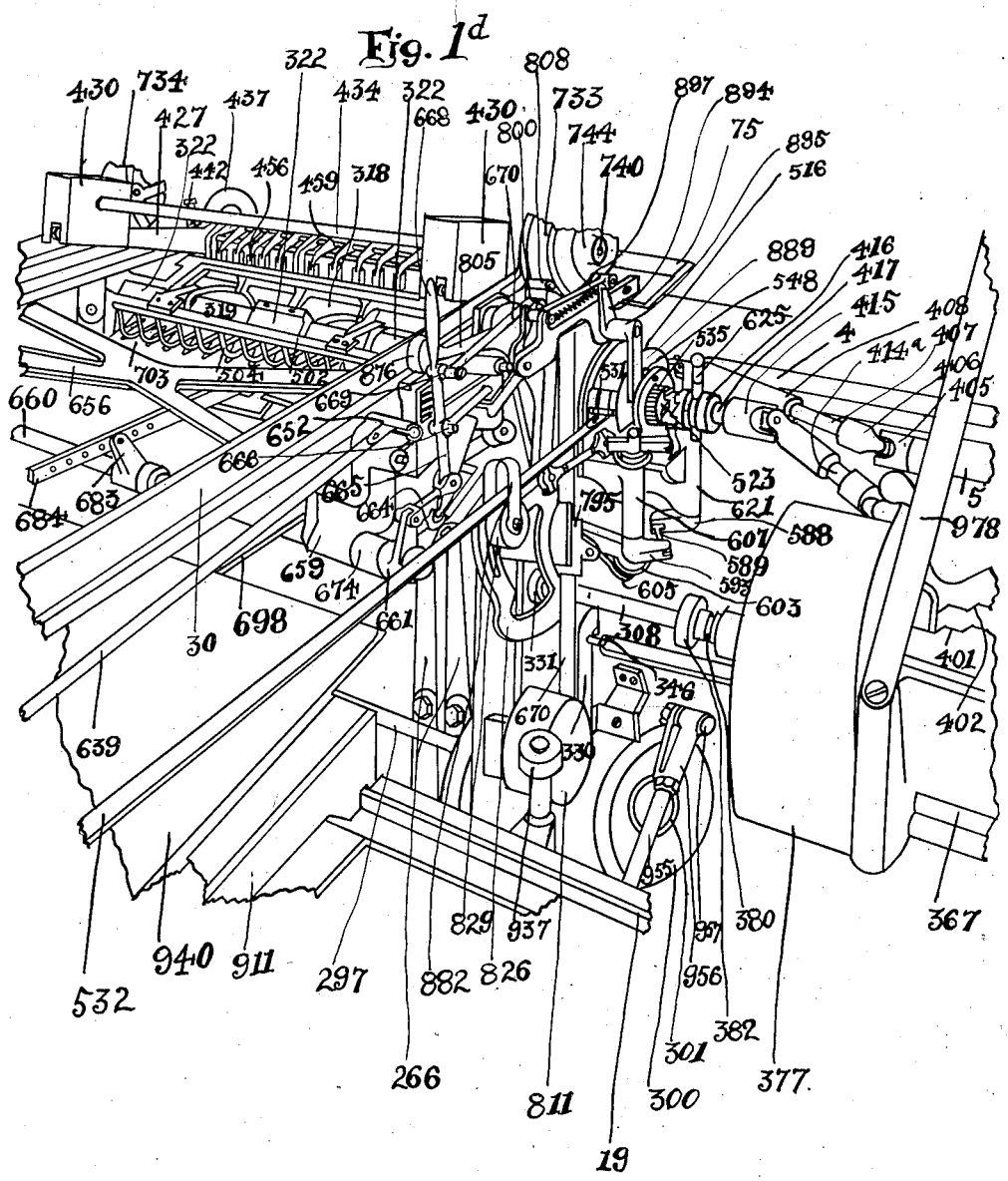
Fig. 1ᵈ
WITNESSES:
E. L. Russell
G. P. Blake
INVENTOR.
John P. Weis
BY Edmund S. Beach
ATTORNEY

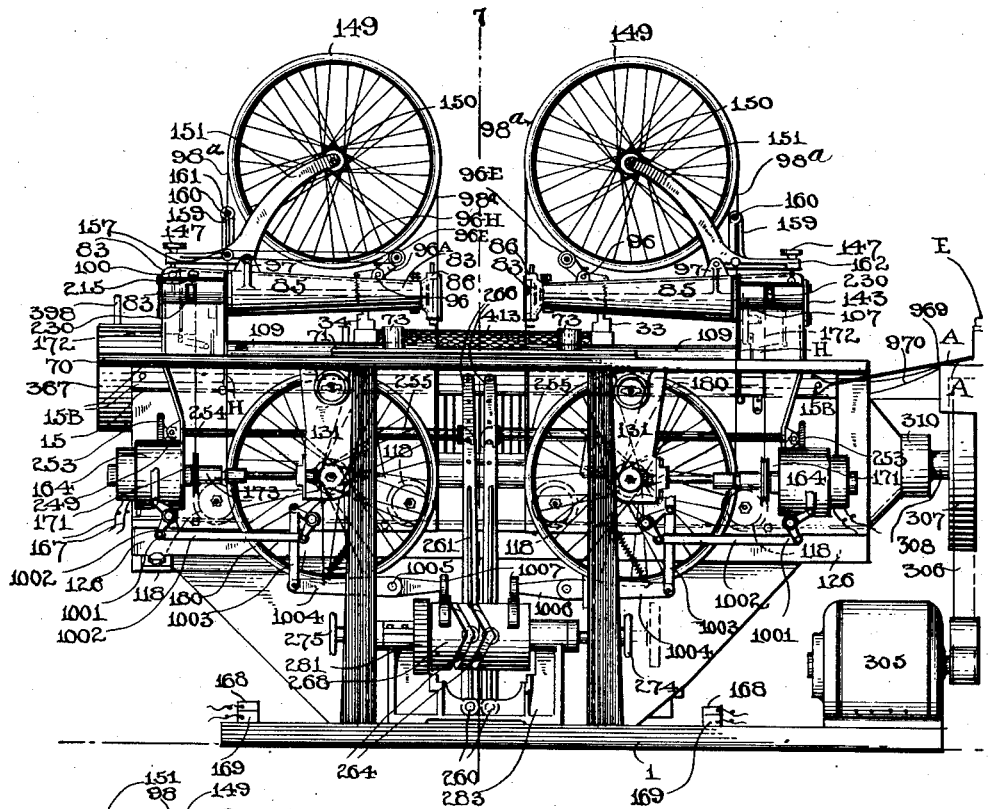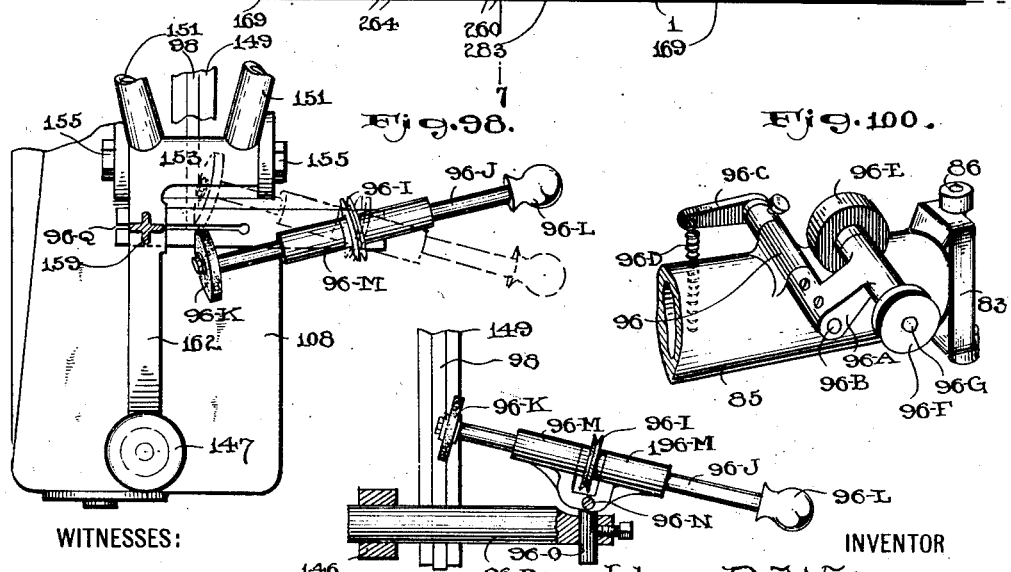

J. P. WEIS.
COMBINED CUTTING AND SEWING MACHINE.
APPLICATION FILED MAY 29, 1913.
1,114,082.
Patented Oct. 20, 1914.
33 SHEETS—SHEET 6.
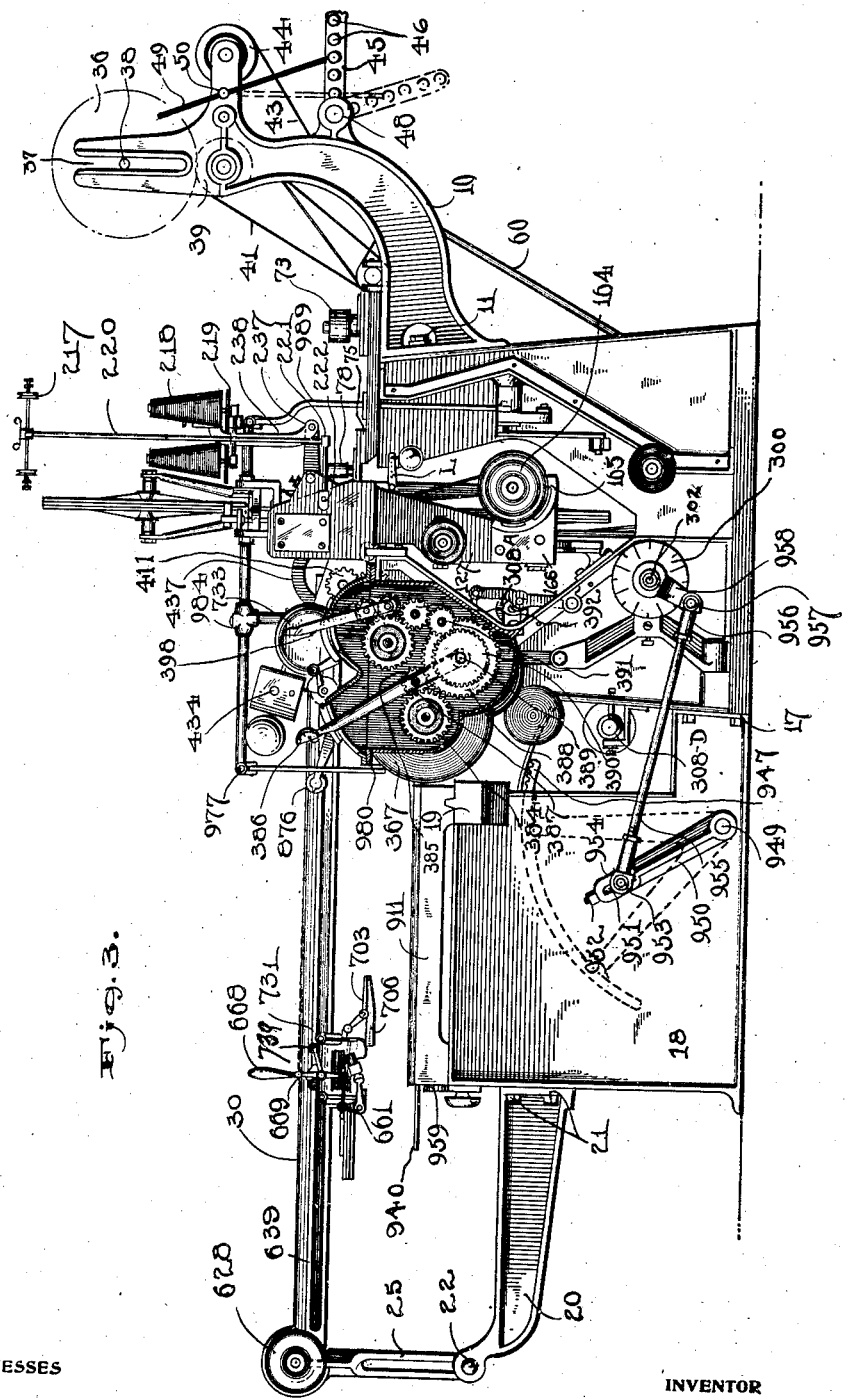
WITNESSES
INVENTOR
John P. Weis
BY
ATTORNEY J. P. WEIS.
COMBINED CUTTING AND SEWING MACHINE.
APPLICATION FILED MAY 29, 1913.
1,114,082.
Patented Oct. 20, 1914.
33 SHEETS—SHEET 7.
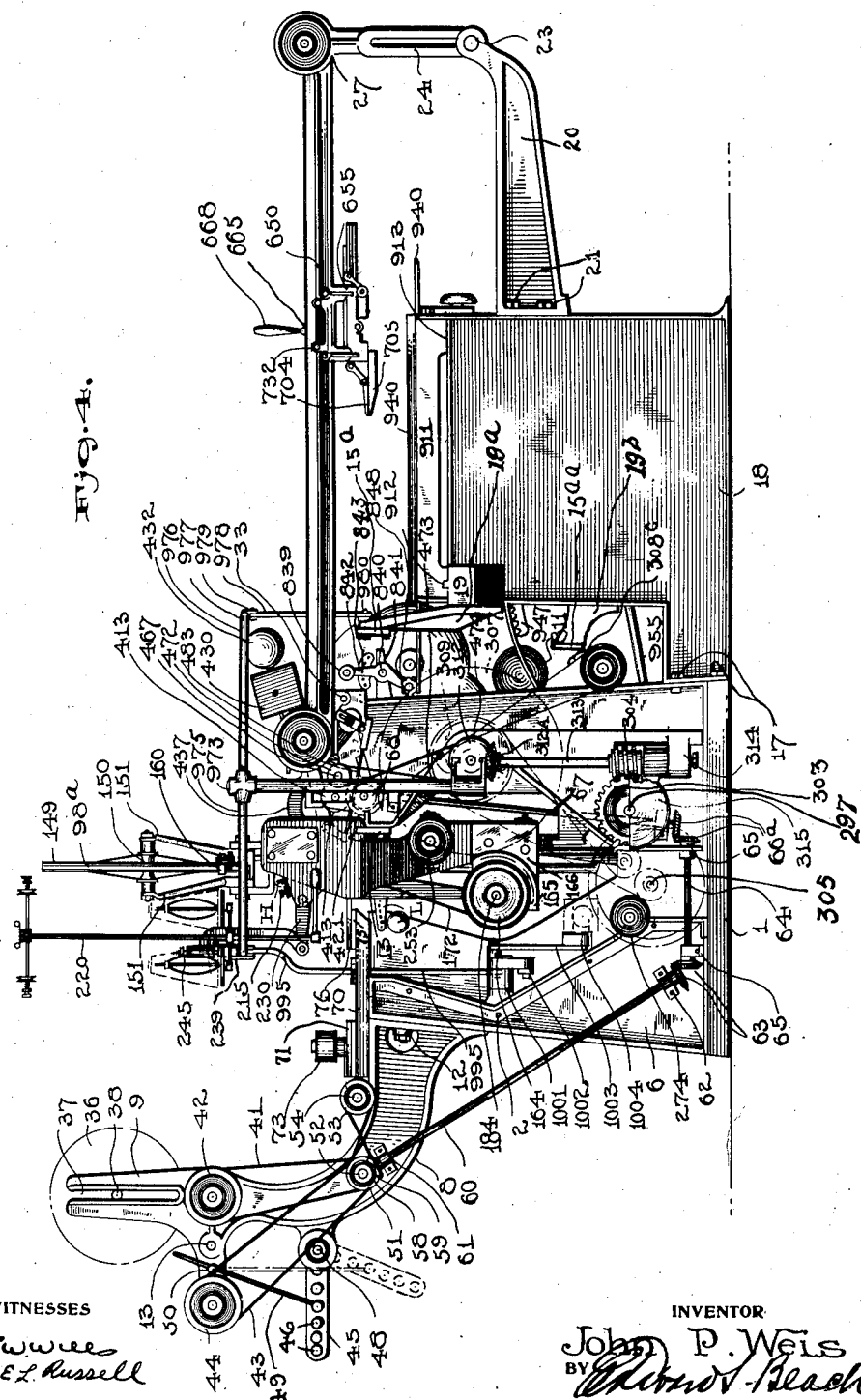
WITNESSES
INVENTOR
John P. Weis
BY
ATTORNEY

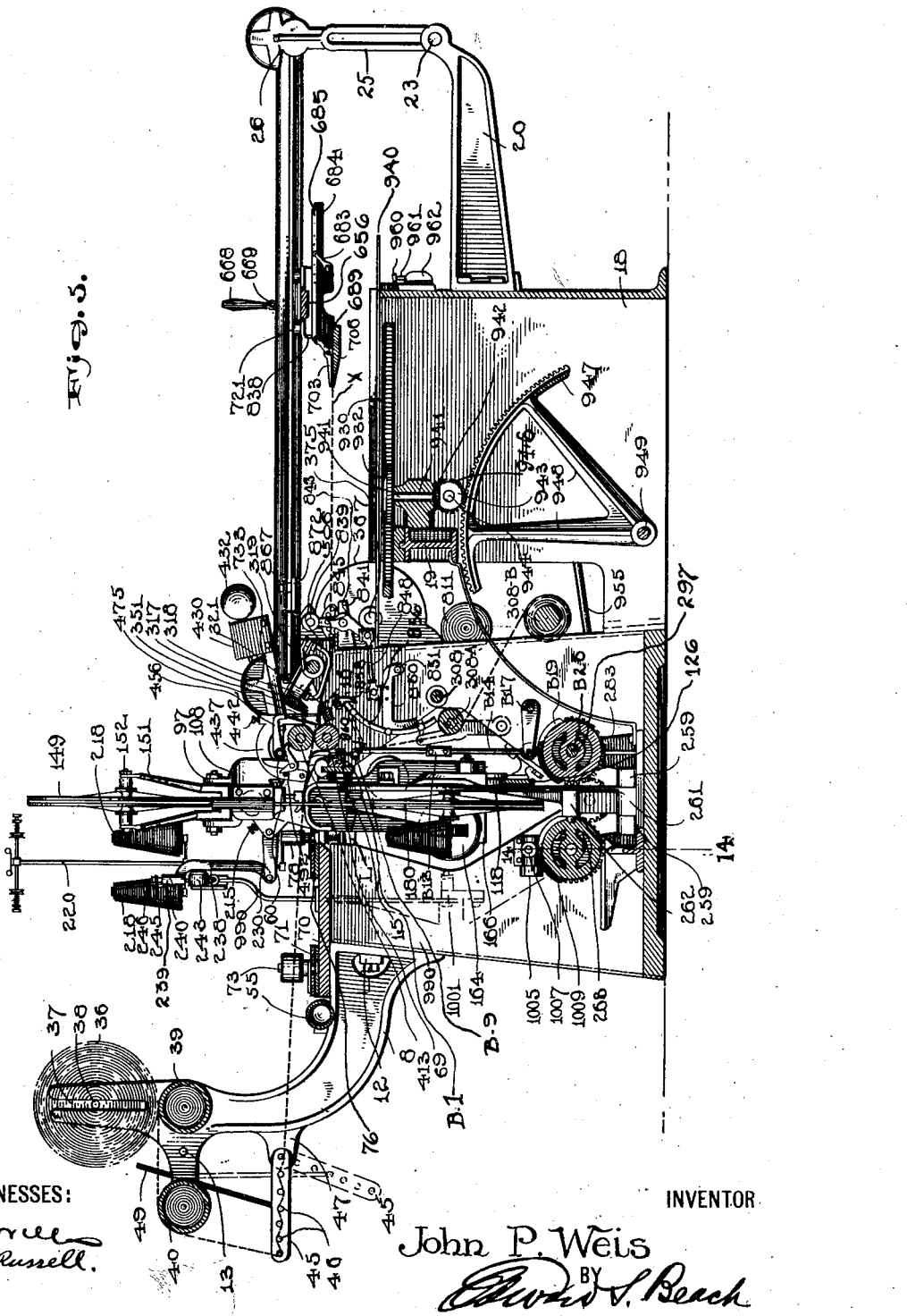

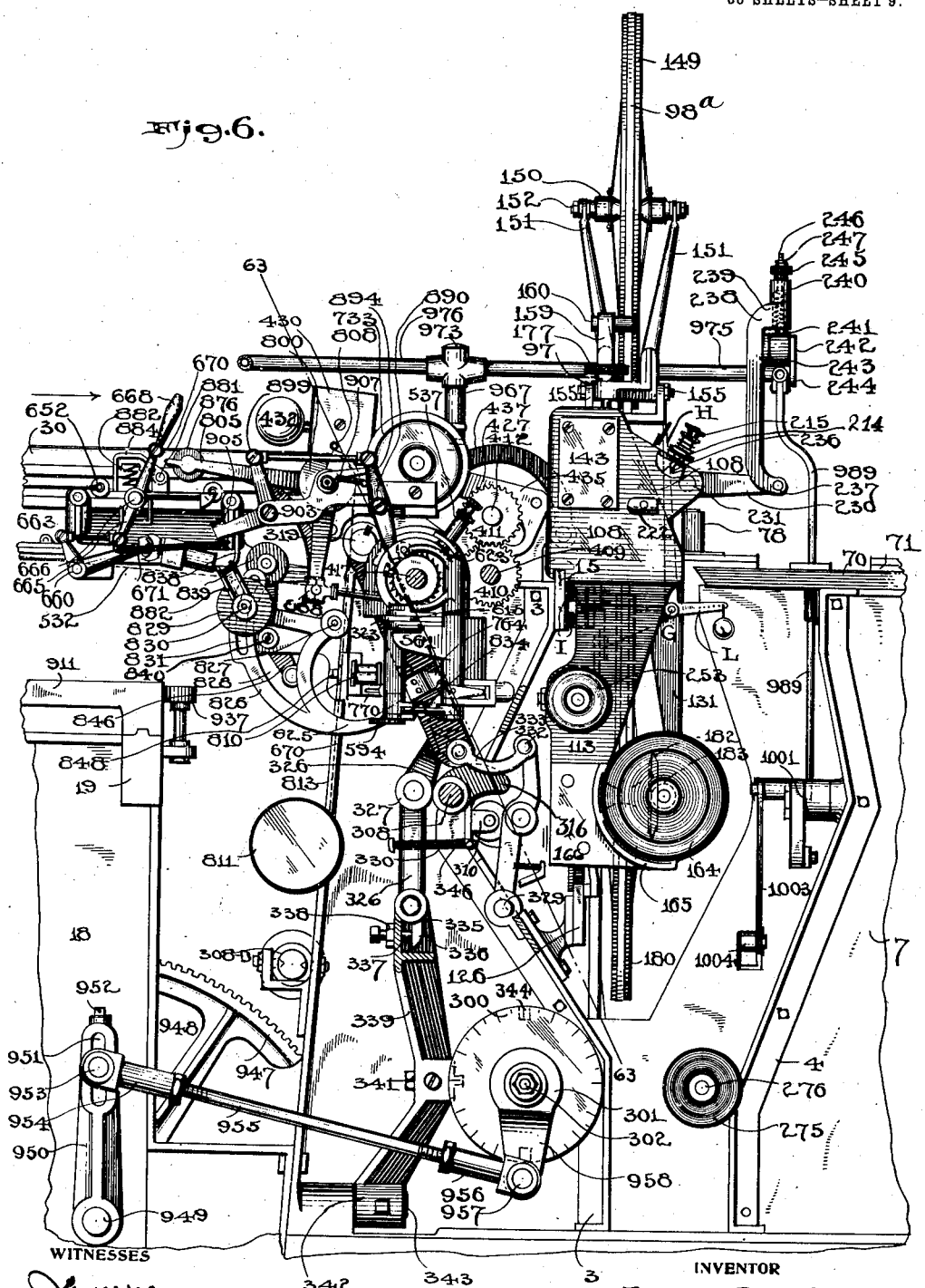

J. P. WEIS.
COMBINED CUTTING AND SEWING MACHINE.
APPLICATION FILED MAY 29, 1913.

1,114,082.

Patented Oct. 20, 1914.
33 SHEETS—SHEET 10.

WITNESSES

INVENTOR
John P. Weis.
BY
ATTORNEY

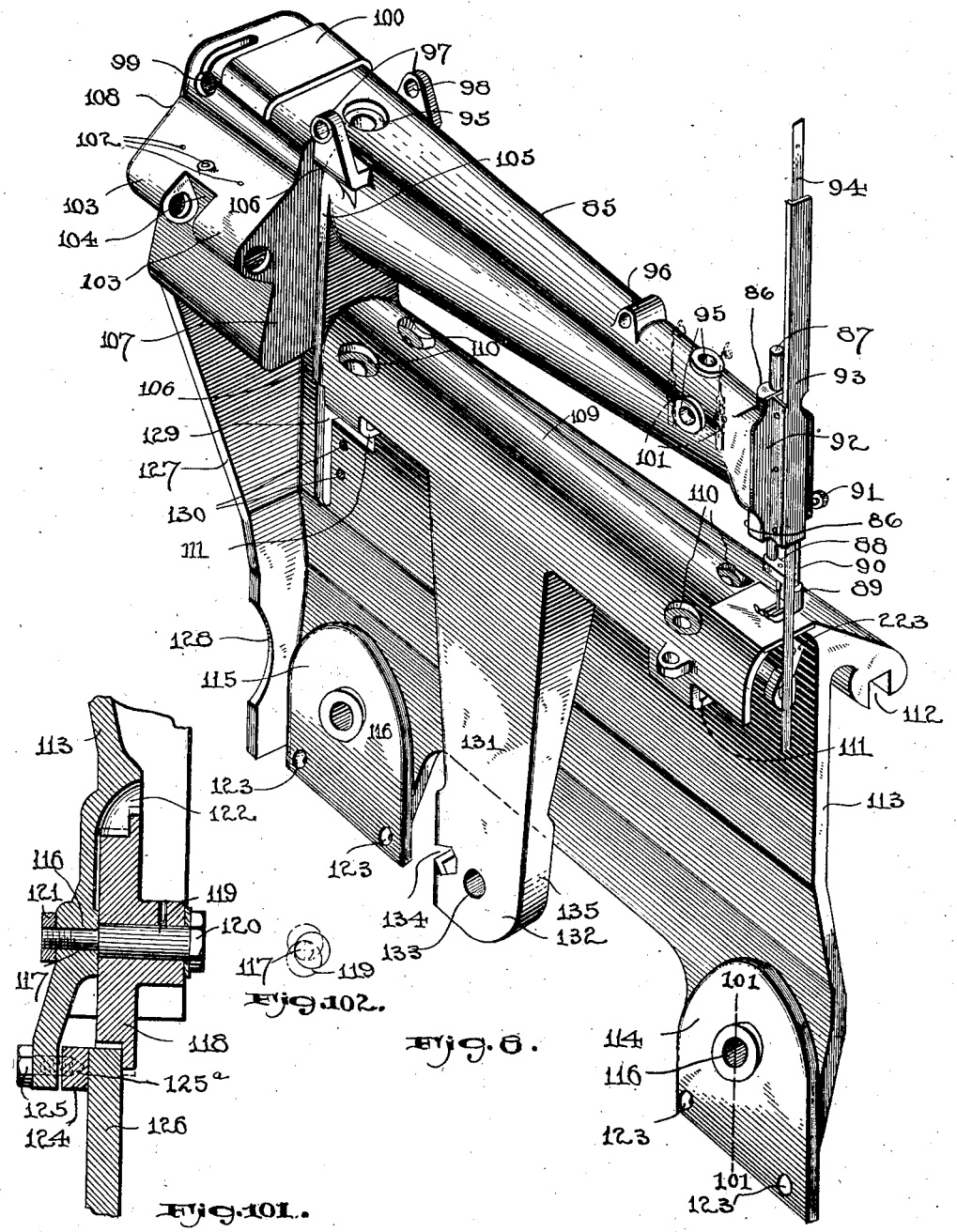

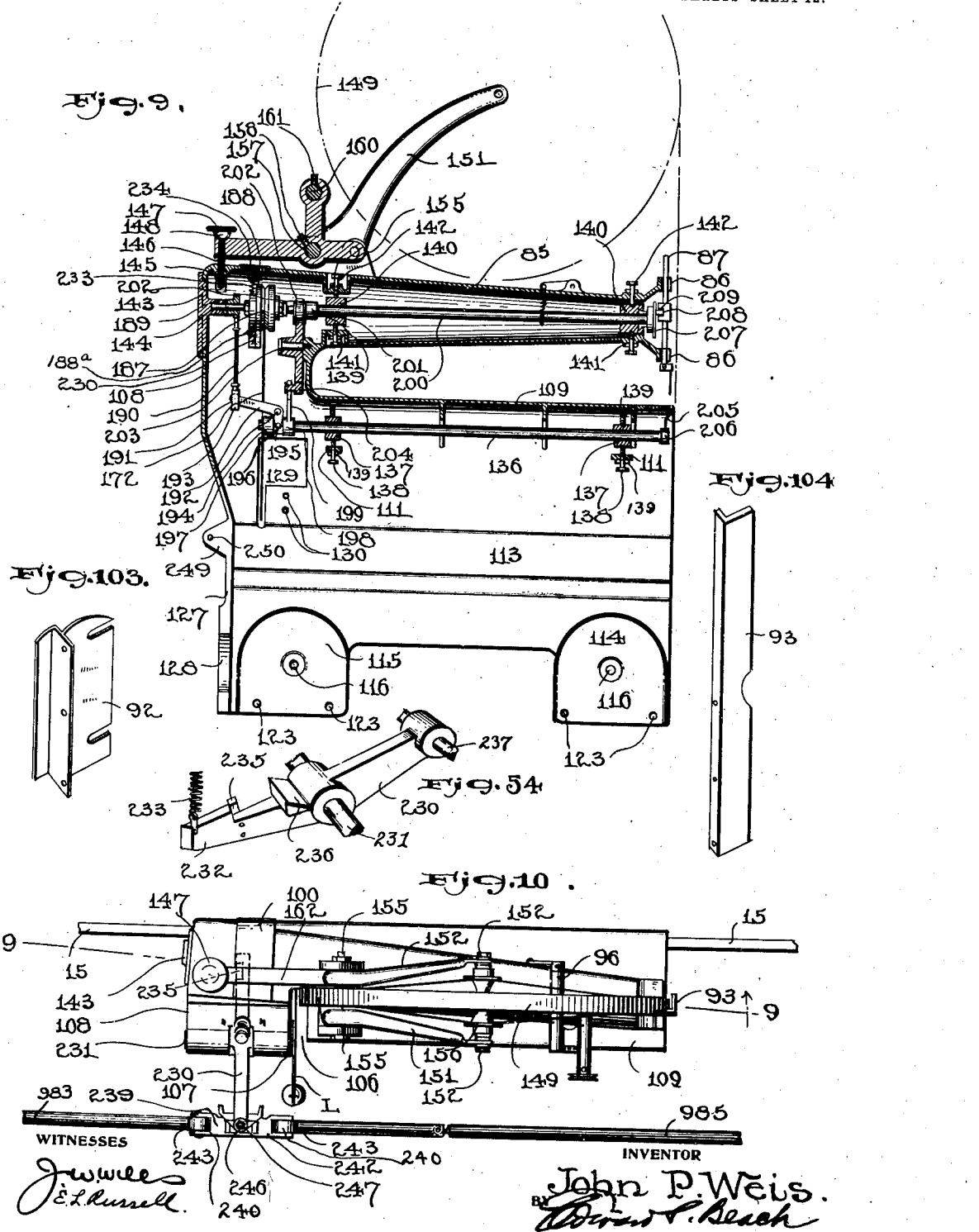

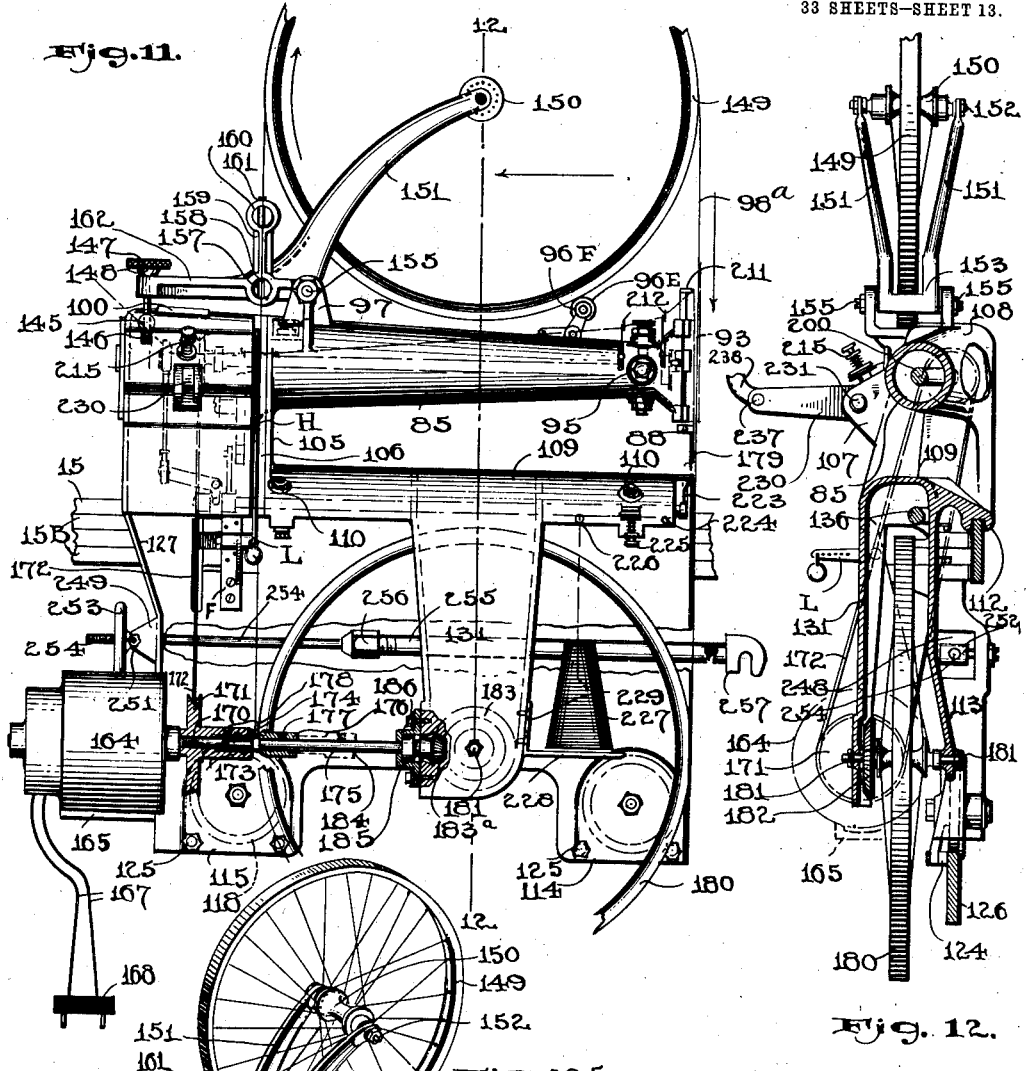

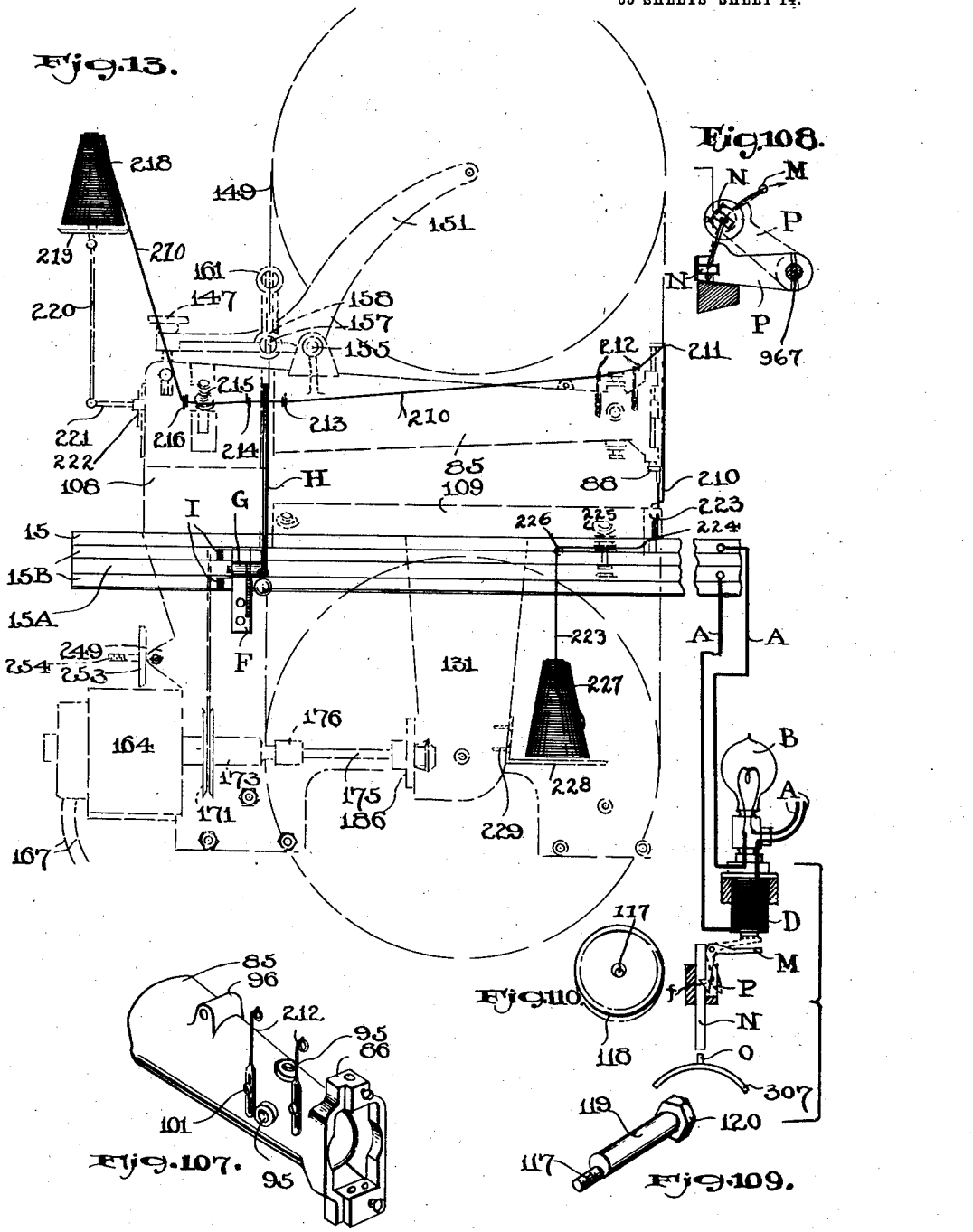

J. P. WEIS.
COMBINED CUTTING AND SEWING MACHINE.
APPLICATION FILED MAY 29, 1913.
1,114,082.
Patented Oct. 20, 1914.
33 SHEETS—SHEET 15.
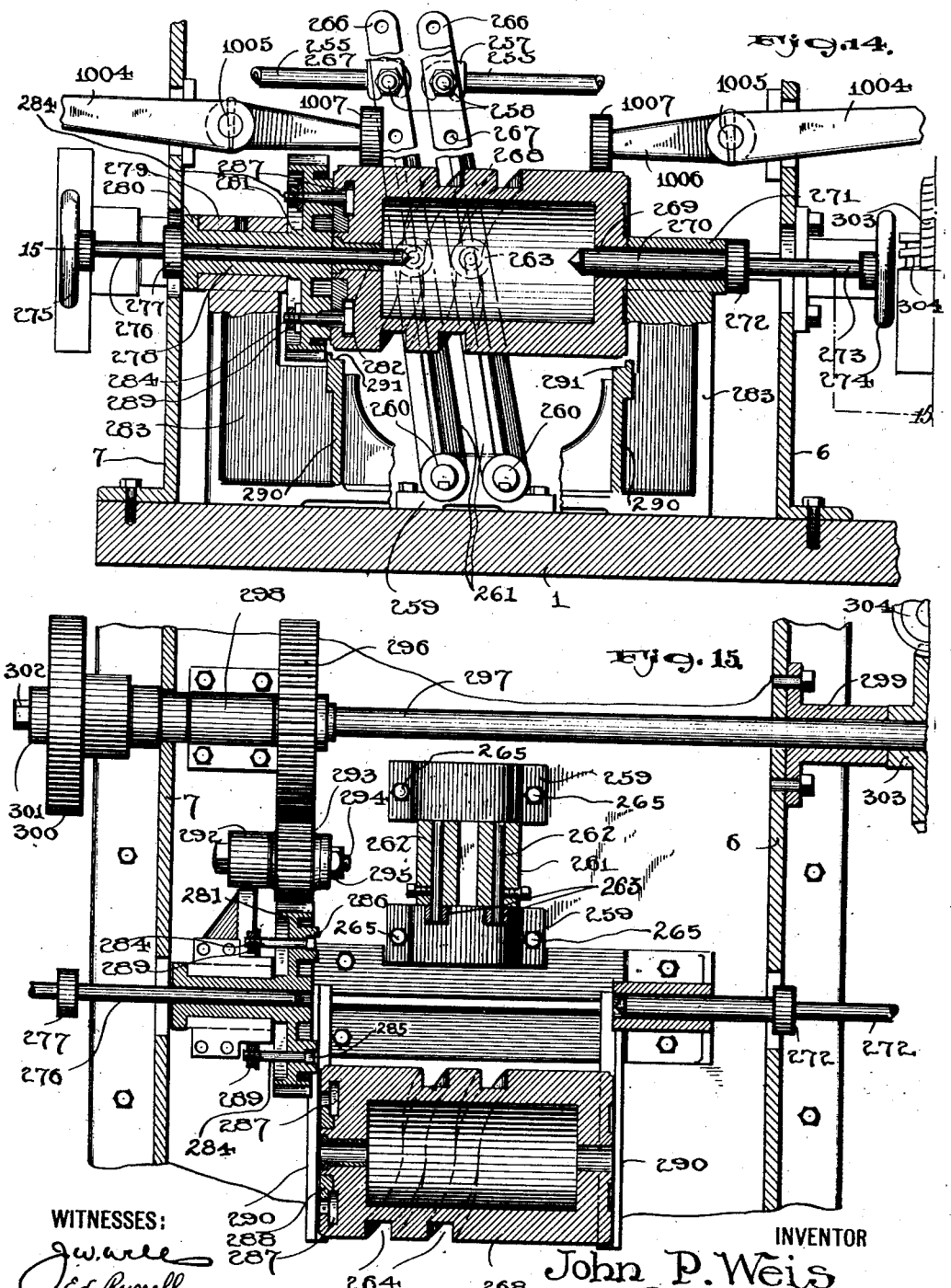
INVENTOR
John P. Weis J. P. WEIS.
COMBINED CUTTING AND SEWING MACHINE.
APPLICATION FILED MAY 29, 1913.
1,114,082.  Patented Oct. 20, 1914.
33 SHEETS—SHEET 16.
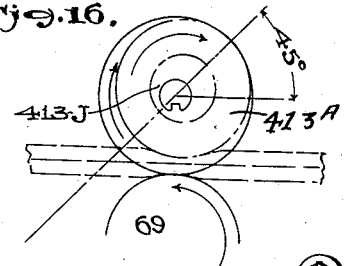
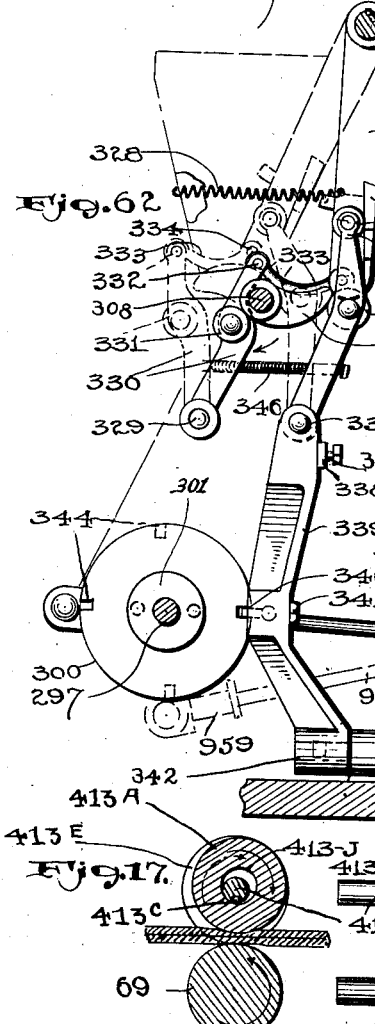
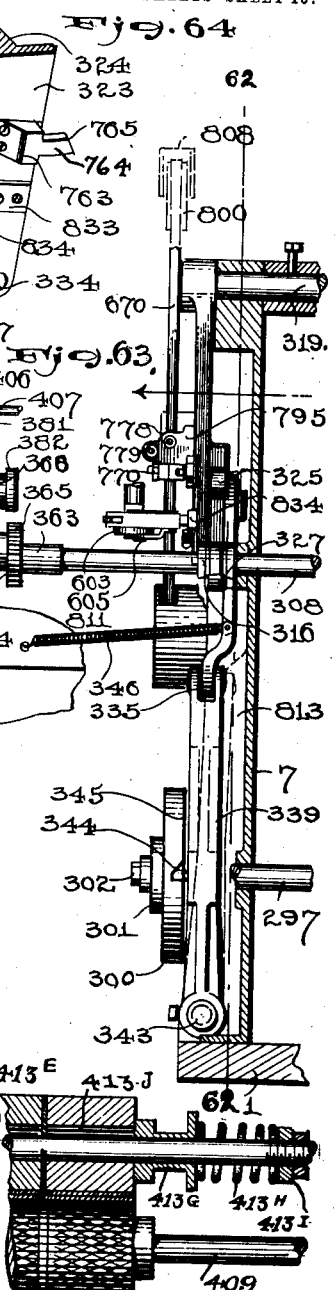
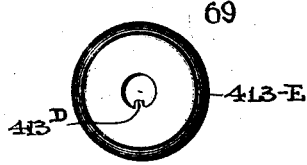
WITNESSES
INVENTOR
John P. Weis
BY
ATTORNEY

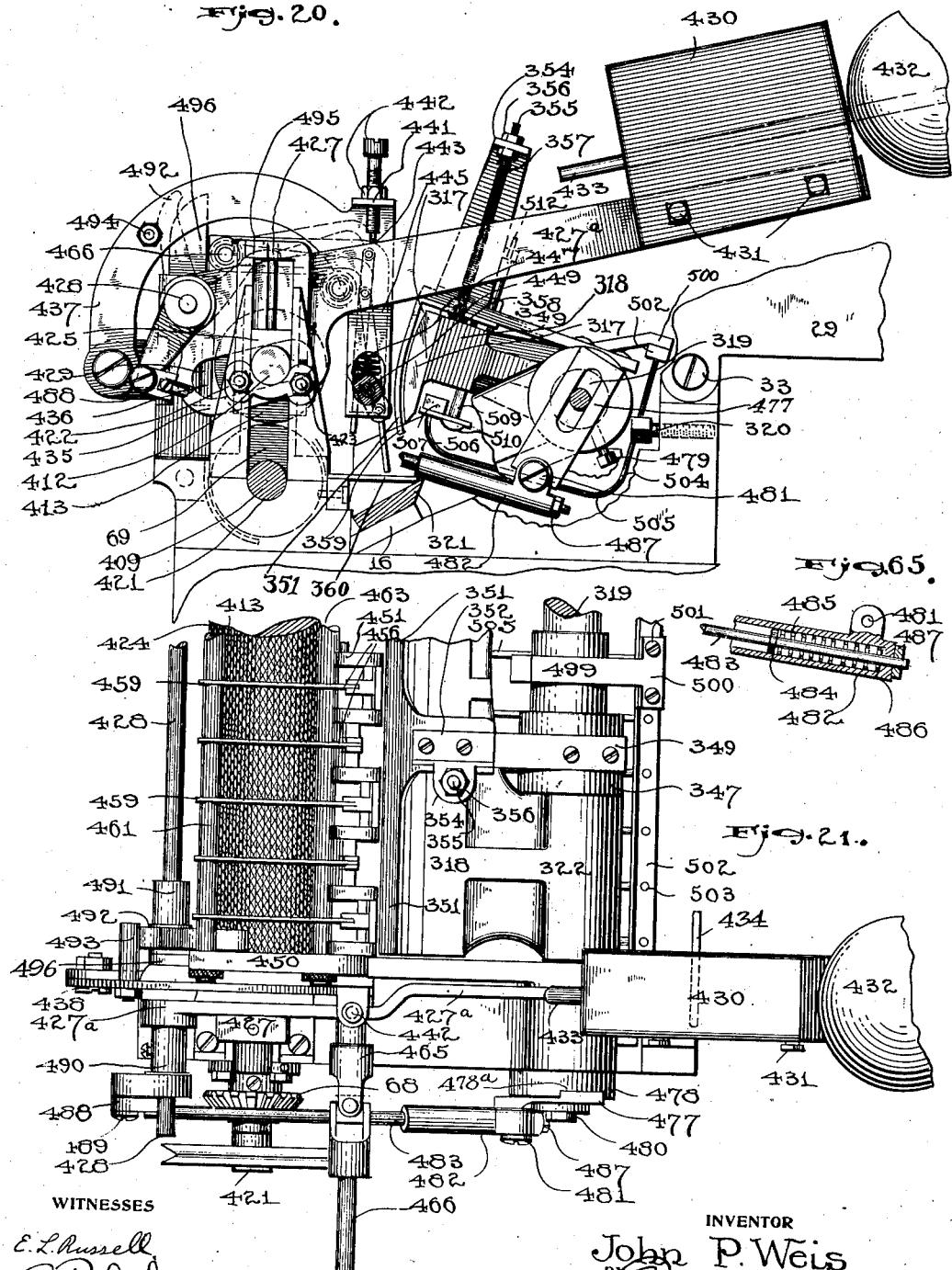

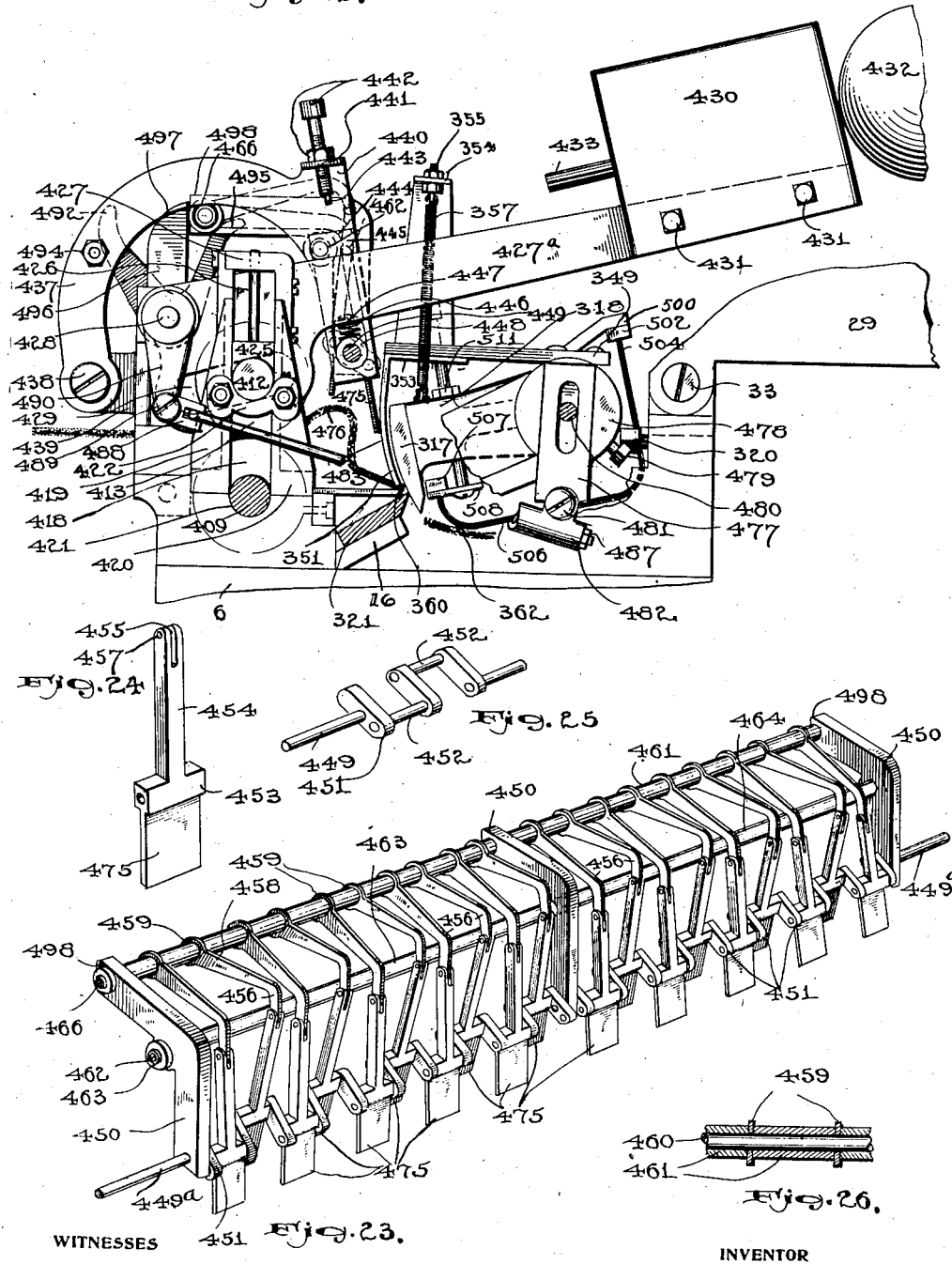

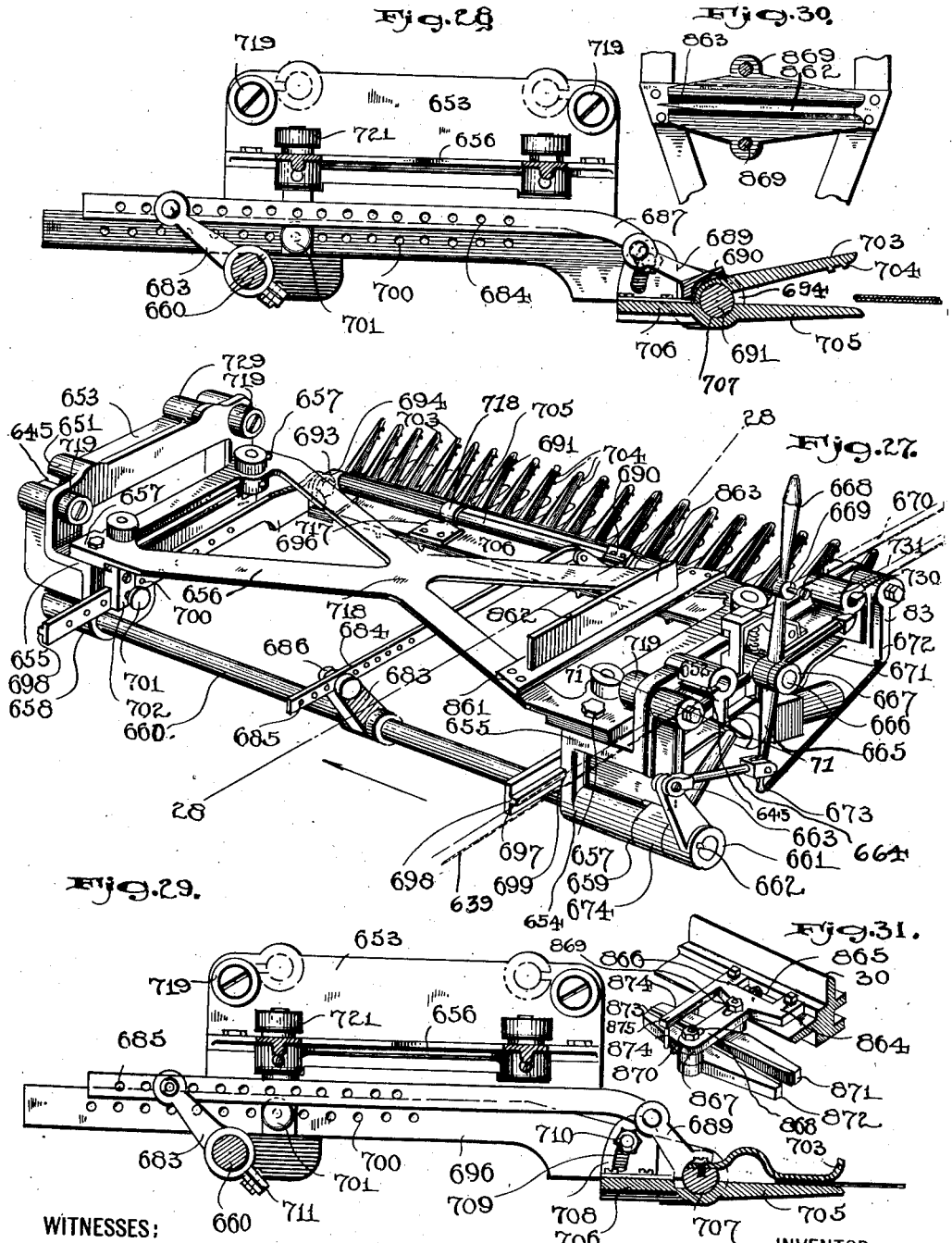

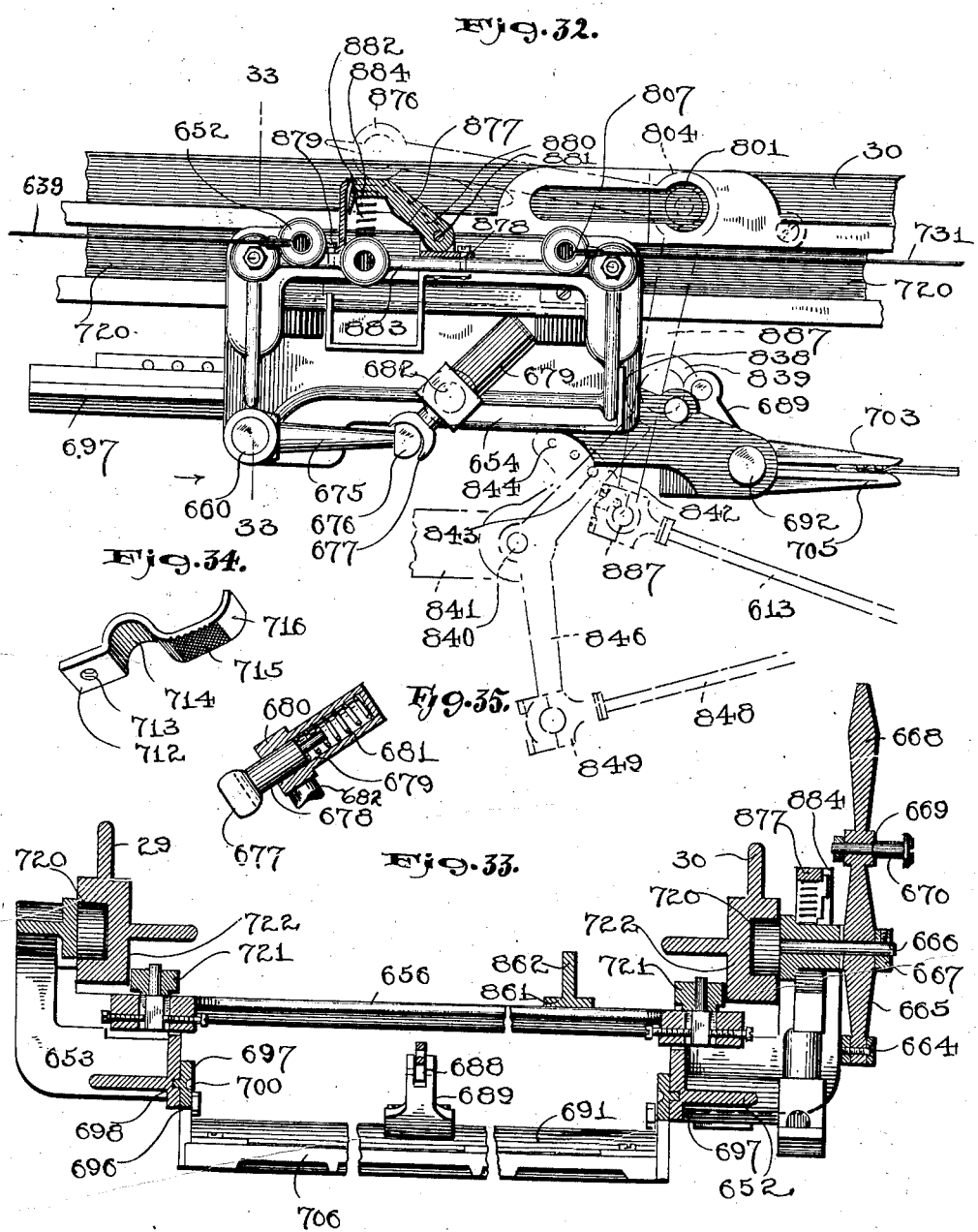

J. P. WEIS.
COMBINED CUTTING AND SEWING MACHINE.
APPLICATION FILED MAY 29, 1913.
1,114,082.
Patented Oct. 20, 1914.
33 SHEETS—SHEET 21.
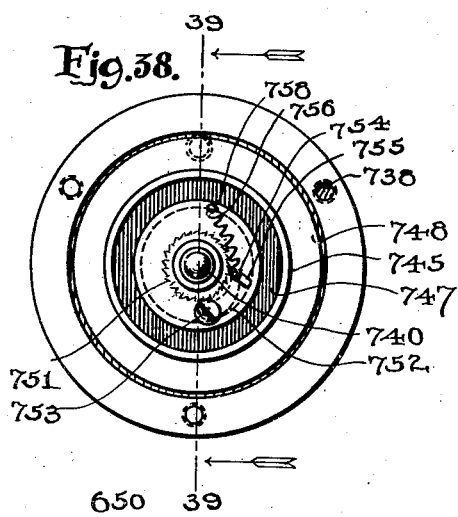
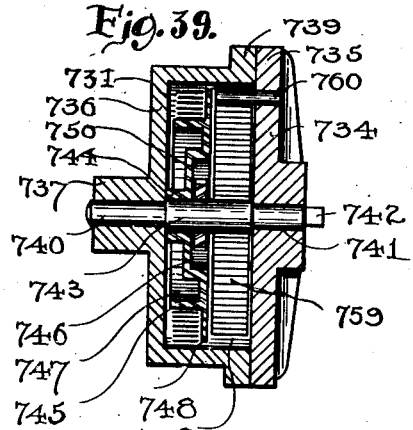
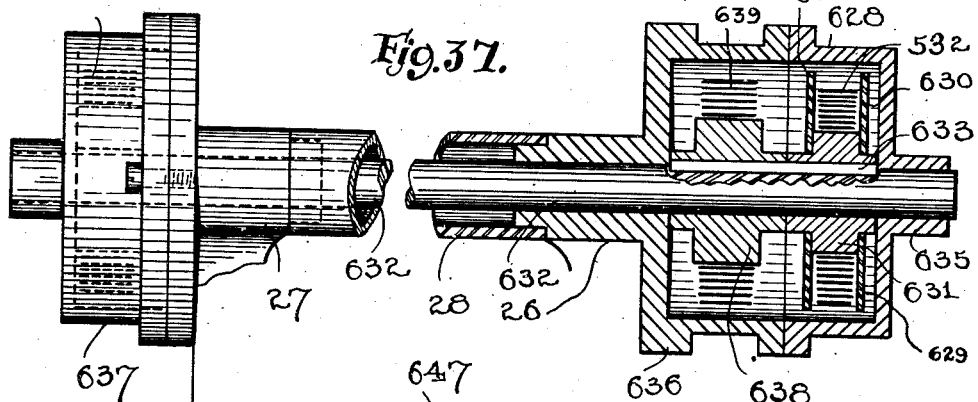
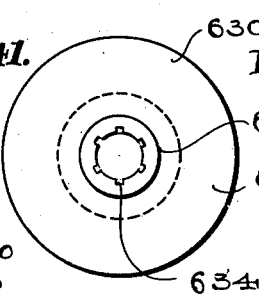
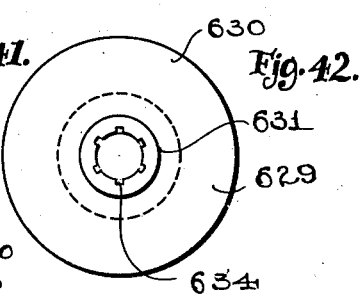
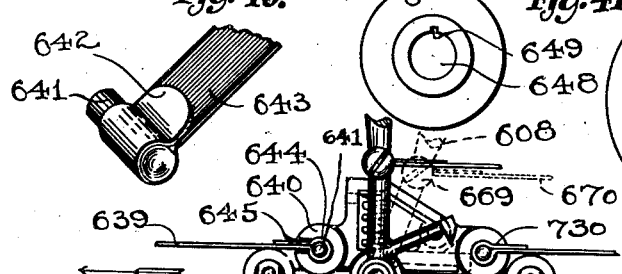
WITNESSES:
INVENTOR
ATTORNEY

J. P. WEIS.
COMBINED CUTTING AND SEWING MACHINE.
APPLICATION FILED MAY 29, 1913.

1,114,082.

Patented Oct. 20, 1914.
33 SHEETS—SHEET 22.

WITNESSES
INVENTOR
John P. Weis.
BY
ATTORNEY

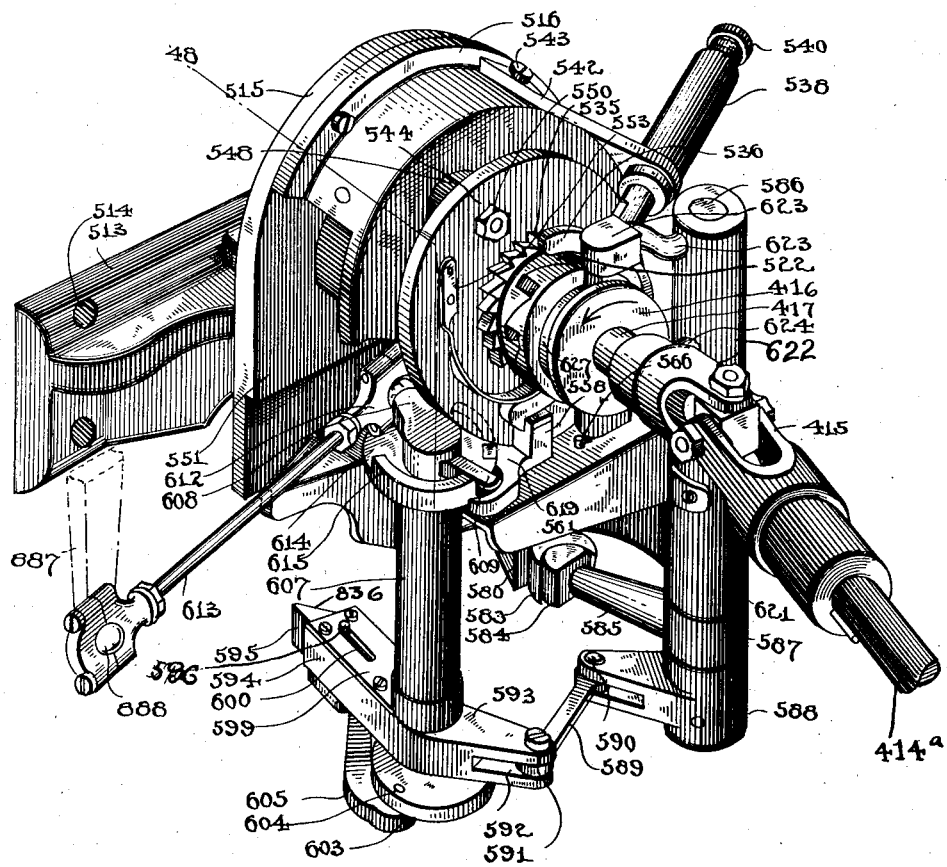

J. P. WEIS.
COMBINED CUTTING AND SEWING MACHINE.
APPLICATION FILED MAY 29, 1913.

1,114,082.

Patented Oct. 20, 1914.
33 SHEETS—SHEET 24.

WITNESSES:

INVENTOR
John P. Weis.
BY
ATTORNEY

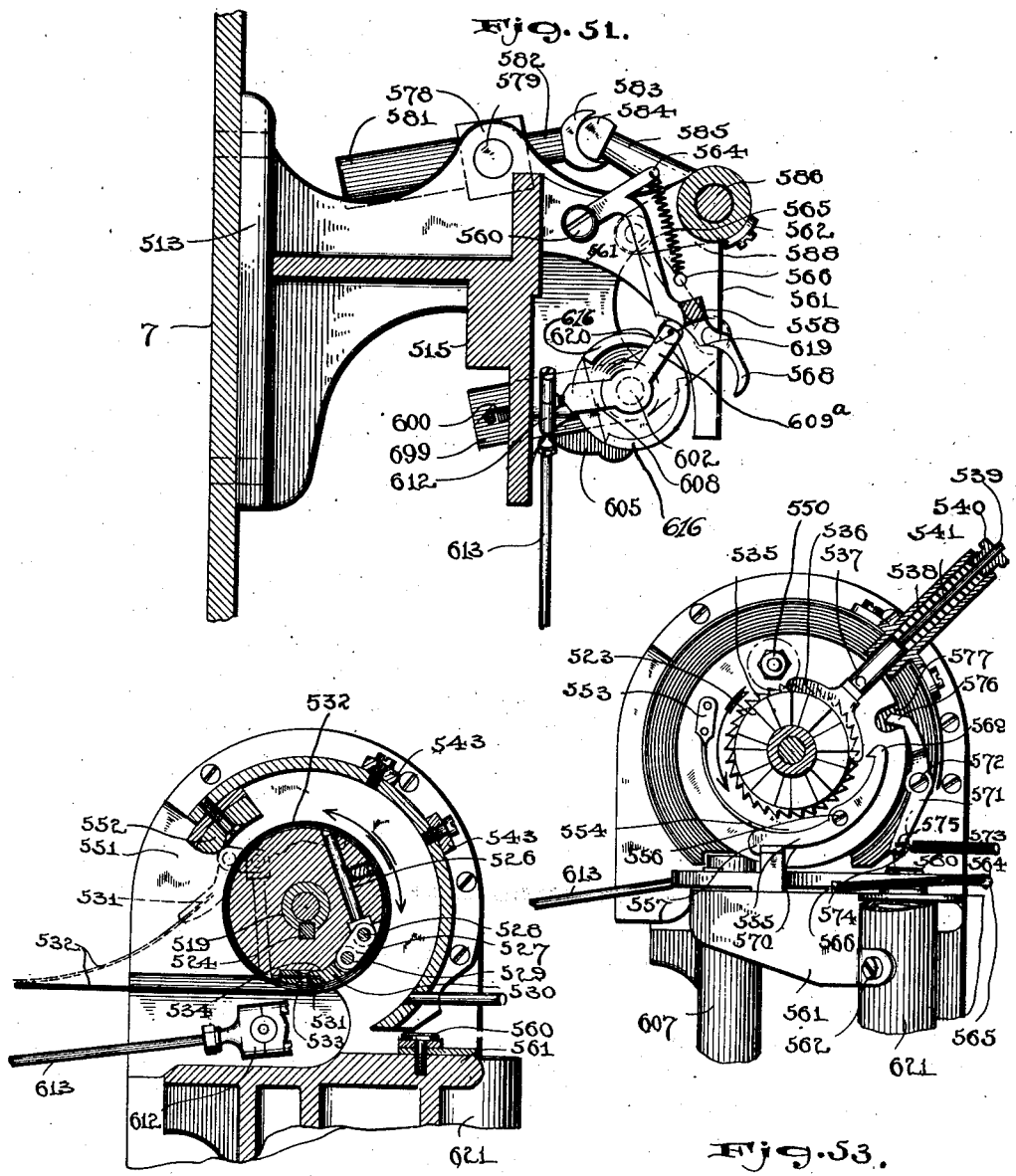

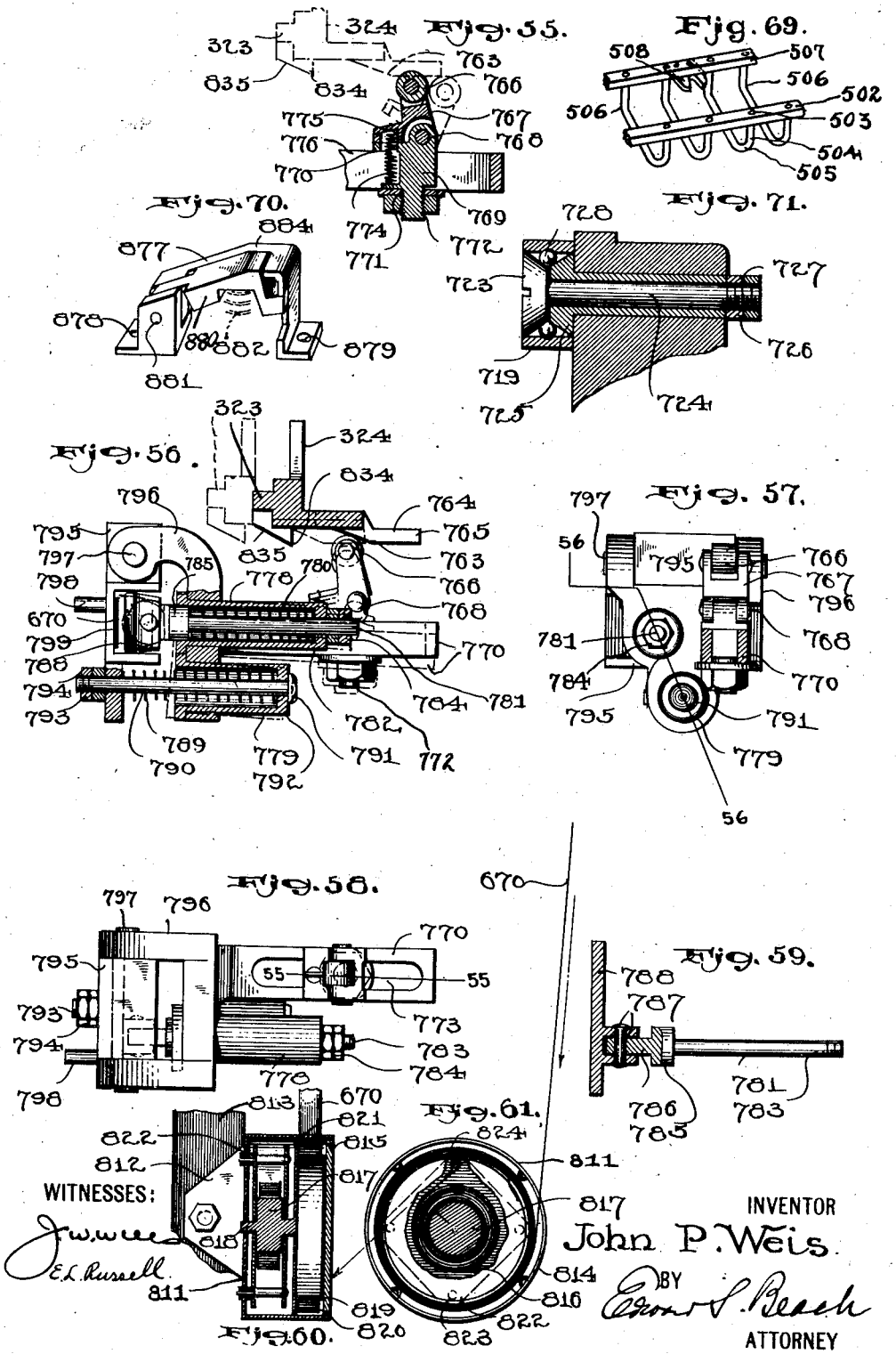

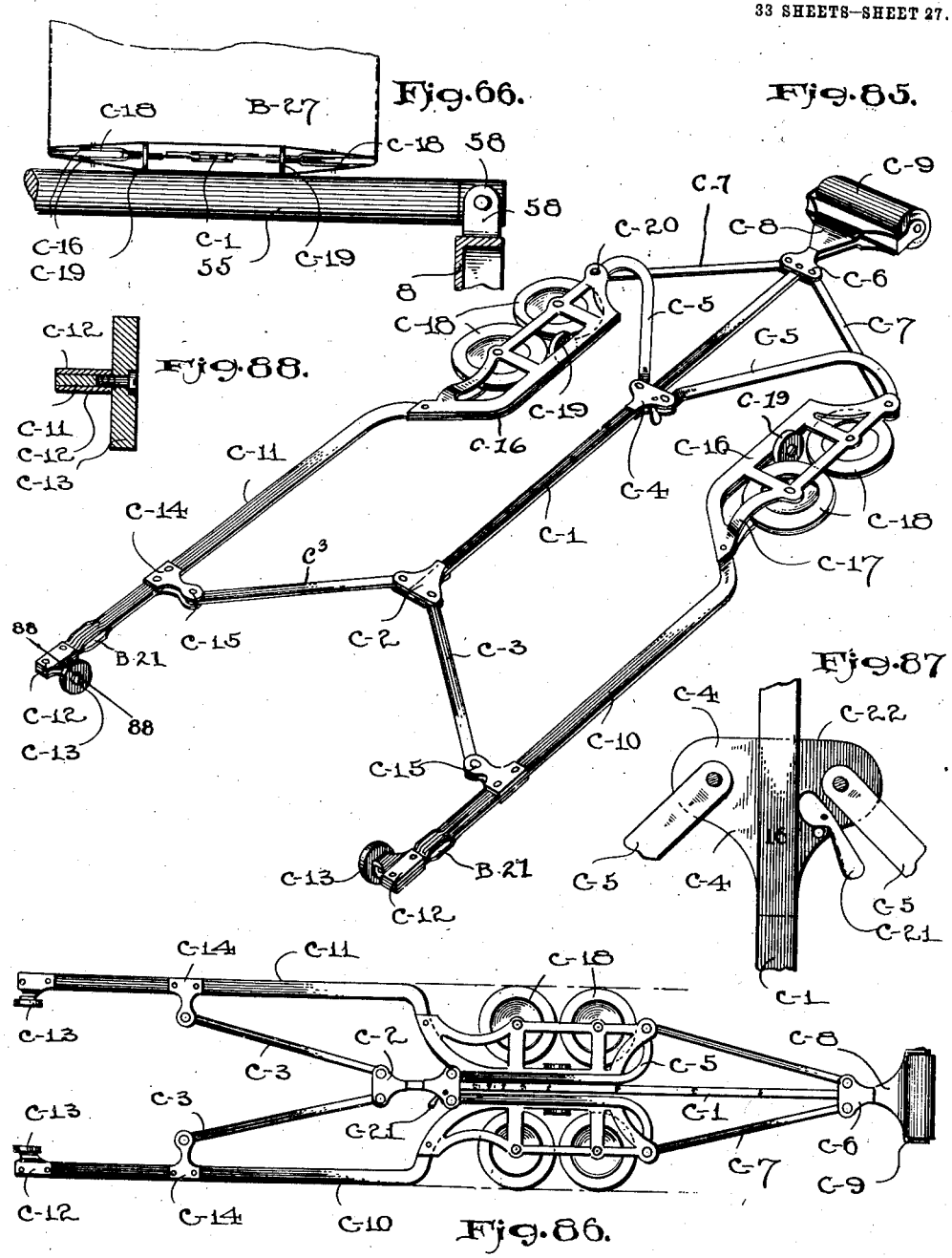

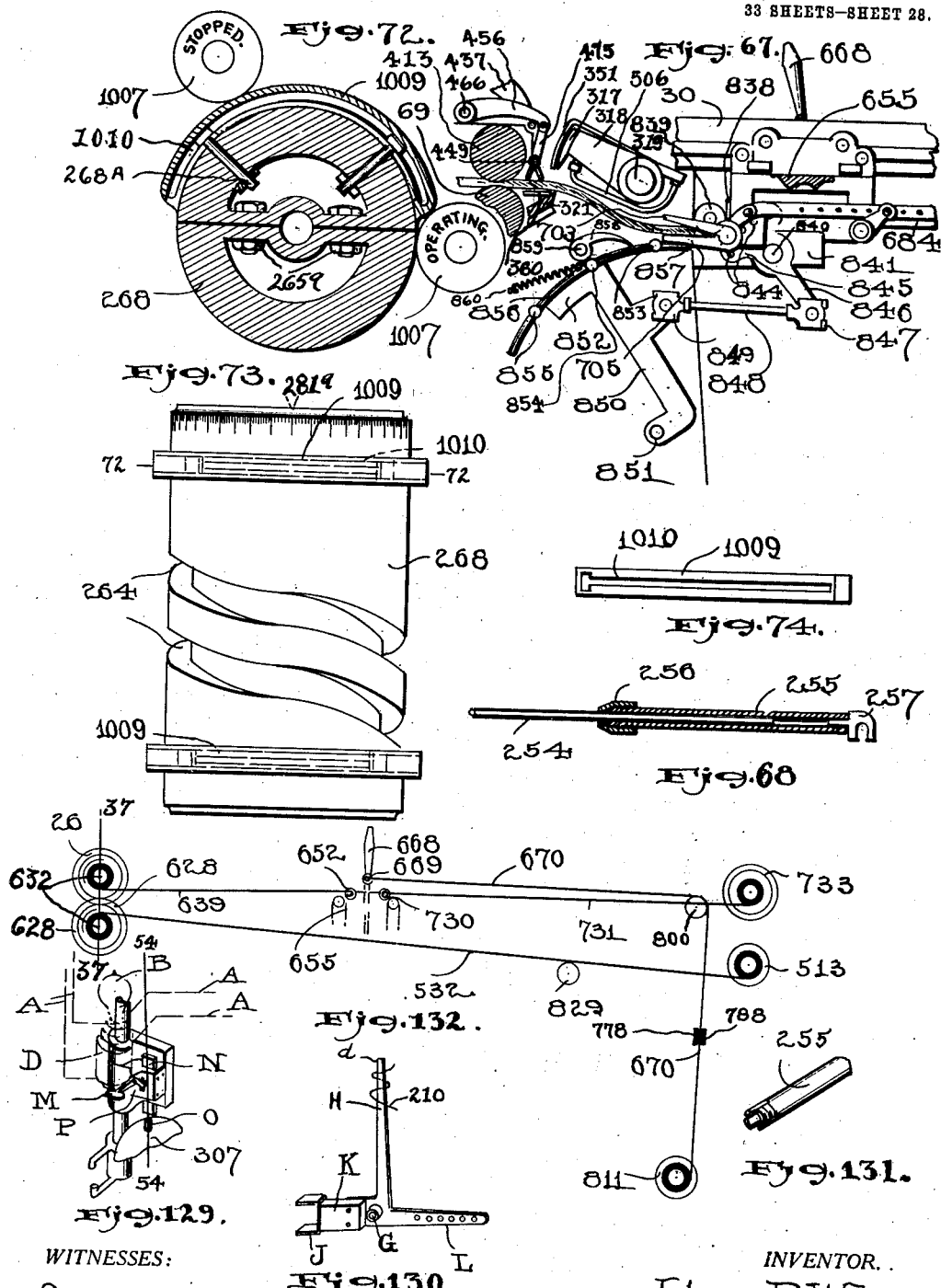

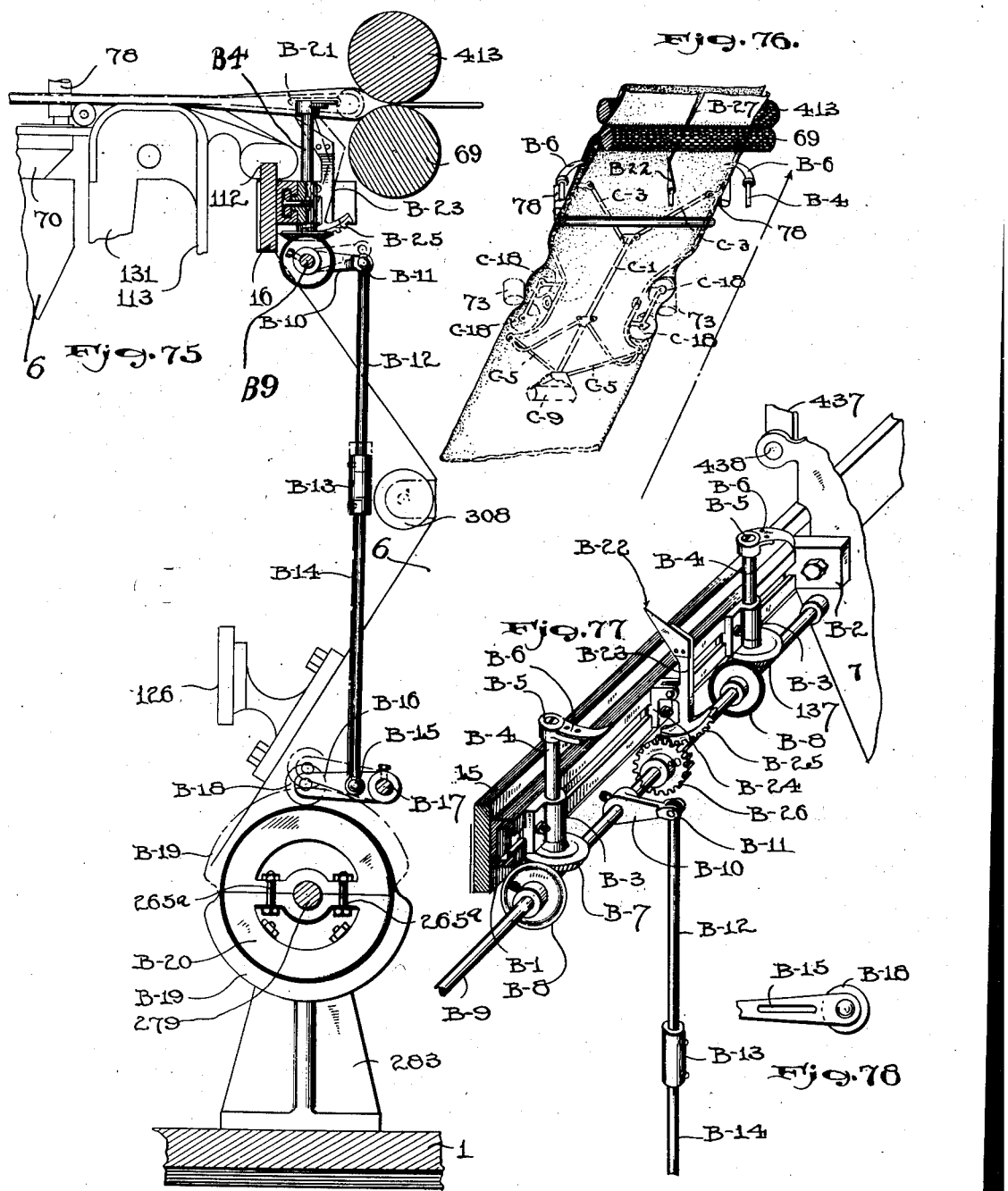

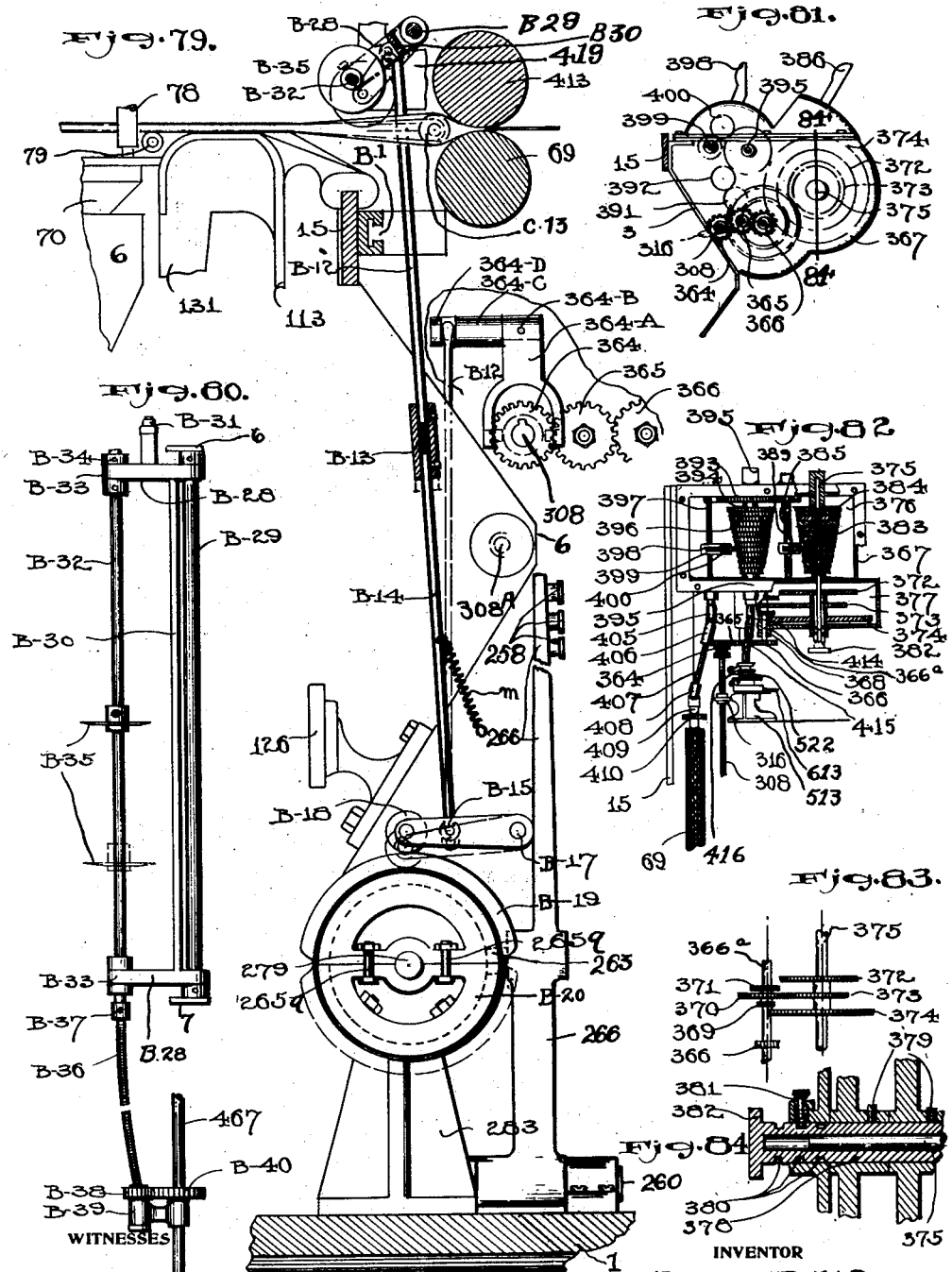

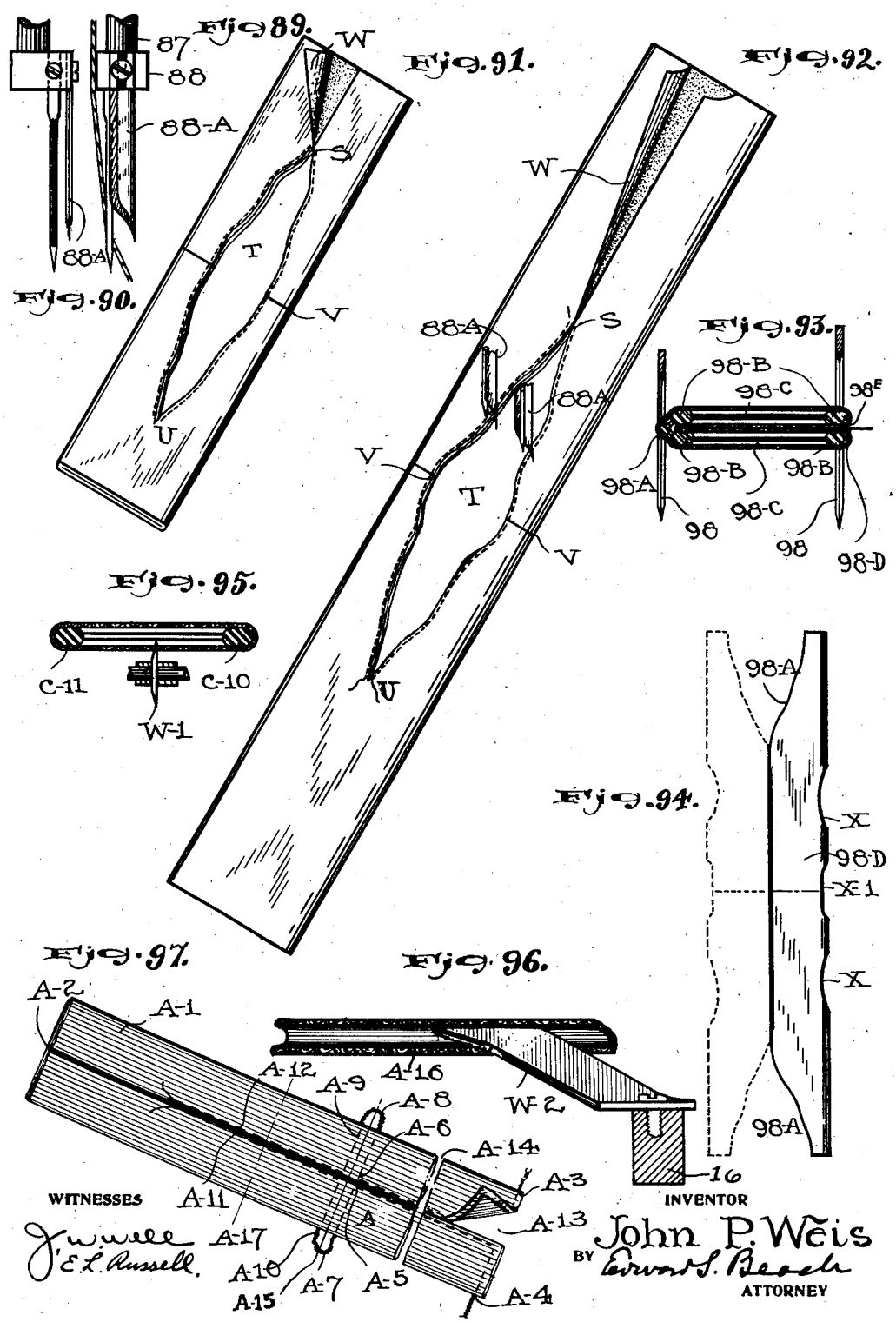

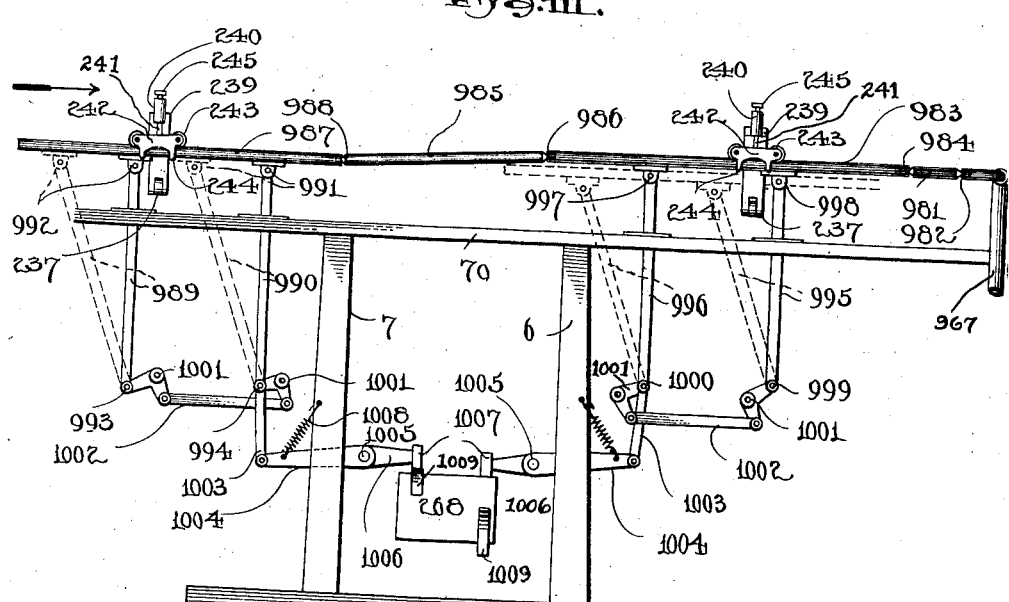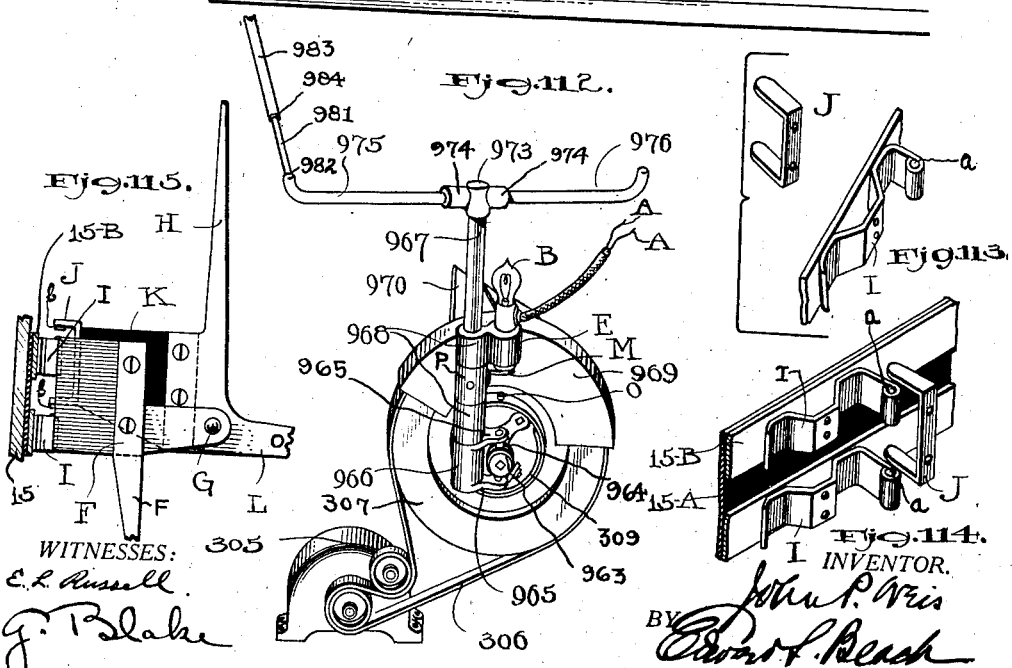

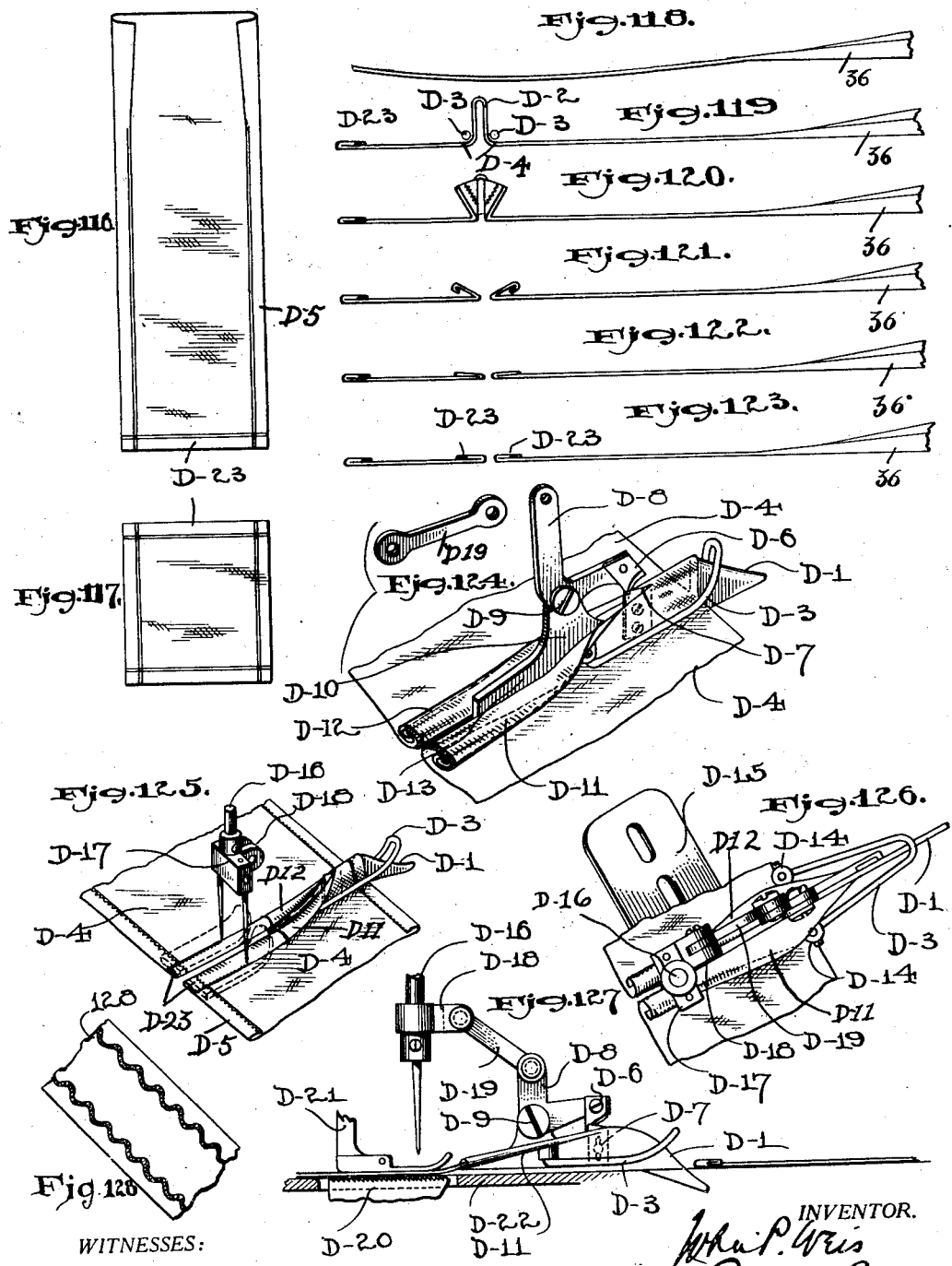

UNITED STATES PATENT OFFICE.

JOHN P. WEIS, OF NYACK, NEW YORK, ASSIGNOR TO LUCIUS N. LITTAUER, OF GLOVERSVILLE, NEW YORK.

COMBINED CUTTING AND SEWING MACHINE.

1,114,082.  Specification of Letters Patent.  Patented Oct. 20, 1914.

Application filed May 29, 1913. Serial No. 770,684.

*To all whom it may concern:*

Be it known that I, JOHN P. WEIS, a citizen of the United States, residing at Nyack, in the county of Rockland and State of New York, have invented certain new and useful Improvements in Combined Cutting and Sewing Machines, of which the following is a specification.

This invention is a cutting-and-sewing machine into which an end of a bolt of fabric, the bolts being frequently from sixty to one hundred and twenty yards long, is inserted and fed to cutting and sewing instrumentalities from which severed end portions or machine products are successively delivered to carrying and stacking mechanisms.

The invention is especially useful in the manufacture of under and other clothing, including union suits; bags and sacks; hemstitched handkerchiefs; napkins; towels; pajamas, etc.; when large numbers of similar products are desired. All the machine operations are continuously automatic, no hand intervention being necessary except in starting and stopping the machine, some of the constituent mechanisms of which may be thrown out of operation when not required in the manufacture of a given product.

The invention comprises, as a very important part, mechanisms for guiding the product-forming end portion of the bolt after such end portion has been sewn, or cut to shape and sewn, to a product-severing mechanism; for holding such end portion stationary while it is being cut off to the desired length; and for accurately and positively delivering the severed product into a work-carrier which stacks the successive products in piles of any desired number.

As described, each of the three sewing machines carries its own electric motor for actuating the drive-shaft of its stitch-forming instrumentalities, and the machine has its main shaft operatively connected with another electric motor. Any of the sewing machines may have applied to it any of the well-known attachments such as for ruffling, binding, folding, tucking, and the like, and the machine is provided with supports transverse to the direction of the feed of the goods for holding cutters and other attachments in the path of the feed of the goods when desired. Each of the three sewing machines mentioned is provided with a cutter operatively adjacent to its stitch-forming instrumentalities; but in some kinds of work one or more of the sewing machines and one or more of the cutters may be omitted. In general each of two of the sewing machines having a common feeding mechanism form a line of stitches in the general direction of the feed of the goods, and the third sewing machine forms a line of stitches transversely to the direction of the feed of the goods. If any one of the sewing machines has its cutter in action, it cuts and sews simultaneously; and by use of interchangeable master pattern cams such cutting and sewing, either or both, is in predetermined lines in consequence of operative connections between the master pattern cams and the cutting-and-sewing machine heads.

Figure 43:
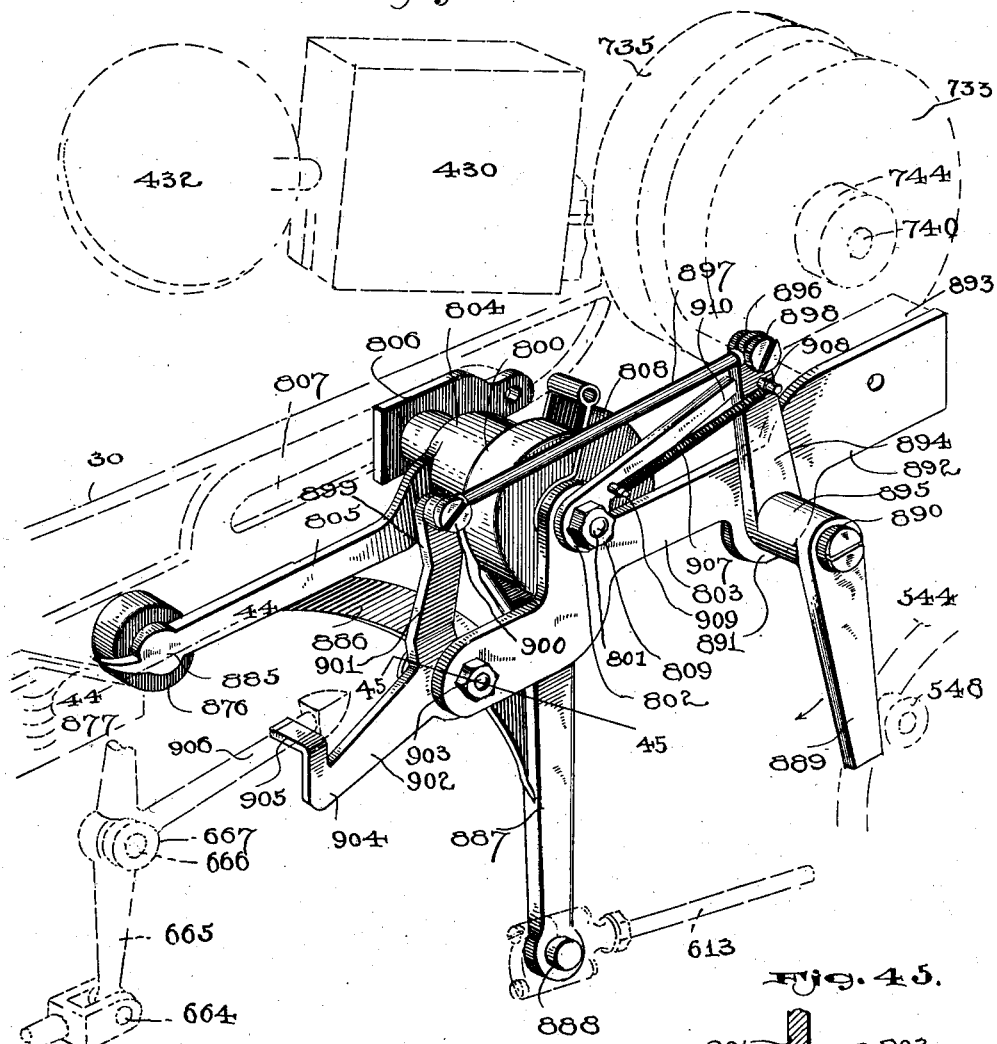
Figure 44:
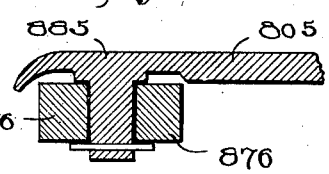
Figure 45:
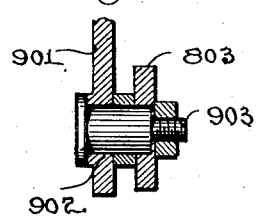
Figures 48, 49, 50:
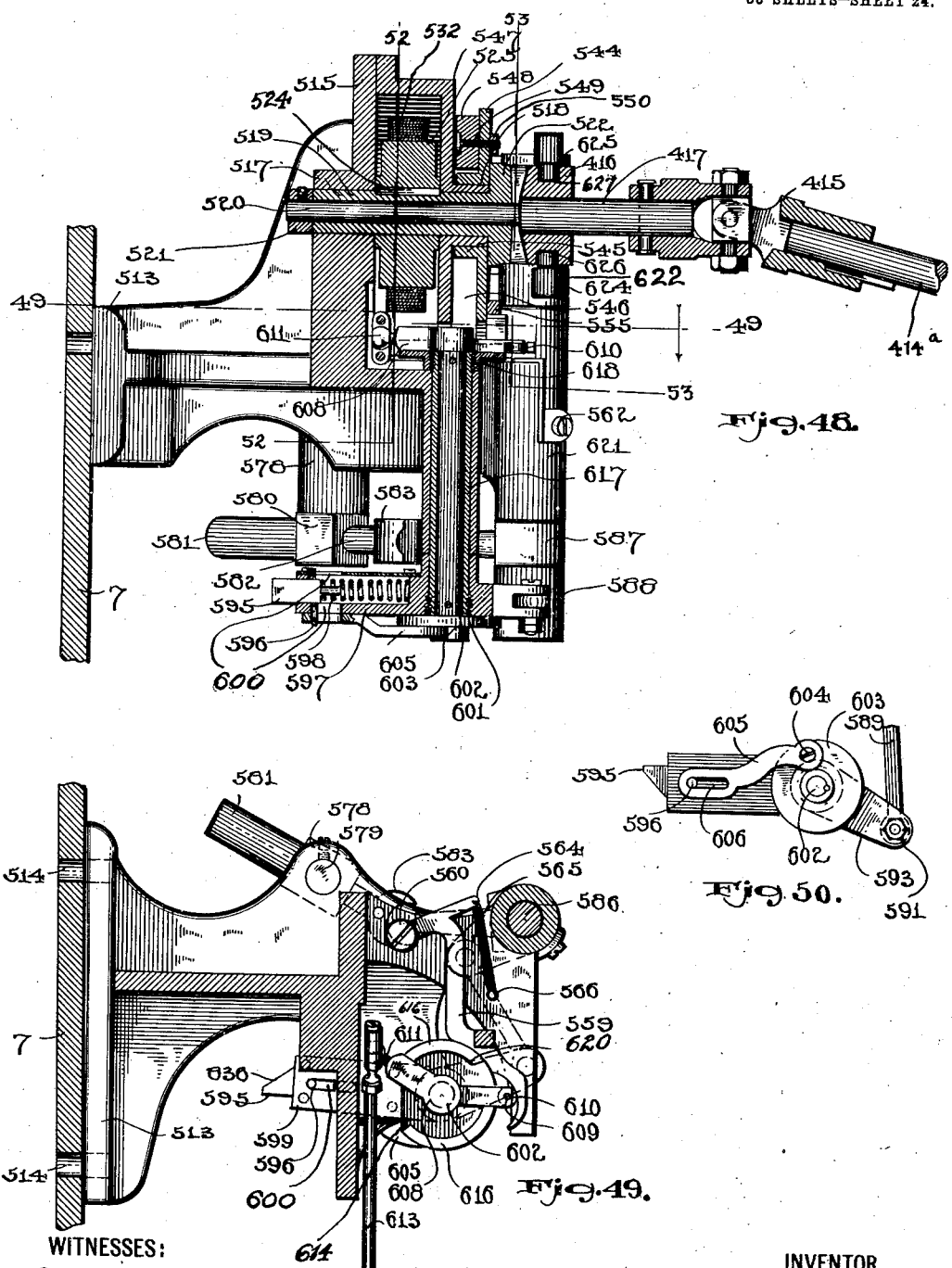

In the accompanying drawings forming a part hereof, Figure 1 is a top plan view of the machine frame carrying electrical conductors, with grid wires and a part of the length-cutting mechanism in place, and showing portions of the work-table's actuating mechanism. Fig. 1ª is a top plan view of the machine from which the cutting mechanism of each of two sewing-and-cutting machines have been removed for greater clearness. In this view the two cutting-and-sewing machines referred to, cut and sew in the general direction of the length of goods passing through the machine. The view also shows a third cutting-and-sewing machine which operates transversely of the line of feed, but for greater clearness omits a portion of the work-receiving table mechanism shown in plan in Fig. 1. Fig. 1ᵇ is a perspective of a portion of one side of the machine looking forward, the transverse cutting-and-sewing mechanism being removed. Fig. 1ᶜ is a side elevation of the transverse cutting-and-sewing mechanism on its supporting tracks shown in Fig. 1ᵇ. Fig. 1ᵈ is a perspective view of a portion of the side of the machine opposite the side shown in Fig. 1ᵇ, looking forward. Fig. 2 is a partial front elevation of the machine, portions being removed for greater clearness. Fig. 3 is a side elevation, partly in section, at line 3—3 of Fig. 1ª, and Fig. 4 is an elevation of the other side of the machine. Fig. 5 is a lengthwise sectional elevation of the machine at line 5—5 of Fig. 1. Fig. 6 is an enlarged elevational view of various mechanisms for operating the sewing machines and other parts from a master cam; partly in section at line 6—6 of Fig. 1ª. This view shows the connection between the trip-ring and the mechanism for actuating the work tables. Fig. 7 is an elevation, partly in section, at line 7—7 of Fig. 2, and shows some of the mechanisms for actuating the machine as a whole, a lower band-saw band-cutter wheel of one of the sewing machines being shown in elevation. This view also shows the master pattern cam in a position of removal or installation. Fig. 8 is a perspective view of any of the three sewing machine heads with a portion of a band-knife attached, and shows a presser foot, needle-bar, and looped mechanism. Fig. 9 is a central sectional view at line 9—9 of Fig. 10, of one of the sewing machine heads provided with a carrier for the upper of two band-knife wheels, with one of which each of the two sewing machines that cut and sew in the general line of the length of the goods is provided. Fig. 10 is a top plan view in the main of what is shown in Fig. 9; but also shows a track upon which two of said cutting-and-sewing machine heads are movably mounted; and also shows in plan a portion of clutch mechanism for control of the main shaft of the machine. Fig. 11 is a side elevation of one of said sewing-machine heads provided with upper and lower band-knife supporting-devices and a band-knife, and also shows certain electrical connections. Fig. 12 is an elevational view, partly in section, at line 12—12 of Fig. 11. Fig. 13 is a diagrammatic elevational view of what is shown in Fig. 11, together with thread-controlling devices and a signal lamp electrically connected with a cutting-and-sewing machine to indicate thread breakages. Fig. 14 is a vertical central sectional elevation at a line corresponding to line 14—14 of Fig. 5, and mainly shows the master cam construction and the levers that are actuated by the master cam to move either or both laterally-moving cutting-and-sewing machines that operate in the direction of the length of the goods on their transverse track. Fig. 15 is a horizontal sectional view at line 15—15 of Fig. 14, and shows the master cam and other operating parts. In this figure the pattern cam is removed forwardly from its operative position as also shown in Fig. 7. Figs. 16, 17 and 18 are detail views indicating movements and devices involved in cutting parallel strips. Fig. 19 is a side elevation of a cutter used in cutting parallel strips, in lieu of the band cutters. Fig. 20 is a view showing in side elevation the weighting of a feed roll, and portions of the cutting-off knives with actuating parts. Fig. 21 is a top plan view of what is shown in Fig. 20. Fig. 22 is a view similar to Fig. 20 showing the cutting-off knives in cutting position. Fig. 23 is a perspective view of the auxiliary feeding mechanism detached. Figs. 24, 25 and 26 are detail views of portions of the auxiliary feeder. Fig. 27 is a perspective view of the work-carrier and its actuating mechanisms, detached. Fig. 28 is an elevational view, partly in section, at line 28—28 of Fig. 27 of the work-carrier. Fig. 29 is a view similar to Fig. 28 but shows the jaws of the work-carrier closed upon a severed article that has been cut and stitched. Figs. 30 and 31 are views of a friction stop for the work-carrier. Fig. 32 is mainly a side elevational view of one of two mechanisms for connecting the work-carrier with opposite horizontal lengthwise-extending side-rails of the machine. Fig. 33 is a sectional view of what is shown in Fig. 32, at line 33—33 thereof. Fig. 34 shows a form perspective. Fig. 35 is a sectional detail of a device for holding the jaws of the work-carrier open or closed. Fig. 36 is an end elevational view of the work-carrier and operating mechanisms. Fig. 37 is a lengthwise elevation, partly in section, of reeling devices for steel tapes used in moving the work-carrier from the front toward the rear end of the machine, and of another device for reeling a third tape which operates the two other reels. The right-hand sectional portion of this figure may be considered as taken at line 37—37 of Fig. 132. Fig. 38 is an end elevational view partly in section at line 38—38 of Fig. 1, and shows interior parts of said device. Fig. 39 is a central section of what is shown in Fig. 38 at line 39—39 thereof. Fig. 40 is a perspective view of a portion of one of the steel-tape devices used in reciprocating the work-carrier. Figs. 41 and 42 are end views of spools for carrying said steel tapes. Fig. 43 is a perspective view, partly in full and partly in dotted lines, to show the arrangement of devices for closing the work-carrier jaws and for operating a reeling device for a tape which actuates a rearward shaft for winding up a pair of steel tapes used in moving the work-carrier toward the rear of the machine. Fig. 44 is a sectional detail at line 44—44 of Fig. 43, and Fig. 45 is a sectional detail at line 45—45 of Fig. 43. Fig. 46 is a perspective view of the reeling mechanism for the actuating tape referred to in connection with Fig. 43. Fig. 47 is a perspective view of a trip-lever forming a part of the mechanism shown in Fig. 46. Fig. 48 is a sectional view of parts shown in Fig. 46 at line 48—48 thereof. Fig. 49 is a sectional view at line 49—49 of Fig. 48, showing in elevation the trip mechanism in its normal position. Fig. 50 is a bottom view of a latch construction used in operating the work-carrier clutch. Fig. 51 is a view similar to Fig. 49 but showing the trip mechanism in its released position. Fig. 52 is a sectional detail at line 52—52 of Fig. 48. Fig. 53 is a sectional view at line 53—53 of Fig. 48, and illustrates the actuating tape-winding mechanism for the work-carrier. Fig. 54 (Sheet XII) is a perspective view of a stop lever with which each cutting-and-sewing machine head is provided. Figs. 55, 56, 57, 58, and 59 are detail views of a clamp operating upon a tape which opens the jaws of the work-carrier, Fig. 55 being a section at line 55—55 of Fig. 58, and Fig. 56 being a section at line 56—56 of Fig. 57. Figs. 60 and 61 are respectively sectional and end-elevational details of the device which winds up the tape that opens the work-carrier jaws. Fig. 62 (Sheet XVI.) is a view showing trip mechanism for operating the cutting-off knives, and partly in section at line 62—62 of Fig. 63 looking in the direction of the arrow in Fig. 63. Fig. 63 is an elevational view, partly in section at line 63—63 of Fig. 6, and mainly shows mechanisms for actuating the cutting-off knives. Fig. 64 is a perspective view of part of the actuating lever for the movable cut-off knife. Fig. 65 (Sheet XVII.) is a sectional detail of a cam-rod device for raising the auxiliary feeder from the work when the cutting takes place. Fig. 66 (Sheet XXX.) is an elevational detail showing how the cloth-guiding spreader is supported by rollers. Fig. 67 (Sheet XXVII.) is a detail elevation, partly in section, at line 67—67 of Fig. 1ª, and shows the main feed rolls; the auxiliary feeder; the stationary horizontal clamp plate; the movable clamp plate; the movable and stationary length-cutters; the flap controller; the finger plate or kicker; the rake; and the jaws of the work-carrier with a piece of goods in place to be operated on by said mechanism, the jaws being closed on the goods and the jaws being each operable across the width of the goods. Fig. 68 is a lengthwise sectional detail of one of the telescopic rods connecting a master-cam lever with a cutting-and-sewing machine. Fig. 69 (Sheet XXVI.) is a perspective of the flap-control grid detached. Figs. 70 and 71 (Sheet XXVI.). Fig. 70 is a perspective view of a device used in closing a clutch forming part of the work-carrier mechanism. Fig. 71 is a sectional detail at line 71—71 of Fig. 27 showing an anti-friction bearing for the work-carrier. Figs. 72, 73 and 74 (Sheet XXVII.). Fig. 72 is a partial section at line 72—72 of Fig. 73 of the calibrated end of the master-cam connected with a segmental cam for operating the stop-motion of the sewing mechanism. Fig. 73 is a plan of what is shown in Fig. 72. Fig. 74 is a view of the concave side of the segmental cam shown in Fig. 72. Fig. 75 (Sheet XXVIII.) is a side view of mechanism for cutting the sides and centers of work. Fig. 76 is a view showing cutters in work and a tubular piece of goods with a detachable work-spreader within the tube, and guiding devices. Fig. 77 is a perspective view of the cutting mechanism shown in Fig. 75. Fig. 78 is a detail view of a roll and lever forming part of the cutting mechanism shown in Fig. 75. Fig. 79 is a view similar to Fig. 75, but shows a top rotary cutter and a gear mechanism connected with the pitman rod of the top rotary-cutter carrier. Fig. 80 is a top plan view of the rotary cutter mechanism detached, and connected with a flexible shaft for rotating the cutters. Figs. 81, 82, 83 and 84 are views of change-speed gear-mechanism for the main feed and for the work-carrier, Fig. 81 being an end view of the change-speed gear-case and contents, Fig. 82 being a top plan view, Fig. 83 showing different positions of the change-speed gear members, and Fig. 84 being a sectional detail at line 84—84 of Fig. 81. Fig. 85 (Sheet XXX.) is a perspective view of the work-spreader which is manually adjustable for tubular goods at the front of the machine. This appliance is a useful adjunct in operating my new combined cutting-and-sewing machine with many classes of goods, and is useful otherwise than in connection with my machine. Fig. 86 is a top plan view of the work-spreader in closed position. Fig. 87 is a detail of its locking joint construction, and Fig. 88 is a sectional detail at line 88—88 of Fig. 85. Figs. 89 and 90 (Sheet XXXI.) are different views of a thread-carrying needle with a knife attached to the needle-holder. Figs. 91 and 92 show underclothing work in which openings are provided with the body of the goods, which openings are cut by the knives attached to the needle-holders. These knives are especially useful in cutting drawers and union suits. Fig. 93 is a sectional view showing cutting knives in coöperation with the hinged work-spreader shown in Fig. 86, with work in place. Fig. 94 illustrates union suit work done by my new machine. Figs. 95 and 96 show details of cutters for slitting tubular goods during their progress through the machine. Fig. 97 illustrates another class of work which may be done by my machine, in the manufacture of bags from flat material folded upon itself as shown. Figs. 98, 99 and 100 (Sheet V.) are views of devices located on the machine for grinding the band knives carried by the cutting-and-sewing machines. Fig. 101 (Sheet XI.) is a sectional view at a line corresponding to 101—101 of Fig. 8, and shows particularly the mounting of one of two supporting wheels with which the sewing-machine head is provided. Fig. 102 is a diagram representing the different positions of the eccentric stud bolt whereby adjustment of the wheel such as shown in Fig. 101 is obtained, relatively to the supporting tracks for the cutting-and-sewing machine; the wheel being journaled on the eccentric stud bolt. Figs. 103, 104 (Sheet XII.) are respectively perspective views of a face plate and band-knife guard removed from a sewing-machine head. Figs. 105, 106 (Sheet XIII). Fig. 105 shows a band-knife wheel and its carrying fork (a bicycle wheel type) removed from the machine. Fig. 106 shows a sewing-machine-head-supporting track with insulated electrical conductors attached thereto. Figs. 107, 108, 109 and 110 (Sheet XIV.). Fig. 107 is a perspective view looking from the front of a part of one of the sewing-machine arms or goose-necks. Fig. 108 is a plan of the stop-motion shown in Fig. 54. Fig. 109 is a perspective view of the eccentric stud, detached, of the wheel shown in Fig. 101. Fig. 110 is a face view of the wheel and stud illustrated in Fig. 101. Fig. 111 is a diagrammatic view illustrating the action of the actuating mechanism for the stop motion of the cutting-and-sewing mechanisms. Fig. 112 is a perspective view of a fly-wheel clutch pulley and main-shaft starting lever, and a thread-breaking signal-lamp, with which the machine is provided. Fig. 113 is a detail perspective view of pieces and parts of electrical connections used in the crosswise reciprocation of each cutting-and-sewing machine. Fig. 114 is a perspective view showing how such electrical connections operate. Fig. 115 (Sheet XXXII.) shows a thread-controlled switch for the automatic stop-motion. Fig. 116 is a plan view of a piece of fabric partially hemmed. Fig. 117 shows a completed hemstitched handkerchief or the like. Fig. 118 shows the work of Figs. 116 and 117 is side elevation as it is folded to form side hems when passing through the machine. Fig. 119 shows how the work is looped up to provide free material for forming two oppositely disposed hems. Fig. 120 shows how the looped-up portion of the work is severed and the edges raised divergingly one from another for entering into a folder. Fig. 121 shows the work as it enters the folder near the stitching instrumentalities and having its ends in-turned and about to be placed on the edge of the work. Fig. 122 shows the hems flattened down upon the work ready for stitching. Fig. 123 shows completed hems. Fig. 124 is a perspective view of the combined folder-and-slitting attachment. Fig. 125 is a detail showing the relative position of the needles to the presser foot, folder and work. Fig. 126 is a top plan view of the folder mounted on the machine and connected to the needle-operating devices for actuation of the slitter. Fig. 127 is a side elevation of a needle-bar, presser foot, under-feed dog, and folder, in operation upon the work. Fig. 128 shows a piece of fabric formed with edges scolloped and sewn by the machine. Fig. 129 is a diagrammatic perspective of the automatic stop-motion, showing the light and the magnet. Fig. 130 is a perspective of the thread-controlled circuit-breaker. Fig. 131 is a perspective of the slotted end of the telescopic rod shown in Fig. 68. Fig. 132 is a diagrammatic view of the steel tapes for reciprocating the work-carrier and closing the carrier jaws on the work. The left-hand end of this figure shows, one above the other, two tape-reeling casings or chambered enlargements which are in fact on the same end of the same shaft, the displacement being made for greater clearness.

It is to be understood that my new combined cutting-and-sewing machine involves various parts and attachments not all of which are actively employed or need to be on the machine for some particular kinds of work or products to be produced. Thus generally speaking, the cutting-and-sewing machine that operates across the width of the goods is not required in action during the manufacture of undershirt, underdrawer, and union suit parts. On the other hand, in the manufacture of square or rectangular articles, such as hemstitched handkerchiefs, towels, napkins, and the like, all three cutting-and-sewing machines are put into action during the progress of the goods through the machines. In the manufacture of bags, one or more of the cutting-and-sewing machines are brought into action, depending upon the mode in which the bag is produced.

The machine is so constructed that the levers which connect the master cam with the two sewing machines which sew in the direction of the length of the goods may be either or both thrown into action so as to operate upon either one or both side portions of the strip of goods fed endwise through the machine. If desired, these levers may either or both be detached and the sewing-machine heads actuated by them may be either or both clamped stationarily on the transverse track on which they otherwise reciprocate.

Referring now to the form of the invention illustrated in the drawings, the machine frame (Fig. 1) comprises a base 1, from which parallel uprights 2 and 3 project on one side of the machine and from which the parallel uprights 4 and 5 project at the other side of the machine, the members of each set of these uprights being spaced apart. The inward ends of uprights 2 and 3 are connected to a vertical frame piece 6, and the inward ends of the uprights 4 and 5 are connected to a vertical frame-piece 7, the frame pieces 6 and 7 forming side portions of the frame and being parallel, spaced apart, and vertically recessed from their upper edges downwardly. Such recesses are in line with the transverse spaces 80, 81 and 82 (Fig. 1). The front end of the frame (see Figs. 3, 4 and 5) carries a pair of upwardly and forwardly extending parallel arms 8 and 10 spaced apart and supporting a transversely extending fabric-tensioning mechanism and other parts. These arms are secured to the frame at 11 and 12, and a transverse tie-rod 13 connects arms 8 and 10 at their upper ends. A transverse brace 14 connects the frame sides adjacently to the transverse space 81 and between the upper ends of frame pieces 6 and 7. A transverse track-bar 15 for supporting one or more cutting-and-sewing machines which operate in the direction of the length of the goods, extends at the rear side of the transverse spaces 80, 81 and 82, and one or more sewing machines are slidably mounted on such track, the track projecting on both sides of the machine frame and extending entirely across the machine. Parallel with track 15 and rearwardly thereof, a transverse tie-bar 16 connects the frame pieces 6 and 7. The machine frame just described is rearwardly attached at 17 to a box-like foundation 18 for the work-table mechanism at the rear end of the machine, the forward upper corner of foundation 18 supporting a transversely extending track 19, the ends of which project laterally at each side of the machine. Track 19 is at a level lower than that of track 15 and is for guidance of laterally reciprocating work-receiving tables. From the rear end of foundation 18 a pair of parallel side arms 20 spaced laterally apart, extend rearwardly and upwardly, being bolted to the foundation 18 at 21; the side arms 20, by means of bolts 22 and 23 respectively, are connected to the lengthwise-slidable uprights 24 and 25, one terminating in an enlargement 26 and the other in an enlargement 27. These enlargements are transversely connected by a transverse tubular shaft 28 to the opposite ends of which the parallel, laterally-separated side-rails 29 and 30 of the machine are respectively connected at their rear ends. At their front ends the side bars terminate respectively in enlargements 31 and 32, and are hinged severally as at 33 to a side frame piece 6 or 7. By adjusting the slotted uprights 24 and 25 relatively to the clamp-bolts 22 and 23, the side-bars and parts carried by them may be accurately leveled in installing the machine, the side bars being tippable on their hinges. In the upper part of foundation 18 there is a horizontal bracket 35 for supporting the work-table operating-mechanism.

*Tensioning mechanism.*—The bolt or strip of goods is most conveniently fed from a roll, although this is not essential. As shown, 36 indicates a roll of material suspended in the fork formed by the front arms 8 and 10 (Figs. 1ª, 3 and 4).

37 indicates vertical slots in the upper ends of arms 8 and 10; 38 a roll upon which the material is rolled. The weight of the roll 36 is carried by a roller 39 preferably, and the material is passed forwardly and over roll 40, also supported by portions of arms 8 and 10. Roller 39 is driven by a belt 41 from its pulley 42, and roller 40 is driven by a belt 43 operating on its pulley 44 which effects rotation of the rollers to draw the material from roll 36. The material is passed through the tension device 45 which is provided with a plurality of transverse rods 46 between which the material is laced, thereby creating a suitable tension on the material. Tension device 45 is pivotally secured to lugs 47 and 48 and may be adjusted to any desired angle by an adjusting rod 49 provided with a clamp 50 to secure the rod in place. The transverse rods 46 are detachably secured in the tension device so that they may be withdrawn quickly to facilitate the lacing of the material. Belts 41 and 43 are driven by wheels 51 on shaft 52. The belt 53 drives the shaft 54 (provided with a roller 55) that is supported by arms 8 and 10, its bearings being secured between lugs 56 and 57. Bevel-gear 58 secured to shaft 52 coöperates with a bevel-gear 59 secured to the shaft 60 in bearings 61 and 62, and bevel-gears 63 coöperate to transmit power from the shaft 64 to the shaft 60. Shaft 64 is mounted in bearings 65. The bevel-gears 66ª secured to the shafts 64 and 67 (Fig. 4), together with the parts just described, form a connection between the rollers 39 and 40 with the under main feed roller 69, the shaft of which is provided with a bevel-gear 68 which meshes with another bevel-gear 68 on the shaft 67. The tensioning mechanism, main feed mechanism, the auxiliary feed mechanism, and the rake mechanism to be described, together with the transverse cutting-off or length-forming mechanism to be described, are each operable transversely of the fed strip and across the width thereof.

*Goods differing in width,* (Figs. 1ª and 4).—Secured to frame parts 2, 4 and 6, 7, is a table 70 which extends from side to side of the machine and has secured to its top a plate 71 provided with two slots 72. The guide rollers 73 are mounted on studs adjustably clamped into slots 72 and collars surround the studs underneath the rollers 73 and have indicator points 74 projecting outward and registering with the graduations provided along the front edge of the plate 71. These graduations represent different widths of material and facilitate the setting of the guides 73ᴬ.

Adjacent to plate 71 is a plate 75 hinged to the table at 76. This plate overlaps and closes up a portion of the gap formed in front of the two cutting and sewing mechanisms while they are at work, and may be swung back upon the hinges for threading;

oiling or making adjustments. Secured to plate 75 there is a plate 77 having graduations and guide rollers 78 (Fig. 3) mounted on studs for adjustment to different widths of material. Said plate 75 supports an anti-friction roller 79 (Fig. 7) which carries a portion of the weight of the material as it passes through the machine. The rollers 73 and 78 are positioned to coact with a graduated spreader as shown in Figs. 85 to 88 inclusive. This spreader is an appliance useful especially with tubular goods.

*The cutting-sewing mechanisms.*—The spaces 80, 81, 82 between the frame parts 2, 3 and 4, 5 form a path for the two cutting-and-sewing machines, generally indicated by 85. The sewing machines, although one is a right and the other a left-hand machine, are otherwise the same; therefore detailed description of one machine will be sufficient. Any of the well-known stitch-forming mechanisms may be adapted for use in this machine by those skilled in the art (Fig. 8). The sewing machine comprises the usual overhanging hollow arm 85 terminating in a head 86 which carries the usual needle-bar 87 and needle-holder 88. The foot 89 is secured to a short bar 90 which is held rigidly in the head 86 by means of a set-screw 91. The face plate 92 covers the opening in the end of the head. Secured to the face plate is a guard 93 covering a portion 94 of an endless band-knife. The ears 97 each having an aperture 98, support the fork of the top band-knife wheel 149. 100 is a cap fitted over the top of the machine trunk to cover a rectangular opening therein. This will be described in connection with the stop motion.

101 are thread-guiding eyelets. Apertures 102 hold thread-guides and are described in connection with the stitching mechanism. 103 is a supporting bearing and 104 a slot for the stop-motion lever. The arm 85 is provided with a rib 105 adjacent to which is the opening 106 (see Figs. 8 and 11) in which operates the band-knife and which acts as a housing for the same, the wall 107 of the trunk 108 extending out beyond the same (see Fig. 10).

Integral with trunk 108 and rib 105 is a base 109 provided with apertures 110 and supports 111. The top of the base 109 terminates in a track groove 112 extending along the back of the base from end to end and fits on track 15. The depending web 113 terminates in the housings 114 and 115, each of which is bored at 116 to receive an eccentric stud bolt 117 upon which is mounted for rotary movement a wheel 118 journaled on the body 119 of stud 117 having a head 120. Nut 121 on the free end of 117 holds the parts in place. By rocking the eccentric stud bolt 117, one for each wheel 118, the axial relation of the wheels may be slightly varied with reference to the depending web 113 to compensate for slight constructional variations in the distance between the track 15, engaged by the track groove 112, and the lower track 126. This slight adjustment is also somewhat serviceable for regulating or distributing the weight of the sewing machine heads between the two tracks 15 and 126. The wheels operate in the housing 122 of bearings 114 and 115. The apertures 123 each receive a screw 124 and locknut 125 to hold the wheels in position. At the ends of the screws 124 are gibs 125ª (Fig. 101), affording means to adjust the lateral movement of the sewing machine relative to the transverse bottom track 126. Web 113 terminates in a rib 127 extending at right-angles thereto and cut out at 128 to accommodate an electric motor. Opening 129 in web 113 is for passage of a driving belt extending from the motor to the drive-shaft 200 of the cutting-and-sewing machine and to permit electrical contact shoes, described hereinafter, to project through web 113. Apertures 130 are for attachment of electrical contact shoes. Depending hanger 131 of base 109 terminates in a housing 132 for gear 182 and the aperture 133 receives a shaft of the bottom band-knife wheel. Opening 134 is to permit the bevel-gear 183 to be inserted while the flange 135 of the housing 132 serves as a protector for the large bevel-gear 182 carried by the bottom band-knife wheel 180.

Looper shaft 136 (Fig. 9) is supported in base 109 by bearings 137. Adjusting-screws and lock-nuts 138, 139 are tapped in supports 111, while the screws are secured in the apertures 110. The drive-shaft 200 extending in hollow arm 85 is supported by bearings 140 held in a fixed position by the screws and lock-nuts at 141 extending up through the arm, and by lock-nuts and screws at 142 passing down through the arm.

The end plate 143 is secured to the trunk 108, and affords a bearing 144 for the end of the drive-shaft. The aperture 99 receives the nut 145 tapped to receive a screw-threaded stem 146 of the lever-adjusting screw 147 which has a ball seat 148 in an arm 162 of fork 151 which carries the top band-knife wheel 149 (Figs. 11 and 12), having a hub 150 secured in the fork 151 by nuts 152. The fork terminates in the yoke 153, provided with two conical sockets 154, one on each side of the hub, above the aperture 95 and between the ears 97 in which are registering apertures 98. The yoke is held in place by the conical screws 155 which pass through the apertures 98 into the conical sockets 154.

Adjacent to the yoke 153 is a hole 156 which receives a wooden plug 157 slotted so that the band-knife may travel therein as at 158 (see Fig. 11). The lever arm 159 has a similar slotted plug 160. Screws 161 hold in place the plugs which may be adjusted to suit the path of travel of the band-knife, and act as a guide for the same to overcome vibration. The top band-knife wheel frame may be removed (Fig. 105) by loosening the nuts of screws 155 which fit in the conical seats 154, and turning tension screw 147.

*The motors*, (Figs. 2, 11 and 12.)—An electric motor 164 is attached to a bracket 165 of each sewing-machine frame, the bracket having a concave portion 166 attached to the rib 127 and in which the body of the motor rests (Figs. 3 and 4). The conductors 167 leading from motors 164 each carry an electric connector 168 for a socket 169 (Fig. 2), which sockets are respectively located with reference to the travel of a motor 164, so that the length of the conductors 167 may be as short as possible and yet sufficient in length to permit each motor to move to its fullest extent without disconnecting conductors 168 and socket 169. The purpose of this connector is to facilitate the changing of one machine for another when, for instance, certain kinds of work require a lock-stitch-forming mechanism whereas another may require a chain-stitch or overstitch mechanism. To remove one of these sewing mechanisms it is simply necessary to detach the connector 168 from its connector socket 169 and slide the sewing machine off its supporting tracks.

Secured to the motor shaft 170 (Fig. 11) there is a belt wheel 171 for driving belt 172 and transmitting power to the sewing-machine drive-shaft 175. Wheel 171 has a long hub 173, the bore of which is enlarged to receive the end of sleeve 174 which connects motor shaft 170 with shaft 175 by means of a coupling 176 secured to shaft 175 at 177 and to the sleeve 174 at 178.

*The band-knife construction.*—The band-knife 98ª travels in belt fashion around wheel 149 down past and close to the needle 179, and around the bottom wheel 180 which is carried by a hanger 131 and web 113 (Fig. 12) and is secured in position by shaft and nuts 181. The arrangement and construction of the lower wheel is identical with that of the top wheel except that the bevel-gear is secured to the hub at 183 which coöperates with a pinion gear 183ª transmitting power from motor 164 to wheel 180, and by means of the endless band-knife to the wheel 149. It is frequently desirable to remove and replace the band-knives, and shaft 175 is made independent of shaft 170, the shafts being coupled by the sleeves 174 and 176 so that by loosening the screws 177 and 178 respectively the coupling may be slipped back as shown by the dotted line position 184, which shows an opening between the ends of two shafts for removal and replacement of the band-knife or cutter. 185 indicates anti-friction bearing for shaft 175 secured to the hanger 131 by the cap and screws 186 (Fig. 11).

*Clutch starting and stopping device.*— Belt 172 gives rotary motion to wheel 187 which forms a part of the positive clutch 188. Any of the many well-known stop-motions may be used in lieu of this construction. (Fig. 9.)

*Looper mechanism*, (Fig. 9.)—Adjacent to the bearing 144 is an eccentric 189 giving movement to the connection 190 by means of the usual strap surrounding the eccentric, which is connected with the ball stud 191 secured to the bell-crank lever 192 by the socket 193. The lever 192 is pivotally hung in the trunk of the machine arm at 194. The end 195 is connected for free movement by screws fastened to the collar 196 which is placed on the shaft 136 between the collar 197 and collar 198 which terminates in an upright arm 199. The drive-shaft 200 has secured to it an eccentric 201 operating in the fork 202 which is secured in the trunk of the machine arm by the stud-screw 203, and moves freely thereon. The end depending below the stud-screw is also forked and coöperates by means of a block swiveled on a screw operating within the fork, as at 204, to give movement to the looper shaft 136 for rocking the looper 205 which is secured to the end of the shaft at 206 while the eccentric 189 gives movement to the connection 190 and bell crank 192 by means of its end 195 which is connected to the collar located between collars 197 and 198.

The looper shaft is reciprocated endwise causing the looper to move from one side of the needle to the other so that the loop of needle thread is entered by the looper in one movement and a loop of the looper thread is entered by the needle on the other movement, making the well-known two-thread Glover & Baker chain stitch.

*Needle-bar, looper-threading, thread-tensioning, and clutch for stopping and starting sewing instrumentalities.*—The needle-bar 87 is endwise reciprocated in its bearings 86 in the machine-head by means of shaft 200 having secured to its end at 207 a crank-pin 208 operating a slide-block in the yoke 209, as will be readily understood by all skilled in the art without particular description. The needle-thread 210 (Figs. 11, 12 and 13) extends from the needle eye to the eyelet carried by the needle-bar at 211, thence to the adjustable eyelets 212, thence to eyelet 213 spanning the opening in which the band-knife travels, thence to the eyelet 214 passing through the tension 215 which is of the automatic releasing character, thence through eyelet 216 to the thread-tension 217 to the supply 218 carried by bracket 219 secured to rod 220 carried by the arm 221 which is secured to the trunk of the sewing machine at 222 (Figs. 3 and 4).

The looper-thread 223 extends from the eye of the thread-carrying looper through an eyelet in carrier 206, through an eyelet at 224, thence through the tension at 225, then through a stud eyelet 226, thence to the supply 227 which is supported by bracket 228 secured to hanger 131 at 229.

Mounted in the opening 104 (Figs. 6, 8, 4, 11) is a stop-clutch lever 230 for operation on shaft 231. The rear end 232 of lever 230 has an eyelet which engages the pull spring 233, an end of which is secured to cover 100 at 234 (Fig. 9) and normally holds the clutch lever in engagement with the clutch dog 188$^a$ (Figs. 6, 9, 10 and 111). Tooth 235 is secured on the lever for cooperation with the clutch-dog to cushion the blow when stopping the moving parts. Said lever is provided with a portion 236 to coact with a plunger 241 (Fig. 6) which is located within the tension 215 so that each time the stitching mechanism is stopped the tension is automatically opened. Secured to the end of the lever at 237 is a vertically extending bracket 238 terminating in an overhanging end 239 having a socket 240 in which is located the plunger 241, pivotally secured to which is a bracket 242 that carries two wheels 243 which slide on a transverse member 983 in the case of one of the cutting-and-sewing machines and 987 in the case of the other (Figs. 1$^a$ and 111). A portion 244 of the bracket extends downward below the wheels (Fig. 6). Located in the socket on the top of the plunger is a compression spring which is held under tension by the nut 245 which is tapped in the socket and has a sleeve extending downward to exert tension on the bracket carrying wheels 243. The reduced stem of the plunger is threaded to receive a nut at 247 that limits the downward movement of the plunger under tension of the spring.

By means of the mechanism just described the sewing machine can be stopped and started as desired, as is described in detail hereafter.

*Adjustment of cutting and sewing devices.*—Rib 127 has an opening 248 (Figs. 11, 12) on two sides of which are projecting ears 249 provided with screw-receiving holes 250 for conical pointed screws and lock-nuts 251 for holding the swivel-block 252 which is freely secured to the hub of a hand-wheel 253, the hub of which is tapped to receive the screw-threaded end of rod 254. This rod connects with a tubular rod 255 telescoping therein, and affords a means of adjustment to make the rod long or short by means of a clamping nut 256 on the threaded end of the tube which is slotted so that as the nut is tightened the rod 254 is gripped and held rigidly to make the rod and tube substantially one piece. Secured in the end of the tube is a slotted head 257, the slot engaging the body of a bolt 258 (Fig. 14). This telescopic connection and hand-wheel 253 which is pivoted on the conical screws 251 permits the end 257 to be moved up and down as desired. The slot and telescopic construction permits adjustments of each cutting-and-sewing machine that cuts and sews in the direction of the length of the goods with levers controlled by the master cam, each of these levers 261 having a row of the bolt-holes 267 arranged one above the other in the direction of the length of the lever whereby each cutting-and-sewing machine in its transverse reciprocation on its tracks is given automatic movement the extent of which is regulable. Moreover this construction permits easy disconnection of one or both cutting-and-sewing machines with the master-cam so that either or both such machines may be located in any desired stationary position on their transverse track. The rod may be adjusted to any desired length without disconnecting it from the tube. Fine adjustments may be quickly made by turning the hand-wheel 253 to move the screw-threaded rod in or out as may be desired to cause the cutting-and-stitching mechanism to operate on any desired line with accuracy.

*Master cam and connections* (Fig. 14).—Secured to base 1 between frame portions 6 and 7 are brackets 259 supporting shafts 260 secured to each of which is a lever 261 which extends upward and is provided with a stud 262 carrying a roller 263 that coöperates with a groove 264 of the pattern-determining or master cam 268. These grooves represent any reduced or miniature form of desired designs. As shown in Figs. 14 and 15 and Figs. 72, 73, 75 and 79, the master cam is cylindrical, and is preferably made in sections as shown in Figs. 75 and 79. The sections are held in position by the bolts 265$^a$. The rollers 263 following the grooves 264 give movement to the levers 261, the upward portions 266 of these levers being provided with holes 267 to receive the clamp bolts 258. An end of the master cam is centrally bored at 269 to receive the pin 270 through the bearing 271. A collar 272 limits inward movement of the pin, the reduced extension 273 of which has secured to it a hand-wheel 274. Another hand-wheel 275 is secured to a pin 276 having a collar 277 and extending through bushing 278 which is rotatably mounted in bearing 279 and is held from endwise movement by its head 280 and the hub of gear 281 of which the bushing 278 is a part. Bushing 282 is pressed into the cam to reduce the size of the central hole for the other end of the master cam for receiving the pin 276 which enables the bearing 279 to carry the bushing 278 without greatly increasing its size. The pins constitute shafts or trunnions on which the master cam rotates. Bearings 271 and 279 are a portion of bracket 283 which is secured to base 1. Passing through gear 281 which is clamped to an end of the master cam roll are two bolts 284 each having an elongated curved head 285 (Fig. 7). This gear is provided with two bosses 286 each slotted to correspond with a head 285 (Figs. 7 and 15). Heads 285 work in the grooves 286. Master cam roll 268 has its end which is adjacent to the gear correspondingly slotted at 287 and provided with a ring 288 which forms a wall of the annular slot 287 in which a head 285 of a bolt 284 is received to couple the master cam 268 and its driving gear 281.

To remove the master cam 268, which is also a pattern cam, the nuts 289 are loosened and the bolts 284 drawn outward. Their heads 285 register with the recesses in the bosses 286 and the pins 270 and 276 are also pulled outward from the central bore of the master cam, allowing the latter to rest in the recesses 291 of the arms 290 so that it may be disengaged from gear 281. At the lower left-hand portion of Fig. 7 the master cam 268 is shown in a removed position.

The bracket 283 has a bearing 292 carrying an intermediate gear 293 on stud 294 and held thereon by nut 295. This gear meshes with gear 281 and a gear 296, secured to transverse shaft 297 which is supported in bearings 298 and 299. Secured to an end of shaft 297 there is a trip-ring 300 having a crank 958 (Fig. 3) secured to it at 301 (Fig. 15) by means of a bolt 302. At the opposite end of shaft 297 is a worm gear 303 fixed to the shaft and meshing with the worm 304.

The driving power for the machine as a whole is provided by a motor 305 (Fig. 2) and belt 306 leading to the wheel 307 on main shaft 308, wheel 307 rotating freely on the main shaft and provided with a friction clutch 309 (Fig. 112). Frame member 3 has a lug 310 provided with a bearing for the main shaft which extends through the machine (Figs. 1 and 5). Fixed on the main shaft and located at 311 (Fig. 1) there is a bevel gear 312 (Fig. 1ª) meshing with the bevel gear 312A which is secured to the vertical shaft 313 mounted in bearings 314 (Figs. 1ª and 4). Worm 304 on shaft 313 meshes with worm gear 303 operating in an oil bath at 315. This mechanism effects rotation of the pattern or master cam from shaft 297 through the gears 296, 293, 281 (Fig. 15).

Adjacent to frame pieces 7 where the main shaft projects, the shaft carries the knife tripping cam 316 (Fig. 62) which rotates continuously with the main shaft in the direction of the arrow shown.

*Cut-off mechanism and connection with master cam.*—317 indicates a movable transverse cutting-off knife for use in severing the material into desired lengths (Figs. 20, 21 and 22). This knife is secured to the knife-frame 318 carried by rock-shaft 319 journaled in bearings that are adjustable by means of the thrust-screws 320. Knife 317 coöperates with a stationary knife 321 (Figs. 5 and 20) which is supported by the brace 16 extending from frame piece 6 to frame piece 7. Knife-frame 318 is provided with three bearings 322 (Fig. 1) secured to shaft 319. A depending knife-actuating lever 323 has a projection 324 (Figs. 62, 63 and 64) which coöperates with the roller 325 carried by an end of the lever 326 which carries another roller 327 that coöperates with the trip-cam 316.

Lever 323 is fixed on the knife-shaft 319 and lever 326 is pivoted at 335 to the trip-lever 339. These parts are held in position of rest by a spring 328 attached to the lever 323 and to the frame piece 7 pivoted to which at 329 is a lever 330 having a roller 331 which also coöperates with cam 316. Connected to the lever end 332 is a link 333 the other end of which is connected at 334 to the knife lever 323. The lower end of lever 326 has an extending lip 336 (Fig. 6) which limits the movement of the lever 326 in one direction by contact with the adjusting screw 337 which is located in position by a nut 338. Lever 339 extends upward and carries a block 340 adjustably secured thereon by a bolt 341 which affords a means of adjusting the block laterally with regard to the lever. The hub 342 of this lever is pivoted on the stud shaft 343.

Trip-ring 300 is provided with one or more notches 344 which receive the block 340 so as to move the levers 339 and 326 and thereby move the roller 327 into and out of the path of knife-tripping cam 316. As soon as a notch 344 reaches block 340 the spring 346 (Fig. 62) connected with the frame and the lever 326, causes the block 340 to enter the notch, permitting the levers 326 and 329 to assume the full-line position shown in Fig. 63 and bringing the roller 327 in alinement with cam 316, at which time it is actuated to the full-line position shown in Fig. 62, causing the knife 317 to move downward and cut the work to length (Fig. 22). As cam 316 passes roller 327 it has a counter movement on roller 331 for positively returning knife 317 to its position of rest. The trip-ring is provided with notches diametrically opposite and each notch represents a cut-off position, the knife 317 being actuated to cut the work off transversely from the strip of material being fed every time a notch engages with the block 340.

*Timing of transverse cutting operation.*—Gear 281 has secured to it an indicator 281ª (Fig. 7 and dotted line in Fig. 73) which registers with the graduations extending around the master cam which is calibrated into three hundred and sixty degrees (Fig. 73) to facilitate the setting of the cam relatively to the notches 344 and the trip-ring 300 so that the cutting-off will take place at the proper time.

*Length-cutter clamp.*—Shaft 319 is provided with collars 347 and 348 (Figs. 1, 21 and 22) and attached thereto are plate-carriers 349 and 350 having a curved plate 351 attached thereto at 352. Each plate has an upwardly extending portion 353 bent at 354 where a screw 355 holds it in place by means of a nut 356. Screw 355 connects with a spring 357 which in turn is connected to the knife-bracket 358. The free end 359 of each curved plate extends slightly below the edge of the cutting-off knife 317 so that as the knife is tripped into action the end 359 of the plate clamps the work against the horizontal plate 360 which extends transversely of the machine with its free edge adjacent to the free edge of the stationary transverse knife 321 which with the movable transverse knife 317 constitutes a length-cutting mechanism operative across the width of the goods. In Fig. 22 a severed portion of goods is indicated by 362 and the length-cutting clamp holds the goods stationary for the operation of this length-cutting mechanism so that a straight cut is obtainable.

*Adjustment for cutting and sewing mechanisms.*—Main shaft 308 (Figs. 63, 82 and 83) extends through frame piece 7 and carries the cam 316, a bearing 363 supporting the main shaft on the frame piece 5. A gear 364 secured to main shaft 308 meshes with the intermediate gear 365 (Fig. 82) mounted on casing 367 and coöperating with gear 366 secured to a shaft 366ª extending through bearing 368. Shaft 366ª carries gears 369, 370 and 371 within a gear casing and any of these three gears may be brought into mesh with any of the gears 372, 373 and 374 located on shaft 375 which extends through the gear-casing compartments 376 and 377. Gears 372, 373 and 374 are slidable on shaft 375 by means of a bushing 378 held in place by screws 379. Bushing 378 extends outwardly and is provided with three grooves 380 any of which may be brought into engagement with the spring-controlled pin 381. The bushing has a manually accessible knob 382. By lifting pin 381 the bushing may be moved so that the pin will coöperate with any of the three grooves bringing the different gears into mesh as desired, whereby three different speeds may be given to the shaft 375 secured to which in compartment 376 is a cone of gears 383. Power is transmitted from gear 384 or any one of the other gears of cone 383 when the gear shaft 375 is rotated, to pinion 385 which is pivoted to handle 386 at 387 (see Figs. 81; 82; 83; 84; 1ª and 3). Pinion 385 is constantly in mesh with a pinion 388 which is also carried by the handle and is slidable on and keyed to the shaft 389 which carries a fixed gear 390 that is continually in mesh with a pinion 391 which is constantly in mesh with the gear 392, the latter being constantly in mesh with a gear 393 secured to the shaft 394 which is mounted in bearings 395. Secured to shaft 394 is a cone of gears 396. The shaft 397 supports a laterally slidable handle 398 (see Figs. 3 and 82) which carries a gear 399 in mesh with the gear 400 located on the handle which is shiftable along the shaft 397 to move a gear 400 into coöperation with any gear of cone 396. The handle 386 and 398 (Fig. 1ª) are held severally in position for engagement with the steps of the opposed racks 401 and 402 shown in Fig. 1ª, there being a set of these racks for each handle which passes through a space between the racks. Power is transmitted through this change-gear mechanism to the shaft 397 which has secured to it a universal-joint member 405 that connects with the universal-joint member 406 secured to a short shaft 407 having fixed thereto a universal joint 408 which is connected to the shaft 409 of the under main-feed-roller 69 (extending transversely across the machine); and secured to this feed-roller shaft is a gear 410 which coöperates with a gear 411 (Fig. 6) fixed to the shaft 412 of the upper main-feed-roller 413 (also extending transversely across the machine) giving a positive movement to both main-feed-rollers 69 and 413. Adjacent to the bearing 395 (Fig. 82) is a universal joint member 414 secured to the end of the shaft 394, and it connects with a universal-joint member 415 by an intermediate shaft 414ª (Figs. 46 and 48) which operates a clutch member 416 slidably secured to shaft 417.

*Main feed rollers.*—The main feed rollers draw the material from the tensioning mechanism and like the tensioning mechanism extend transversely across the machine so as to act transversely across the full width of the strip of material that is fed through the machine so that such material may be smooth and taut from edge to edge intermediate the transverse and parallel tensioning and main-feed mechanisms. The main-feed rollers are mounted in bearings 418 (Figs. 21 and 22) carried by frame portions 419 and 420. Shaft 409 of the under feed roller 69 is mounted in bearings 421 while the shaft 412 of the upper feed roller 413 is mounted in adjustable bearings 422 secured to the frame portions 419 and 420 by bolts 423, thus providing for adjustment of one of the feed rollers in relation to the other in order that the knurled surfaces 424 of these feed rollers will not be injured when there is no material passing between them if they should come in contact. Blocks 425 fit on shaft 412 and are severally provided with guide-pins 426 each of which extends up through a cap 427. The blocks severally extend inward of the frame pieces 419 and 420 and engage with levers 427ª which are severally pivoted at 428 and provided each with an elongated slot 429. The shaft 412 of the upper feed roller extends through these slots as well as through the extending ends of the blocks 425 which are rounded to conform to the shape of the slots.

*The feed-roller weights.*—Blocks 425 carry the pressure exerted on the upper feed roller because the blocks bear on end portions of the shaft 412. The levers 427ª extend outward and are provided with adjustable weights 430 clampable in place at 431. An additional weight 432 is adjustably secured to each weight 430 by its stem 433 (Fig. 20). The object of the double set of weights is to regulate to a nicety the pressure of the feed rollers on the work, and the weights are located on each side of the machine. Passing from one set to the other is a rod 434 (Fig. 3) which serves as a handle for lifting the weights in manually separating the feed rollers. During this separation the bottom walls 435 of slots 429 engage the shaft 412 of the upper feed roller to move the latter upward in the bearings 418 until the shaft 412 has reached the ends of slots 436. When the weights and upper feed roller are in this position the feed rollers are separated for insertion or removal of work.

*Auxiliary feed mechanism.*— Located intermediate of the cutting-off mechanism described, and the main feed rollers, there is an auxiliary feeding mechanism which extends transversely of the machine to operate across the full width of the strip. It is parallel with the main feed rollers and with the cutting-off knives. This auxiliary feeding mechanism comprises a plurality of members which alternately push downward and rearwardly on the material, and agitate or lift and push it so that the clamping jaws of the work-carrier may grip it. This auxiliary feeding mechanism is not necessary except with thin fabrics, and is supported by arms 437 (Figs. 20, 21 and 22) each pivoted at 438 to a lug 439 and severally terminating in a head 440, a portion 441 of which is bent outward and holed to receive a screw-and-nut 442. The end 443 of screw 442 engages with a lever 427ª when these levers are raised to a vertical position for moving the arms 437 on their pivots 438 to swing the auxiliary feed members carried by the arms out of the space intermediate the feed rollers and cutting-off knives. Secured to each arm 437 at 444 is a bracket 445 slotted at 446 to receive a coiled spring 447 and a sleeve 448 which constitutes a bearing. In these bearings, one at one side and the other at the other side of the machine, the rotary crank-shaft 449 is mounted, as well as in three hangers 450. As shown, the crank-shaft is composed of end pieces 449ª, arms 451 and pins 452 (Figs. 23 and 25) each of which passes through a hole in the hub 453 of a feeding member which has a shank 454 terminating in a slotted end 455 to receive a rocker arm 456 pivoted thereto at 457. The levers 456 extend backward at 458 and severally terminate in heads 459 fitting freely on shaft 460 which extends from one hanger 450 to the other and is provided with a series of sleeves 461 serving as spacers between the levers 456. A rod 462 extends from one hanger 450 to the other and is provided with two sleeves 463 and 464. Rotation of shaft 449 rotates the feed members. A universal joint 465 (Figs. 1ª and 21) couples to the end of the transverse shaft 449 and connects with a shaft 466 which in turn connects with shaft 467 (Figs. 1ª and 4) by the universal joint 468.

Shaft 467 is mounted in bearings 469 and 470 and has collars 471 to prevent it from moving endwise. A belt-wheel 472 is connected to the shaft and is rotated by the belt 473 (Fig. 4) which is driven by belt-wheel 474 secured to main shaft 308 and gives a rapid motion to shaft 467, which motion is transmitted to the crank-shaft that operates the feeding members 475 so that such members engage with and push along the material as it passes from the main feed rollers to the length-cutting mechanism.

It is desirable in certain classes of work to feed the material continuously, and as when the cutting-off takes place the material is necessarily interrupted in its feeding movement for proper operation of the length-cutting mechanism (Fig. 22) where it is gripped by the clamp-plate 351 and the horizontal plate 360, the material accumulates in the space intermediate the main feed rollers and the cutting-off knives. The extent to which the material is fed at such a time is controlled by the speed of the feed rollers relative to the speed at which the cutting-off mechanism operates, and it is sometimes desirable to lift the auxiliary feeder so as not to interfere with the feed of the material.

The auxiliary feeding mechanism is lifted (Figs. 20, 21, 22) by the adjustable crank-arm 477 secured to the cutter-shaft 319. A cap 478 fits on an end of the shaft (Fig. 21) and is adjustably secured thereto by a screw 479, and a screw 480 holds the crank 477 on the cap. Adjustment of the cap regulates the throw of the crank, the outer face of the cap being diametrically slotted at 478ª, and the crank-arm 477 lying flatwise in the slot.

Pivoted at 481 is a tube 482 which receives a rod 483 having a fixed collar 484. A compression spring 485 acting on the collar and also against the end wall at 486, forces rod 483 in one direction. A nut 487 is secured to the end of rod 483 to limit the movement given to it by the spring in the opposite direction. The other end of rod 483 connects with the bearing 488 which is pivoted at 489 to the arm 490 secured to shaft 428. Located on shaft 428 is a two-arm lever 491, one arm extending upward at 492 (Figs. 20, 21 and 22) and being curved to act as a cam on the stud 493 secured in the curved lever 437 by nut 494. The other arm 495 of the lever extends over the top of the feed roller 413 so as to contact with the feed roller when it is lifted by hand. Shaft 428 swings the arm 490 and moves the rod 483 to compress spring 485 (Fig. 65), at which time an end of each of the two levers 492 coöperates with a stud 493 on a curved lever 437 pivoted at 438 for lifting the auxiliary feeder.

Lever arms 492 and 495 are both secured to the shaft 428 and the lever 490 is also secured to this shaft and connected, as described, to the movable cutting-off knife. At each time the moving blade of the length-cutting mechanism is moved to cut off the material, the mechanism is operated so that the lever arm 492 engages the studs 493 and moves the curved arms 437 to lift the auxiliary feeding members and permit the work to be fed in. Immediately as the movable knife lifts, the auxiliary feeding members come into operation.

Secured to each opposite frame-piece 6 and 7 and adjacent to bearings which support the shaft 428, is an upright 496 rounded off at 497. The ends 498 of the hangers 450 (Figs. 22 and 23) abut against the uprights 496 during the lifting movements of the feeding members under the lifting action of the cams 495 so that the feeding members are kept lifted during the cutting-off operation to prevent them from striking against the work-clamping blade 351. The curved portions 497 permit the ends 498 of the hangers to ride over them, when this feeding mechanism is lifted manually the upper edges of the levers 427ª then engaging the downward screw ends 443 (Figs. 20, 21 and 22) and swinging the curved arms 437 on their pivots 438 (Fig. 22) and the screws 442 being carried by these curved arms.

*Flap control.*—Located on the knife-shaft 319 are rocking bearings 499 (Figs. 1 and 21) one adjacent collar 347 and the other adjacent collar 348. Each terminates in a T-shaped projection 500 which has secured to it at 501 a transverse bar 502 drilled to receive a series of wires 503 which are spaced from one another and extend downward at 504 (Figs. 20, 21 and 22) and are bent at 505 and extend into the grid 506 where the other ends of the wires are secured in a transverse bar 507. These bars are equal in length and correspond to the length of the cutting off knives. A plate 508 is attached to the bar 507 to receive the screw 509 having a head 510, and this screw extends up through the knife-frame 318, being locked in position by nut 511. A wing nut 512 is secured to the end of the screw to adjust it. The arrangement of these parts underneath the movable knife, as shown, is to prevent the material from flapping upward. The spaces between the wires receive the jaws of the work-carrier described below.

*Work - carrier mechanism and timing mechanism.*—The work-carrier performs two important functions: it carries the product over the work-receiving tables, but before performing this function and after having gripped the advancing end of the product-forming portion of the goods, it tensions and thereby smooths the product-forming end portion against the tension of the feed-rolls prior to the transverse cutting operation. Thus there are in effect three tensioning mechanisms,—the first being at the front of the machine, the second being the feed-rolls which tension and smooth the goods against the resistance of the front tensioning mechanism, and the third being the work-carrying mechanism which tensions the goods against the resistance of the feed-rolls. That portion of the goods which is drawn tight between the front tensioning mechanism and the feed-rolls is operated on by either or both the front cutting-and-sewing machines as conditions may require, and that section of tautened goods between the feed-rolls and the work-carrier in the performance of its tensioning function is operated on either by the transverse cutting blades if they are used, or if they are not used by the cutter of the transversely-traveling rearward cutting-and-sewing machine.

Attached to frame-piece 7 back of the gear-case shown in Fig. 3 is located work-carrier timing mechanism, more clearly shown in Figs. 6 and 46 to 58 inclusive. A bracket for this mechanism has a foot 513 provided with screw-threaded apertures 514 for screws which hold the bracket to the machine-frame. The bracket extends outward and upwardly and is rounded at 515 where there is secured the housing 516 to provide bearings 517 and 518 for the sleeve 519 which forms a bearing for the reduced portion 520 of the shaft 417. A collar 521 is secured to the end of this reduced portion to prevent end movement of the shaft in the sleeve 519 which terminates in an enlargement at 522 that is cut to form clutch-teeth 523 (Fig. 53). Secured to sleeve 519 by a key 524 is a drum 525 drilled to receive the stem 526 which carries a link 527 secured to it by the pin 528. The opposite end of the link has secured to it by a pin 529 a connector 530 which is slotted at 531 to receive a steel tape 532 which is secured therein by rivet 533. The drum is cut out as shown in Fig. 52 at 534 in order that the link and connector may lie in the cut-out portion and so that the outside of these parts will fill up this cut-out and form a complete cylinder upon which the steel tape 532 is wound. The dotted-line position of the link and connector and tape in Fig. 52 shows the position these parts assume when the tape is unwound from the drum. In addition to the clutch-teeth 523 in the face of enlargement 522, are peripheral teeth 535 forming a ratchet-wheel integral with the clutch teeth 523. Adjacent to these teeth and riding on a smooth portion of the enlargement 522 is a shoe 536 carried by a plunger 537 which fits freely in the tube 538 having a stem 539 extending upward through the adjustable nut 540. A spring 541 is located in the tube and has one end exerting pressure on the plunger 537. The other end presses on nut 540 which affords a means of regulating the amount of the pressure. The spring exerts pressure on the shoe and acts as a governor or brake to prevent the overthrowing of the clutch member. This device is held in coöperative relation with the clutch by the bracket 542 secured to the housing at 543. The tape just referred to pulls the work-carrier away from the transverse length-cutting mechanism toward the rear end of the machine. There are two of these tapes, one 639 at one side and the other 650 at the other side of the machine, as mentioned below.

Mounted on bearing 518 is a disk 544 provided with a collar 545 forming a bearing for the disk on the hub of the housing. A space 546 is formed between the frame-piece 547 and disk 544 to permit the roller 548 to freely rotate on its pivot pin 549 which is provided with a head to prevent the roller from endwise movement. This pin is mounted on the disk 544 (Fig. 48) and provided with a nut 550 to lock the pin in position. Housing 516 has an opening 551 adjacent to which is secured a member 552 of fiber, rubber, or the like, against which tape 532 contacts when it recoils, to prevent injury to the tape. Secured to the disk 544 is a spring 553 arranged to have its end 554 rest on the catch 555 which is pivoted to the disk at 556 and provided with hook 557 which engages the block 558 of the lever 559 which is pivoted at 560 to the plate 561 which is secured to the hub at 562. Lever 559 has an arm 563 provided with an aperture 564 to receive the spring 565 one end of which is fixed in the aperture. The other end of the spring is attached to the plate 561 at 566 and the lever 559 terminates in two circular shaped portions 567 and 568 as described below.

The latch 555 is provided with a tooth 569 on the end opposite the catch 557. If lever 559 be moved on its pivot 560 so that the hook 557 will drop from the block 558, the tooth 569 will engage with the ratchet-wheel and remain in that position while the disk 544 is turned one complete revolution, at which time the lever 559 will be moved into its normal position where the catch will coöperate with a raised portion 558 to disengage the tooth 569 from the ratchet 535 and hold it in that position until the lever 559 is again tripped.

To prevent back movement of disk 544, latch-dog 571 is secured to housing 516 at 572 (Fig. 53) and has a spring 573 attached at 574 on one end and at 575 to the latch-dog 571. A hooked end 576 of the lever registers with the cut-out portion 577 in the disk 544. This hook is so shaped that the disk is permitted to move in one direction only, as indicated by the arrow in Fig. 53. A bearing 578 which is integral with the housing, supports a shaft 579 which carries a member 580 that is provided with an extension 581 bored to receive the plunger 582. A spring, not shown, is located behind the plunger within the extension 581 and exerts a pressure outward on the plunger which terminates in the concave head 583 that coöperates with a convex member 584 which forms part of the lever 585 secured to the shaft 586 at 587. This shaft has secured to its lower end a lever 588 bifurcated to receive the link 589 pivoted to the extension 581 at 590. The other end of the link is pivoted at 591 to the bifurcated end 592 of the lever 593 which forms a housing 594 for the latch 595 having a pin 596 passing through elongated slots 600. The coiled spring 597 within the housing is held in position against the latch by the pin 598.

A cap 599 is attached to the top of the lever and has a slot in which one end of the pin 596 operates to limit the outward movement of the latch. Lever 593 is secured to the sleeve 601. A shaft 602 operates within the sleeve and has secured to it a disk 603 provided with a shoulder-screw 604 located near the periphery and carrying an off-set link 605 pivoted thereto, the other end of the link being slotted at 606 to receive one end of the pin 596 of latch 595. Sleeve 601 and shaft 602 are both carried by the depending bearing 607 which is integral with bracket 515. Shaft 602 has secured to its top end a two-armed lever 608. One arm of the lever is bifurcated to receive the roller 609 pivoted at 610. The other end has secured therein a ball 611 which connects with the universal joint 612 operated by the rod 613. An end of the lever 608 operates in a recess 614 of disk 615 provided with vertically-projecting walls 616 each of which extends partway around the disk which is secured to the sleeve 617 at 618. The roller 610 coöperates with the circular portions 567 and 568 of the lever 559 so as to move the lever outward as the roller passes from its normal position (Figs. 46 and 49) to the position shown in Fig. 51. When the roller reaches the apex 619, the lever is moved so that the latch 555 is disengaged from the block 558 and so that the tooth 569 engages the ratchet-wheel. A further movement of the lever 608 causes the arm carrying the roller 609 to contact with the wall 620 (Fig. 51) which turns the disk 615 and the shaft 601, whereby the disk 603 is turned for drawing the link 605 backward. This moves the latch to its position within the housing shown in Fig. 51. At the same time a movement is given to the sleeve 617 turning it in the bearing 607 and moving the lever 593 and its connecting link 589 and the lever 588, secured to the shaft 586, so as to throw the knuckle-joint member 583 and the convex member 584 to position shown in Fig. 51.

The purpose of the mechanism just described is to open and close the clutch 416 and move it out of engagement with the clutch teeth 523; and this is accomplished because the shaft 586 extends up through the bearing 621 and has secured at the top end a sleeve 622 which is provided with two arms 623 and 624 having studs 625 and rollers 626, the latter coöperating with a groove 627 in clutch member 416 which is keyed to the shaft 417 and has a sliding engagement with the clutch teeth 523.

*Tape-actuated work-carrier.*—There are six steel tapes: 532 to draw the work-carrier rearwardly; 639 and 650 also to draw the work-carrier rearwardly; 721 and 732 to draw the work-carrier toward the transverse length-cutting mechanism; 670 to open the work-carrier jaws. There is also a clock-spring 759 to wind the tapes 731 and 732, and another clock-spring 816 to wind up the tape 670. The tape mechanism accurately secures quick reciprocation and action of the work-carrier.

Shaft 414ª (Figs. 46 and 48) connected to the universal joint 415, is continually rotating while the gears described in connection with Figs. 81 to 84 inclusive are rotated. The clutch-member 416 is likewise continually rotating with the shaft 417 that extends through the housing 516 and turns freely in the sleeve 519. As the clutch-members 416 and 522 engage, rotary motion is given to the sleeve 519 and the drum 525 is caused to rotate to wind up the tape 532 as represented in Fig. 48 by the sectional lines, and as may be more clearly seen in Fig. 52 at the full-line position of the link where several coils of the steel tape 532 are wound upon the drum 525. The drum winds the tape until the clutch-members are disengaged. The drum is then free to rotate in the opposite direction so that the tape may be unwound therefrom. This tape 532 moves the work-carrier shown in Figs. 3 to 6 inclusive, and in 28 to 33 inclusive, away from the length-cutting mechanism.

In Fig. 6 a dotted line shows the tape 532 extending from the timing mechanism described, back to the circular housing 628 (Figs. 1, 1ª, 2 and 37). Within this housing is located a spool 629 (Figs. 37 and 42). This spool comprises two flanges 630 secured to a core 631 which is keyed to the shaft 632 at 633. The key engages the notches 634, several of which are provided to facilitate the timing of the spool to take up and adjust the slack of the tape 532.

Housing 628 has a bearing 635 wherein the shaft 632 rotates. Bearing 26 of the upright 25 and the bearing 27 on the opposite side, have the housings 636 and 637 secured thereto respectively, and the tubular shaft 28 connects with the bearings 26 and 27, making a rigid construction which keeps the bearings in alinement. The housing 628 is coupled with the housing 636. A drum 638 is located on the shaft 632 and held in position by the key 633 so as to turn positively with the spool 629. A similar drum is located in the housing 637 secured to the shaft 632.

Tape 532 (Figs. 1ª and 37) has a number of coils surrounding the spool, while in the housing 637 the drum 638 has a number of coils of a similar steel tape 639 surrounding it. Tape 639 extends outward along the rail 30 and connects with the work-carrier at 640 (Figs. 1ª and 40). An end of the tape is bent around the pin 641, and the lip 642 is pressed down upon the tape at 643 and both are inserted in an opening at 640, the lip, the pin and the tape itself passing outward through a slot at 645, while the other end of the tape is connected to the drum 638 (Fig. 41) having an opening 646 slotted at 647 and bored at 648 to receive the shaft 632, and slotted at 649 to receive the key 633.

Tape 639 extends along the rail 30 while the tape 650 coming from a drum similar to that described, and located in housing 637, extends along the rail 29 and connects with the work-carrier at 651. The tape 639 is represented by dotted lines in Fig. 27 and connects with the carrier at 652. This carrier is constructed of two end-brackets 653 and 654, each of which is L-shaped at 655 to receive the horizontal brace 656 which is secured to the brackets at 657. Bracket 653 has bearing 658, while the bracket 654 has bearing 659 to receive the transverse shaft 660 secured to which is a lever 661 keyed thereon at 662 and extending upward and being pivotally connected at 663 with a link 664 to the end of which a lever 665 is pivoted, being also pivoted to the bracket 654 at 666.

Lever 665 is kept in operative position by the collar 667 and extends upward terminating in the handle 668. Midway between the handle and its pivot 666, by the screw 669, a steel tape 670 is attached to the handle (Fig. 27). A spring 671 connects to the bracket 654 at 672 and to the lever 665 at 673, normally holding the lever 665 in gripping position.

Secured to the shaft 660 adjacent to the lever 661 is a lever 674 having an arm 675 formed with a convex end 676 (Figs. 27, 32 and 36) which coöperates with a concave socket 677, and the plunger 678 fits in the bore 679 of the member 680 (Fig. 35). A spring 681 is located in the bore 679 and coöperates with the plunger 678 tending to force it against the convex head 676. The member 680 carries a lateral stud 682 which works in a bearing in the bracket 654. The arrangement of these parts is such as to cause the knuckle-joint to snap from one position to another above and below the center because of the springs 681 and 671 acting upon the levers.

Secured to the shaft 660 is a lever 683 bifurcated to receive a rod 684 having apertures 685 through which passes a bolt 686. This rod is bent downward at 687 to fit in the bifurcation 688 (Fig. 33) of the lever 689 which is secured to the upper work-clamping jaw at 690. This work-clamping jaw consists of a long bar 691 extending from side to side of the work-carrier so as to operate across the full width of the material. The bar terminates in two short shafts 692 and 693 which move freely in the bearings 694 and 695 (Figs. 27, 28 and 36) which are severally a part of the opposite slides 696 and 697 which with bar 684 constitute adjusting means so that the fingers 703 and 705 will project under the cutting-off knife when very short lengths are to be produced. Fingers 703 and 705 operate close to the transverse cutter and the rake. These slides are each provided with a tongue 698 fitting in a groove 699 to maintain alinement. Each slide is provided with a plurality of sockets 700 corresponding in number and in spacing with the apertures 685 in the bar 684. Screws 701 passing through clamps 702 secured to the brackets 653 and 654, and which overhang the slides 696 and 697, hold the slides in the grooves.

The bar 691 carries a plurality of fingers 703 each desirably provided with rubber teeth 704 to enable each individual finger to obtain a proper grip on the material and compensate for variations in its thickness. Each finger 703 coöperates with a bottom finger 705 that is integral with a plate 706 and which is recessed to receive a bar 691 at 707 and having secured thereto at each end an angle-plate 708 slotted at 709 to receive the bolt 710 and adjustably secure the plate 706 to the slides 696 and 697. These slotted plates afford means of adjusting the angle of the bottom fingers to suit different kinds of material. The upper fingers may be adjusted by moving the lever 683 on the shaft 660, the clamp 711 being first loosened.

In Figs. 29 and 34 there is shown a form of upper finger made of spring steel with a shank 712 and an opening to receive a screw 713. This form of finger is frequently desirable. It has a goose-neck 714 and a serrated portion 715 and an up-turned end 716. The object of the goose-neck is to increase the flexibility of the finger.

The finger-carrying bar 691 is held in operative position by caps 717 each having a curved portion 718 overhanging the bar. The brackets 653 and 654 are provided with anti-friction rollers 719 two on each side, which coöperate with the grooves 720 one of which extends lengthwise of each rail 29 and 30. Anti-friction rollers 721 are secured to the brace 656 and coöperate with the walls 722 of the rails 29 and 30 to prevent lateral movement of the work-carrier during its reciprocation in the direction of the path of feed. These anti-friction rollers each comprises a cone-headed screw 723 having a stem 724 extending through the cone 725 the stem being threaded at 726 to receive the nut 727. Between the cones are located balls 728 upon which the rollers 719 freely rotate.

*Tape return of work-carrier toward length-cutting mechanism.*—In addition to the hubs 651 and 652 that receive the steel tapes 639 and 650 (Fig. 1ª), hubs 729 and 730 are provided on the work-carrier (Fig. 27) to receive the pull-tapes 731 and 732 (Fig. 1ª) which extend from the work-carrier to the housings 733 and 734 secured to the side rails 30 and 29 respectively. Details of the housings 733 and 734 are shown in Figs. 38 and 39, 735 indicating a disk, and 736 indicating a housing which has a hub 737. The housing is secured to the disk by screws 738 through the flange 739. A shaft 740 operates in the bearing of the hub 737 and bearing 741, and the shaft is reduced to form a square end at 742 so that a wrench may be placed thereon to turn the same. The shaft is enlarged at 743 and is provided within the housing with a hub 744 which forms a part of the cylinder 745 which is a continuation of the wall 746 that is cut out at 747 to reduce weight and that terminates in the flange 748 extending close to the housing to prevent the steel tape from getting into compartment 749.

Located in the recess 750 are a ratchet-wheel 751 and a pawl 752 pivoted at 753. The pawl is provided with a pin 754 extending through the slot 755. Spring 756 connects with the pin and also with the screw 758. The ratchet wheel is fixed to shaft 743 and the drum 745 is free to move on the shaft when the pawl is out of engagement with the ratchet-wheel.

*Tape-gripper for opening work-carrier jaws.*—The construction and mode of operation of tapes 731 and 732 are identical and in Fig. 39 tape 731 winds on the drum 745. A clock spring 759 in compartment 749 has one end secured to the pin 760 which is secured to the disk 734 and has its other end secured to the shaft 743. By applying a wrench to the end 742 and turning the shaft 743 to wind up the spring 759, tension is exerted against the pawl to move it into engagement with the ratchet and prevent the spring from unwinding. By pulling on a tape 731 the spring 759 is wound up. As soon as the tension is relieved from the tape 731, spring 759 effects the re-winding of the tape on drum 745. One of these mechanisms is located at one end of each side rail and they are indicated by 733 and 734 respectively (Figs. 1 and 1ª). Each tape 731 and 732 has an end connected to the work-carrier at *y* (Fig. 1ª) to draw it toward the cutting-off mechanism as soon as the tension on the tapes 639 and 650 is relieved.

As the clutch member 416 engages the clutch member 522 (Figs. 46 and 53) and rotates the drum 525 to wind up the tape 532, the latter is unwound from its spool 630 causing the tapes 639 and 650 to wind up on the drums 638 on the shaft 632 and draw the work-carrier outward toward the rear of the machine. While the work-carrier is moving, its jaws are closed carrying the severed piece of work with it as represented by dotted line *x* in Fig. 5. When the work-carrier reaches a position along the rails 29 and 30 representing the length of the article to be made, the cutting-off takes place and the work-carrier continues to move rearwardly.

The knife-lever 323 has secured to it a cam-plate 762 (Fig. 64). Said plate has a raised portion 763 and an extending portion 764. The end 765 is at an angle so as to cooperate with the roller 766 (Figs. 55, 56 and 57) carried by the bell-crank 767 pivoted at 768 to the slotted lever 770. A nut-and-washer 771 are provided for the screw-threaded portion 772 and serve to clamp the bolt 769 in any desired position in the slot 773.

A spring 774 connects to the bolt under the washer at one end and to the arm 775 of the bell-crank 767, and extends at 776 through the slot of the lever 770 and pulls the bell crank against the lever 770 to effect a rigid thrust in the full-line direction shown in Fig. 55. This figure shows in dotted lines a cam-plate 762 attached to knife-lever 323 when the knife is down to its lowest position where the work has been cut as shown in Fig. 22. When the parts are in this lowest position the lever 770 is swung to the dotted-line position shown in Fig. 56. Said lever carries cylinders 778 and 779. Cylinder 778 is bored to receive a spring 780. A rod 781 extends through the spring and through the end wall 782 of the cylinder, and is screw-threaded at 783 to receive the nut 784. The rod has an enlargement 785 against which the spring exerts a pressure, and has a flattened end 786 pivoted in the bifurcation 787 of the tape-clamping plate 788.

Cylinder 779 contains a spring 789 and a rod 790 having a head 791 abutting against the wall 792 of the cylinder. The other end of the rod is threaded at 793 for nut 794. A bracket 795 is shaped to receive the curved arm 796 which is pivoted in place by pin 797. Pin 798 locates the device on the machine frame. The curved arm 796 is shaped to receive the cylinders 778 and 779, and has a slotted member 770 extending therefrom. Plate 795 is cut out at 799 to receive the tape 670 for opening the work-carrier jaws, and which extends down therethrough under plate 788 and is clamped thereon when the cutting-off takes place, the mechanism assuming the full-line position shown in Fig. 55 and the dotted-line position shown in Fig. 56. As the tape is gripped and the carriage continues to move rearwardly, the handle 668 is pulled forward throwing the knuckle-joint 676 and 677 above the center as shown in Figs. 6 and 27, causing the work-carrier clamp to be opened and release the work.

Tape 670 (Figs. 6 and 43) extends from the handle 668 to the roller 800 which is pivoted on the stud 801 passing through the arm 802 and the bracket 803, and also through the roller 800 and the hub 804 of the lever 805 and the plate 806 which has a head fitting in the T-slot 807 of the rail 30. A casing on hood 808 straddles the roller 800 and is secured to the bolt 801 so as to be clamped in position when the nut 809 is tightened to support the mechanism described, in a fixed position in the T-slot 807. The hood serves to guide the tape 670 around the roller as shown in Fig. 6 down to the clamp 810 secured to the rib of frame piece 7 and described in detail in connection with Figs. 55 to 59 inclusive. Tape 670 passes downward from the clamp as represented by the dotted line in Fig. 6 to the winding-up mechanism 811.

*Tape-winding mechanism.*—This winding-up mechanism 811 (Figs. 6, 60 and 61) for the tape 670 comprises a plate 812 secured to the rib 813 of the frame-piece 7. The plate is attached to a cylindrical casing 814 having an end plate 815. The clock spring 816 is secured to the core 817 having a shaft 818 and a drum 819 around which the tape is wound at 820, the drum being provided with a flange 821 to guide the tape. The frame 822 is secured to the casing at 823, one end of the clock spring being secured at 824. Tape 670 has one end attached to the drum 819 and the other end attached to the handle at 669. When the work-carrier is drawn rearward, tape 670 is unwound from 819 causing the spring 816 to be wound on the core 817. As the work carrier is moved inward or forward toward the cutting-off device, spring 816 rotates the drum 819 and winds up the tape 670. As the clamp 810 grips the tape 670 and opens the jaws of the work-carrier, the back of lever 323 contacts with the end 825 (Fig. 6) of the lever 826 which is pivoted to the rib 813 at 827. Said lever is cut out at 828 and an anti-friction roller 829 is pivoted to the lever by a bolt 830 clamped in the slot 831. A curved guard 832 reaches from one side of the roller 829 over the top and extends down to the other side, capping the pull-tape 532 to keep it in contact with the roller. The movement given to this lever 826 is such as to kick the tape upward and give to the work-carrier a jerk on the guide rails 29 and 30 as the work-carrier moves rearward. The purpose of this jerk or acceleration of rearward movement of the work-carrier is to release the piece of cut and sewn fabric in a flat and smooth condition and to accomplish this quickly in order that the work-carrier may quickly move forward to grasp another cut-and-sewn piece. It has been found in practice that without this accelerated movement of the work-carrier instantly after the jaws have released the work, the end of the work is apt to linger between the jaws as the work-carrier starts to return to its former position, causing the work to fold upon itself as it is dropped from the work-carrier.

*The latch and clutch mechanism for various lengths of product.*—Knife-lever 323 has at 833 a catch 834 beveled at 835 (Figs. 6, 55, 56, 63 and 64). The bevel coöperates with the bevel 836 of latch 595 while the straight side of catch 834 coöperates with the straight side of the latch 595. When knife 323 is operated to the full-line position shown in Fig. 62, the catch 834 passes the latch 595. These two members are positioned (Fig. 63) to coact. The bevel 835 coacts with the bevel 836 to push the latch 595 into the housing of lever 593 (Figs. 46, 48 and 50) compressing the spring 598 and operating the pin 596 in the slot 606 of link 605. As the knife-lever 323 returns to the position shown by dotted lines in Fig. 62, catch 834 engages the straight face of latch 595 and swings the lever 593, thus moving lever 588 (Fig. 46) through link 589 and also moving the sleeve 617 and the disk 616 (Figs. 43, 46 and 49) and causing the wall 620 to contact with the end of lever 609 and operate the shaft 602.

The connecting-rod 613 is pushed forwardly by the lever 887 (Fig. 46) and rocks the lever 588 by means of intermediate connections elsewhere described. The rocking movement of lever 588 rocks the shaft 586 which carries the rocking knuckle-joint member 584 which engages the knuckle-joint member 583 giving a movement to the knuckle-joint members which brings them into the position shown in Fig. 49 and throws the clutch-members 522 and 416 out of engagement, the clutch-members being thrown into engagement by means already described.

This latch and catch mechanism is for the purpose of positively disengaging clutch-members 522 and 416 which operate in connection with tape 532. The arms 623 and 624 of shaft 586 carry rollers 625 and 626 which operate in the groove 627 of clutch-member 416 causing the latter to move on the shaft 417 and to rotate therewith. Instantly as the clutch opens, the work-carrier is pulled toward the length-cutting mechanism.

*Rake-mechanism coöperating with work-carrier.*—As the work-carrier reaches the position shown in Fig. 6, the wall 838 of bracket 654 (Fig. 27) strikes the roller 839 which is pivoted at 840 (Figs. 4 and 67) to an arm 841. The lever 842 supporting the roller 839 is provided with an aperture 843 which registers with a series of apertures 844 in the enlarged end 845 of the lever 846. A bolt passes through the aperture 843 and through one of the apertures 844 clamping the two levers adjustably together. Attached to the end of the lever 846 is a ball-and-socket joint 847 having a connecting rod 848 provided with a ball-and-socket joint 849 to one of two identical side arms 850 of the rake. Each arm is pivoted at 851 to the frame and each terminates in a circular end 852 having secured to it transverse rods 853, 854 and 855 which connect the two arms and form a curved rake. The rods are drilled to receive tines 856 which are spaced apart to correspond to the spaces between the fingers of the work-carrier. The tine-ends 857 coöperate with a series of fingers 858 which are pivoted to the frame by a transverse rod 859 and held under tension by a spring 860 connected at one end to the frame and to the finger structure at the other whereby the fingers are held normally pointing downward (Fig. 5).

After the material has been cut off to length its advancing end passes out between the length-cutting knives and downward over the fingers 858 for a short distance while the work-carrier is returning to its forward position. Just as the wall 838 contacts with roller 839 to swing lever 842 and 846 upon its pivot 840 and thereby move the connecting rod 848 to swing the arms 850 and cause the tine ends 857 to lift the fingers 858 to the position shown in Fig. 67, the end of the advancing material is lifted so that as the tine ends 857 pass outward from under the ends of the fingers 858, the tines contact with the material and lift and carry it between the jaws of the work-carrier.

The upper jaws 703 are the movable jaws of the work-carrier and open to release the work, remaining in this open position until the work-carrier has traveled forward and seized the advancing end of the goods to tension the goods between the carrier and the feed-rolls.

The apertures and bolt referred to serve to regulate the extent to which the rake tines will move rearward.

*Friction-stop for work-carrier.*—The work-carrier reaches its forward position with considerable rapidity and at the limit of its forward movement encounters a buffer from which it tends to rebound. To overcome this I have provided a mechanism which serves both to absorb the shock and to prevent the rebound. The plate 861 (Fig. 27) is secured to the brace 656 of the work-carrier and extends from one arm of the brace to the other. It is provided with a vertical projecting lip 862 beveled at 863 (Fig. 30). This lip coöperates with a clamping device secured to the rail 30 which comprises a bracket 864 cut out at 865 (Fig. 31) to receive the adjusting screw 866 having an arm 867 provided with slots 868 to receive the bolts 869. The adjusting screw 870 contacts with one of the bolts, while the screw 866 contacts with the other one. The jaws 871 and 872 are pivoted on the bolts and are faced at 873 with fiber, rubber, or other suitable material. These jaws are tapered from the center toward each forward end, and their back ends coöperate with pins 874. Arm 875 of bracket 864 holds the jaws in position to receive the rib 862 as the work-carrier is brought to its forward position, and the rib then enters the clamp-jaws frictionally (Fig. 30). This prevents rebound and overcomes to a great extent the shock of stopping the work-carrier instantly.

When the rib 862 enters the clamp-jaws, the roller 876 (Figs. 32 and 43) contacts with the incline 877 secured to the work-carrier at 878 and 879. This incline has a spring-controlled member 880 pivoted at 881. The spring 882 at one end rests against the rib 883 and at the other end in socket 884. Roller 876 is pivoted at 885 to the lever 805 which is provided with a brace 886 extending from the lever 805 downward and connecting with the arm 887 of the lever which is pivoted at 804. The ball-and-socket joint 888 connects this lever to the clutch-rod 613.

As roller 876 mounts the incline and reaches the position shown in Fig. 32, lever 805 is swung on its pivot 804 moving the arm 887 to the dotted-line position shown in Fig. 32, whereby the rod 613 turns the lever 608 (Fig. 51) mounted on shaft 602 so that the roller 609 is moved in the cut-out 568 to the apex 619 and thereby moves the lever 559 outward so that latch 555 (Figs. 46 and 53) is dropped from the catch 558 and brings the pawl 569 into engagement with ratchet 535. At the same time the lever 608 has brought the arm 609ª, carrying roller 609, into engagement with the wall 620 (Fig. 51) and thereby turned the disk 618 secured to sleeve 617 and the lever 593 (together with its connecting parts operating the knuckle-joints 583 and 584 to the position shown in Fig. 51), and caused the clutch-member 416 to engage with the clutch-member 522, at which time disk 544 is rotated by the lever 555 and its pawl connecting with the ratchet-wheel, the lever 555 dropping from the catch 558 and enabling the disk and catch (Fig. 48) to turn with the clutch member 522 so that the roller 548 contacts with a lever 889 mounted to normally rest in the space 546. Said lever is pivoted at 890 to the ear 891 of plate 803 which extends forward at 892 and is secured to housing 733 at 893. The arm 894 of lever 889 is connected therewith by the bearing 895 and has secured to it at 896 a rod 897 by the shoulder-screw 898. Said rod extends forward and pivotally connects with a lever at 899 by a similar shoulder-screw 900, and to the arm 901 of the lever 902 which is pivoted by the stud and lock-nut 903. The lever end 904 terminates in the bent portion 905 which coöperates with the arm 906 forming part of the lever 665 which is a part of the work-carrier. A spring 907 is secured to lever 894 by the pin 908 and to the projecting arm at 909. This arm is adjustably secured at 802 to the bolt 801 so that its end 910 coöperates with the lever 894 and acts as a positive stop for the same. This arm may be adjusted to cause the end of lever 889 to rest in any desired position relative to the roller 548.

The arm 906 passes over the portion 905 of lever 904 and the normal resting position of the roller 548 is substantially directly over the clutch shaft (Fig. 46) so that as the clutch-members are brought into engagement, the roller 548 moves to meet the lever 889 and forces it outward in the direction of the arrow in Fig. 43, drawing the lever 894 backward away from the stop 910 and exerting tension on the spring 907 and operating the rod 897 connected with the lever 901 to lift the end 905 which is underneath the arm 906 sufficiently to cause the springs 671 and 681 to operate the knuckle-joints 676 and 677 and their connecting parts for closing the jaws of the work-carrier upon the work (Fig. 32). At this time drum 525 is rotated to take up the slack in the tape 532.

*Work tables and signal.*—Working on rail 19 (Figs. 1, 1ᵇ, 1ᶜ, 3, 4) is a transverse frame 911 shaped to fit over the transverse rail 912 which forms a guide bearing for the horizontal frame 913 on base 18. Rail 19 extends transversely of the machine frame and projects on both sides of it. The transverse table-supporting frame 911 comprises rectangular sections 914 and 915 connecting with sections 916 and 917 and an intermediate section 920. These sections are secured together and are mounted on roller bearings 918 and 919 which run on the transverse rail 912. Base 18 is provided with roller bearings 921 to support the weight of section 914. The sections are constructed to form two slideways for frames consisting of sections 922, 923, 924 and 925 provided with braces 926 and 927 secured to which is a track 928 curved at 929. A gear rack 930 is secured to the braces and curved at 931 to form a path for the travel of the gear 932, while a collar 933 runs on the rail 929. This horizontal frame construction for the work-tables is shown in Fig. 1 with the gear and collar in working position relatively to the gear rack and the rail.

Secured to section 920 (see dotted lines in Fig. 1) is a short section 935. A corresponding short section 936 of the rail is also secured to the section 920 so that these tables are each reciprocated laterally and endwise. As indicated in Fig. 1 the frame 934 is adapted to support one of the work-tables (not shown in the figure) under the frame members 6 and 7 with its forward end well up toward the vertical plane of the feed rolls. In this position of the table receiving the goods, the other table, supported by frame 934, is projected laterally of the line of the frame member 6 (Fig. 1) or out from under the carrier supporting rails. When the latter table has had its contents removed, it is reciprocated laterally into work-receiving position and the table first in work-receiving position is projected laterally from under the carrier-supporting rails outwardly beyond the line of frame member 7, being first given a rearward movement that brings it into a position where its rear end position corresponds to the rear end position of the projected table frame shown in Fig. 1; that is, each work-table has four motions, and the two work-tables are alternately brought into a work-receiving position and then into an accessible position at one side or the other of the lengthwise-extending framework of the machine so that the products on the projected table are accessible. The gear-wheel 932 is then turned to move the table 934 outward to a position in which the gear-rack will register with section 935 bringing the rail in position to form a continuous path therewith, while the frame 934 is moved in the direction of the arrow as shown in Fig. 1, to the position where its front section coacts with the roller 937 which is secured to the rail 19 on each side of the machine. The member 925 when in contact with roller 938 is restrained from endwise movement while the table frames are moving laterally. Frames 934 are guided in the grooves of sections 916, 917 and 920 and are supported by rollers 939 acting upon section 923, while similar rollers act upon section 924 of each table frame.

The tables carried by the frames shift from side to side of the machine so that each table moves inward between the frame pieces 6 and 7 to receive the severed pieces deposited by the work-carrier. As the gear-wheel 932 reverses, it moves the tables laterally outward until the gear-wheel reaches the curve 931 of the gear-rack, at which time this table is in position to pass between the walls 6 and 7 for reception of the severed pieces. This operation is accomplished by the mechanism shown in Fig. 5. The gear-wheel 932 is secured to the shaft 941 having a collar 933 mounted thereon to rotate freely and act as an anti-friction roller against track 928. Bevel gear 942 secured to shaft 941 coacts with a similar gear 943 mounted on the horizontal shaft 944 in bearings 945, and has secured thereon a gear 946 (Fig. 1) which meshes with a segmental gear 947 that is provided with arms 948 secured to the shaft 949.

Secured to an end of shaft 949 (Fig. 3) is a lever 950 slotted at 951 and threaded to receive a screw 952 which engages bolt 953 pivoted at 954 to the lever 950 and serving as a means of adjusting the bolt in the slot 951 to increase or decrease the movement of the segmental gear 547 which regulates the extent of the movement of the work-receiving tables. A rod 955 is adjustably secured in the joints 954 and 956 pivoted at 957 to the arm 958 of the crank 301 which is secured to the trip-ring 300 by bolt 302. As the trip-ring rotates at the same speed as the master or pattern cam, the arm 958 moves rod 955, actuating lever 950 and moving the segmental gear 947 which is connected with and turns gear 933 to move the tables inward at the proper time for reception of the severed articles.

Located and secured at the rear of base 18 is a ratchet-wheel 959. Section 914 of the frame 911 carries a pawl which coacts with said ratchet-wheel, causing it to turn as the tables move laterally in one direction. The ratchet-wheel is provided with any desired number of teeth so that as the articles are deposited on the tables, the ratchet-wheel is moved accordingly. It is provided with a pin 960 which contacts with the lever 961 of a signal-bell so that as the ratchet-wheel completes each revolution the bell will ring and indicate the number of articles placed on the table.

*Stopping and starting devices.*—The structure shown in Fig. 112 is located on the end of main shaft 308 where the shaft is broken off in Figs. 1 and 1ª. The machine is provided with a device which enables the operator to start and stop the machine as a whole at will; with means to start and stop any of the cutting-and-sewing machines; with means to stop the entire machine in case stitching fails; and with means to start and stop either or both of the transversely-movable sewing-and-cutting machines on desired portions of the work to permit the sewing to be discontinued at certain portions, to permit the cutting to be discontinued at certain portions, and so that certain portions may be cut off and the edges stitched on one side of the machine while at the other side cutting-and-sewing continues. A clutch pulley (Fig. 112) having a sliding sleeve 963 on main shaft 308 is provided with a groove to engage a stud and roller 964 carried by arms 965 which are integral with sleeve 966 on shaft 967 in the bearing 968. This bearing is integral with guard 969 which covers the fly-wheel 307 around which the power-belt travels transmitting power from motor 305 to the fly-wheel. Guard 969 covers the greater portion of the fly-wheel and has an extension 970 connecting with frame portions 3 at 971 (Fig. 1) secured in place at 972.

The shaft 967 extends upward through bearing 968 and is provided with a cap 973 having hubs 974 bored to receive the horizontal hand-bars 975 and 976 (Fig. 1ᵇ). These bars extend laterally (Figs. 1ᵇ, 3 and 4). Hinged to the bar 976 is a rod 977 extending across the machine from one side to the other and having an end supported by a link 978 pivoted at 979 at the top, and pivoted to the gear casing 367 at 980. The bar 975 connects with a short link 981 at 982. The other end connects with a rod 983 at 984. Link 981 forms a universal connector. The rod 983 extends along the front of the right-hand sewing machine shown in Fig. 2 and couples with a universal link 985 at 986 and to the rod 987 at 988. Rod 987 is substantially the same length as the rod 983 and extends along the front of the left-hand sewing machine shown in Fig. 2.

Rod 987 is supported by levers 989 and 990 which are pivoted respectively at 991 and 992 to the rod 987, while the other ends of the levers 989 and 990 are pivoted respectively at 993 and 994 (Fig. 111). The rod 983 is supported by levers 995 and 996 respectively pivoted at 997 and 998 to the rod, while the other ends are pivotally connected at 999 to the bell-cranks 1000.

The trolley mechanism already described operates along the rods 983 and 987 which with the rod 977 constitute a means of control for starting and stopping the machine, such means being accessible from any side of the machine.

The dotted-line position in Fig. 111, of the features 985, 986, 989 and 990 represents the position when the machine is stopped. By moving the rods in the direction of the arrow, so that the levers assume the full-line position, the rods are raised to the height indicated by the rod 983 which lifts the trolley mechanism that is connected to the sewing machines, and depresses the end 232 of levers 230, putting spring 233 under increased tension and moving the stop 235 from the clutch. Thus the sewing machines are put in operation when the clutch at the fly-wheel is actuated and the entire machine is then instantly started, together with the two sewing machines, either or both.

Regulating means for the trolley construction cause the sewing machines to start and stop instantly with the main machine, and their operation is quite important. The main shaft 308 is usually given about three hundred revolutions per minute, while the sewing-machine shafts may be operated at a speed of about four thousand revolutions per minute, and it is important when operating upon certain kinds of work to have the sewing machines start and stop accurately with the main machine so that there will be no variation in the length of stitches. The adjustment in question is made by turning the nut 245 already described.

*Starting and stopping sewing machines automatically.*—To start and stop the cutting-and-sewing instrumentalities automatically four bell-crank levers (Figs. 2 and 111) are pivotally supported at 1001 to the sections 2 and 4 of the mechine frame. These bell-crank levers carry the levers that connect with the rods 983 and 987. The other ends of the levers are connected by links 1002 so that one will have the same relative movement as the other. The two inner bell-crank levers are connected to the rods 990 and 996 by means of links 1003 which also connect with levers 1004 pivoted to the frame portions 6 and 7 at 1005. The levers 1004 are also fulcrumed at 1005 and extend over the master or pattern cam 268, their free ends being provided with anti-friction rollers 1007 in contact with the periphery of the cam 268 and so held by springs 1008 connected to levers 1004 and to the frame portions 6 and 7.

Cam 268 is provided (Figs. 7, 72 and 73) with T-headed bolts 268^A passing through the wall of the cam. These heads engage in the T-slot of cam 1009 shaped to fit on the periphery of the cam 268 and to receive the T-heads of the bolts 268^A which are provided with nuts to securely fasten the cam 1009 in position. One of these radially projecting cams 1009 is adjusted on each end of the pattern or master cam 268 so as to regulate the time at which the sewing machines are started and stopped (Fig. 111).

In Fig. 111 the right-hand lever mechanism in the full-line position has the roller 1007 coöperating with the cam 268, while the lever mechanism at the left-hand side has the roller 1007 on the cam 1009 for depressing or drawing down the levers 989 and 980. When the mechanism reaches the position just described, the rods 987 and 983 are dropped down to the level of the position shown by the dotted line on the right-hand side, which indicates the stopped position of both of the sewing machines. But if either rod 987 or 983 is alone at that level, with the other rod up, then only one sewing machine will be stopped and the sewing machine so stopped will be the one on the other side.

*Electric stop if thread breaks.*—Figs. 13, 106 and 108 show an electrical device for stopping the machine in case the stitching fails. An insulator 15^A (Fig. 1) is secured to track 15. Two electrical conducting rails 15^B secured to the insulator and spaced apart, extend along the rail 15 and suitable leads A A are connected to the rails 15^B for attachment with batteries or a lighting circuit. Leads A A are connected to the rails at one end (Figs. 2 and 13) and are in circuit with lamp B and with the magnet coil D which is located and secured at E to the guard 969 for the fly-wheel. A bracket F attached at 130 (Fig. 8) to each sewing-machine head (Figs. 11 and 12) is secured to the wall 113 adjacent to the opening 129. Said bracket is provided with bearings G (Fig. 115) pivotally supporting the two-arm lever H. Copper shoes I are carried by the insulator from bracket F and slide along the rails 15^B. Each shoe carries a platinum contact $a$ (Fig. 114) which coöperates with a U-shaped conductor J, also having a platinum contact $b$ (Fig. 115), which is secured by the insulation K to the lever H one arm of which extends outward and is provided with a series of apertures to receive the balance-weight L (Figs. 11, 12 and 30) to balance the lever so that its upward movement is very sensitive. The end of lever H extends upward in the slot 106 of the sewing-machine frame and its free end coacts with the thread as the thread passes from the eyelet 214 to the eyelet 213. The normal position of the lever is such as can cause the electrical connections to be in contact at all times when the thread 210 is out of the needle or becomes slack by reason of skipped stitches or the like. As soon as the connection is made between the shoes I and J the circuit is completed through the leads A A, illuminating the signal lamp B and energizing the magnet D for lifting the lever M to the dotted-line position shown in Fig. 13 and disengaging the catch $f$ from the bolt N and dropping it into engagement with the pin O which is secured to the fly-wheel. At this time the lever P, which is secured to the shaft 967 between the bearings 968, is moved into the dotted-line position shown in Fig. 108 and brings the bolt N directly under the pole of the magnet at the time the end of the lever is at a position remote from the magnet, whereby the bolt N is immediately drawn up by the magnet to the position shown in Fig. 13 where the latch is again brought into engagement with the bolt N. When the lever P reaches this position the lever mechanism controlling the stopping of the entire machine is actuated, the main clutch of the fly-wheel being then released and the sewing-machine clutches being then engaged by the levers, but the motors, one belted to the fly-wheel, and the other two belted respectively to the two sewing machines, remain in operation.

Each sewing machine is equipped with an electrical stop-motion and so long as the machine remains stopped and the thread is broken the lamp B remains illuminated to show that the machine is out of operation. This thread-engaging lever H may be omitted if desired.

*Pattern-cam and various kinds of work.*— The sewing machines reciprocating upon the tracks 15 and 126 and controlled in their movements by the levers 266 from the pattern-cam 263, permit the cutting and stitching instrumentalities to cut and sew along any given line or lines in the general direction of the length of the goods fed through the machine.

To enable the machine to produce designs such as are shown in Figs. 91 to 97 inclusive, I have provided needle-holders 88 carried by the needle-bars with vertically-reciprocating knives 88^A adjustably secured to the holders. These knives are pointed to pierce the work at the same time sewing is started at S, so as to cut out the sections T, and stitch and cut to the point U where the cutting and stitching instrumentalities are stopped.

Fig. 91 represents the manner in which drawers are produced. Fig. 92 represents the manner in which union suits are made. The lines V represent the lines at which the cutting-off knives operate. The slits W are produced by the rotary disk-knife $W^1$ (Fig. 95) or by the knife $W^2$ (Fig. 96). Fig. 93 represents a spreader made to fold upon itself, being hinged at the center at $98^A$. The spreader has four ribs $98^B$ and braces $98^C$ connecting therewith, over which the tubular material $98^D$ may pass with the separator inserted between the folds indicated at $98^E$. The product is represented by Fig. 94 where the dotted line indicates the work unfolded. By folding the work in this manner the left-hand knife 98 cuts to shape the legs of the garment while the right-hand knife 98 cuts to shape at the waist X and thence shapes the goods to the arm-hole $X^1$. Thus it will be seen that a very great number of different designs may be cut and sewn by folding the work upon itself as it passes through the machine. Fig. 97 represents a mode in which bags and sacks may be produced, the material A' having its two edges folded over so as to meet in the center at $A^2$. Passing through the machine to the two sewing machines 85 (the band-knives being replaced) in this manner, and the sewing machines being operated by the pattern-cam to start sewing at $A^3$ and $A^4$, the material is held stationary until the transverse seams $A^3$ and $A^4$ are each completed to near the center line at $A^2$ by means of the clutch construction shown in Fig. 79. When the center line has been nearly reached, the feeding of the material again takes place and the sewing machines each remain relatively stationary and without lateral movement, stitching along the center line $A^2$ until the points $A^5$ and $A^6$ are reached. At this time the feeding of the material is again interrupted and the sewing machines are operated to work at right-angles to the center line, stitching to the outside of the material and making a series of stitches $A^7$ and $A^8$ while the material feeds again sufficiently to make a desired margin between the transverse lines of stitching $A^6$ and $A^7$ and $A^{10}$. These movements are repeated as often as required and the material is cut on the center line as at $A^{13}$ by the cutter described below. The lengthwise cutting or slitting separates the material along the center line $A^2$ prior to its passing between the main feed rollers, and the cutting-off knives operate to sever the material on transverse lines, one of which is indicated by $A^{14}$ producing two bags one at each side of the folded strip. The transverse cutter also operates at the line $A^{15}$ to sever the projecting chain-stitching at $A^{16}$. The mouths of the bags are formed by the transverse separation of the material at $A^{14}$. The operation on line $A^{15}$ indicates the bottom of the bags. When the transverse cutter operates at the line $A^{17}$ it again represents the mouth of the bags. The machine may be also actuated to produce so-called "funnel bags", cut and sewn to length and size at three edges and left with a small opening in one seam for the insertion of the funnel.

The splitting above referred to is accomplished by the mechanisms shown in Figs. 75 to 80 inclusive. Secured to the back of the rail 15 is a transverse T-slotted bar B' (Figs. 5, 75 and 79) secured to the frame pieces 6 and 7 at $B^2$ (Fig. 77). Adjustably secured in the T-slot are bearings $B^3$ having vertical shafts $B^4$. Adjustably secured to their ends are levers $B^5$ carrying curved knives $B^6$ which are operated by bevel gears $B^7$ secured to the shaft $B^4$ and meshing with bevel gears $B^8$ fixed on the horizontal shaft $B^9$ (Figs. 5, 75 and 77). An adjustable crank $B^{10}$ is secured to the shaft and has connected with it at $B^{11}$ a rod $B^{12}$. A coupling $B^{13}$ connects a rod $B^{12}$ with a rod $B^{14}$ which is pivoted at $B^{15}$ to the lever $B^{16}$ (Figs. 5 and 75), mounted on the shaft $B^{17}$, in bearings so as to have its roller $B^{18}$ coöperate with the auxiliary cam $B^{19}$, secured to the periphery of the auxiliary master-cam $B^{20}$. Cam $B^{19}$ is identical with cam 1009 and is secured to the auxiliary master-cam $B^{20}$ in the same way that the cam 1009 is secured to the master or pattern cam. As roller $B^{18}$ is lifted to the dotted-line position shown in Fig. 75, the rod $B^{14}$ is actuated to lift the lever $B^{16}$ and operate the bevel gears $B^8$ and $B^7$ so as to swing the hook knives $B^6$ into the work (Figs. 76 and 77). These knives register with an opening $B^{21}$ in each side of the spreader which insures a positive and even cutting action when slitting the work (Figs. 75, 76 and 85).

A slitting knife $B^{22}$ secured to lever $B^{23}$ is pivoted in the bearing $B^{24}$. The lever terminates in a rounded end having gear teeth $B^{25}$ which coöperate with the adjustable gear $B^{26}$ secured to shaft $B^9$. At the same time the hook knives $B^6$ are actuated, the knife $B^{22}$ is also tipped upward as shown in Figs. 75 and 76 to enter the bottom ply of the material to make the cut indicated at $B^{27}$.

The knife $B^{22}$ is capable of making the cut $A^{13}$ and the slits W shown in Figs. 91, 92 and 97. The actuating mechanism described is arranged to have the rod $B^{12}$ extend above the work and connect with the lever $B^{28}$ (Fig. 79) pivoted to the transverse shaft $B^{29}$ which is supported in bearings of the machine frame (Fig. 80). A brace $B^{30}$ rigidly connects the levers $B^{28}$ and rod $B^{12}$ connects to the lever at $B^{31}$. A rotary shaft $B^{32}$ operates in bearing $B^{33}$ and its end movement is controlled by collars $B^{34}$. A rotary disk-cutter $B^{35}$ is adjustably secured on the shaft and may be set at any position between the bearings $B^{33}$ as desired. A flexible shaft $B^{36}$ connects to the shaft $B^{32}$ at $B^{37}$ and to a gear $B^{38}$ operating on a short shaft in the bearing $B^{39}$. Said gear is in mesh with a large gear $B^{40}$ carried by the shaft 467 (Fig. 1ª). In this way a simple and effective rotary slitting device that may be intermittently operated is provided.

*Spreader.*—The spreader illustrated in Figs. 85 and 86 comprises a central rib $C^1$, the plates $C^2$, and the pivoted links $C^3$ connected to the plates and extending on opposite sides. Intermediate its ends, rib $C^1$ is provided with plates $C^4$ between which oppositely-projecting curved links $C^5$ are pivoted. The other end of rib $C^1$ has plate $C^6$ provided with two pivoted links $C^7$ extending in opposite directions. A tail piece $C^8$ is formed to carry an anti-friction roller $C^9$ to eliminate friction on the material as it passes over the spreader. The arms $C^{10}$ and $C^{11}$ have secured to the ends thereof plate $C^{12}$ carrying anti-friction rollers $C^{13}$. Plates $C^{14}$ are secured to the arms $C^{10}$ and $C^{11}$ and have pivoted thereto at $C^{15}$ the links $C^3$. The arms $C^{10}$ and $C^{11}$ are bent inward at $C^{16}$ and have secured thereto top and bottom plates $C^{17}$ which carry anti-friction rollers $C^{18}$ on each side. Between and back of these rollers are rollers $C^{19}$ which carry the weight of the spreader and rest upon the roller 55 (Figs. 66, 3, 4 and 5). Pivoted to the arms $C^{10}$ and $C^{11}$ at $C^{20}$ are curved links $C^5$ and links $C^7$. Pivoted between the plates $C^4$ is a cam-lever $C^{21}$ having a cam portion $C^{22}$ which may be brought into engagement with the rib $C^1$ to lock the spreader and make it rigid so that it will not change its size when used in the machine. To adjust the spreader from one size to another, the handle $C^{21}$ is provided to move the cam $C^{22}$ away from the rib $C^1$. As shown in Figs. 76 and 79 the spreader coöperates with the guide rollers 73 and 78 and the rollers $C^{16}$ of the spreader coact with the feed rollers 69 and 413.

*Band-knife-grinder.*—In Figs. 98, 99 and 100 the grinder for the band-knives 98 is illustrated. The grinding attachment consists of a swinging arm $96^A$ secured to the shaft $96^B$ which extends through the bearing 96 and carries an adjustable lever $96^C$ having a spring $96^D$ connected with the arm 85 of each sewing machine, and exerting a tension to bring the driving wheel $96^E$ in contact with a tire of each wheel 149. This contact causes the belt-wheel $96^F$ to rotate because the wheels $96^E$ and $96^F$ are secured to the shaft $96^G$. To transmit power from the wheel $96^F$, a belt $96^H$ (Fig. 2) is used to operate on the wheel $96^I$ which is slidably mounted on the shaft with a grinder $96^J$. The grinding-wheel $96^K$ is secured to one end of the shaft, and the knob $96^L$ is secured to the other end to enable the operator to move the shaft in and out through the bearing $96^M$ so that the grinding-wheel will pass to and fro at the cutting edge of the band-knife in the grinding operation. The attachment is pivoted at $96^N$ to a stud $96^O$ and is adjustably secured to the post $96^P$ held at 146 of arm 162. This post is slotted at $96^Q$ to receive and guide the band-knife while it is being ground. The grinder may be swung from one side of the knife to the other so that either or both edges of the knife may be ground.

*Waste strips.*—When the machine is cutting and sewing many designs that require the cutting out of a surplus piece, it is desirable to keep this piece for use in making up other portions of garments, and the machine is provided with a reel for winding up the surplus material. The device consists of a guide-roller $308^A$ (Fig. 5) mounted on the frame and the material passes down behind the track 15 to the roller and thence to the winding-up roller $308^B$, which is driven by belt $308^C$ (Fig. 4) from feed roller 69. The take-up roller or reel $308^B$ is detachably secured in bearings $308^D$ (Fig. 6).

*Cutting parallel strips and slitting them.*—This work is accomplished by the built-up feed roller shown in Figs. 16, 17, 18 and 19, in place of the regular feed-roller 413. A shaft $413^B$ extends through the collars $413^A$. The shaft is provided with a key-slot $413^C$ for the key $413^D$ of the disk rotary cutters $413^E$. The collars $413^F$ are secured to the shaft between the disk-cutters, and the collar $413^G$ is slidably mounted on the other end of the shaft. A heavy spring $413^H$ acts against the collar $413^G$, and with the nut $413^I$ holds the cutters and collars tightly together. The roller is mounted in the blocks 425, and the levers 427 carrying the weights 430 and 432 coöperate with this feed-roller in the same manner as with the feed-roller 413 if that is used. Collars $413^A$ (Figs. 16 and 17) are provided with central bore $413^J$ much larger than the shaft upon which they are mounted. Thereby each collar has its own independent movement and pressure according to the thickness of the work passing between the roller 69 and the collar $413^A$. In operation the disk-cutters are subjected to the entire pressure of the weights and levers acting upon the ends of the shaft $413^B$ so that the disk-cutters operate in opposition to the bottom roller 69 which has a plain portion indicated by $69^A$ to coöperate with each rotary cutter $413^E$. Fig. 128 shows scallop work, the pattern of which depends upon the configuration of the master or pattern cam groove.

*Hemstitched handkerchiefs, towels, napkins, etc.*—To produce rectangular products hemmed and stitched on four sides, the machine is provided with a third cutting-and-stitching machine $85^A$ which is mounted to reciprocate transversely of the machine across the line of feed and to cut and stitch in the same direction. The sewing and cutting machines 85 already described, are movable transversely of the line of feed, but cut and sew in the general direction of the line of feed. As shown in Fig. 1$^a$, the machine is provided with edge formers 73$^A$ detachably secured in the slot 72 of the plate 71 which is graduated to facilitate the setting of the formers which act upon the long edges of the material as it is fed through the machine to produce the initial side folds as it passes through the usual hem-folder 78$^A$, one right and one left, secured to the machine base at 109$^A$ and guiding the folded hems to the stitching instrumentalities of the sewing machines 85 from which the band-knives will be removed. In this class of work the movable cutting-off knife is thrown out of operation by shifting it upon a shaft 319 upward, so that it occupies a position in which it does not cut. Its actuating mechanism however remains in action and the sewing machines 85 are disconnected from the master or pattern cam and moved into desired positions on the rail 15.

The transversely moving cutting-and-sewing machine 85$^A$ is operated from shaft 297 (Figs. 5, 7 and 15) and operates transversely of the strip that is hemstitched by the machines 85 along the long edges of the strip. It is slidably mounted on the transverse rails 15$^a$ and 15$^{aa}$ (Figs. 1$^a$ and 4). Rail 15$^a$ is identical in construction with the rail 15 and has insulation 15$^A$ with upper and lower parts corresponding to 15$^B$ (Fig. 106). The head of machine 85$^A$ is the same general construction as shown in Fig. 8 and has any desired stitching instrumentalities. Its drive-shaft is rotated from an electric motor carried by the head as is also the case with the cutting-and-sewing machines 85 (Fig. 11). It is reciprocated by the following devices: Its telescopic connecting-rod 254 has a hook 257 (Fig. 11) which is, as in the case of one of the machines 85 engaged with the stud on a lever 266 controlled by a master cam,—in this case by the supplementary master-cam referred to above. The machine 85$^A$ comprises ordinary needle, presser foot, feed and cutting arrangements shown in Figs. 124 to 127 inclusive, and the gear 364 is shiftable on the main shaft 308 (Figs. 1, 79, 81 and 82,) and is operatively connected with said auxiliary cam B$^{20}$ (Figs. 5 and 79). Gear 364 is shifted into and out of engagement with the gear 365 by the forked lever 364$^A$ coöperating therewith and pinned to the shaft at 364$^B$ which operates in the bearing 364$^C$ having secured to the shaft a lever 364$^D$ connected by means of a rod B$^{12}$ so as to coöperate with the cam B$^{19}$ to move the gear into and out of engagement with gear 365, a spring $m$ operating to keep the roller B$^{18}$ in contact with the cam B$^{19}$ so as to couple the gears as the roller drops from cam B$^{19}$.

When the work-carrier has reached a suitable position along the rails 29 and 30, the main feeding mechanism is stopped. At the same time the stitching instrumentalities of the machines 85 are stopped and simultaneously with the stopping of the feed rollers (Fig. 111). The feeding movement of the goods is suspended while the machine 85$^A$ is reciprocating across the goods. In this transverse movement in the direction of the arrow in Fig. 1$^a$, a folding attachment coöperates with the material 36 (Figs. 124, 125 and 127). At this time it sags transversely as shown in Fig. 118. As head 85$^A$ moves laterally, the sagged goods climbs the horn D$^1$ forcing the material up into a U-shape as at D$^2$ (Fig. 119). A controller D$^3$ shaped to lie on each side of the horn serves to hold the portions D$^4$ of the work in a horizontal position as it is climbing the horn and passing over the same. The movement of the machine 85$^A$ continues as the hemmed edge D$^5$ is slit by the cutter D$^6$ acting upon the blade D$^7$ which is secured to the horn D$^1$. The cutter D$^6$ is carried by one end of a bell-crank lever D$^8$ and is pivoted at D$^9$ to the extending lug D$^{10}$ which is integral with horn D$^1$. A right and left hem folder D$^{11}$ and D$^{12}$ have secured thereto bosses D$^{14}$ provided with screws holding the ends of the wire controller D$^3$. The attachment is secured to the base of the machine by the extending bracket D$^{15}$. The needle-bar D$^{16}$ carries the usual needle-clamp D$^{17}$ provided with a lug D$^{18}$ which receives one end of the link D$^{19}$, the other end of which connects with the lever D$^8$. The attachment is mounted to give movement to the knife D$^6$ as the needles are passing through the work, and lifts the knife as the needles are out of the work. It is preferred to use an ordinary feeding mechanism in the machine 85$^A$ to act upon the hems while the same are being separated by the slitting mechanism.

A feed-dog D$^{20}$ coacts with the usual compensating presser foot D$^{21}$ that coöperates with the throat plate D$^{22}$ to produce the hems D$^{23}$ as will be readily understood by all skilled in the art.

As the work is held between the feed rollers and the work-carrier and is thus made taut thereinbetween, and as the machine 85$^A$ moves in the direction of the arrow to the position where the work has been brought into engagement with the slitting attachment, the goods are forced into the scrolls of the diverging and oppositely-disposed hemmers D$^{11}$ and D$^{12}$ so that the right-angle folds are pressed between the presser foot and feed.

The stopping and starting mechanism is arranged to lift the rod 97ᴬ (Figs. 1ª and 1ᵇ) to start the sewing of the hem, at which time the folding mechanism D¹¹ and D¹², coacting with the feed-foot D²¹ draws the material through so as to feed it at approximately the same speed as that at which the machine 85ᴬ is traveling across the width of the material. As soon as the machine has completed the hems D²³ it returns quickly to its initial position as shown in Fig. 1ª, by the quick movement of the cam B²⁰, at which time the cam B¹⁹ has passed from under the roller B¹⁸ so that the gear 364 is again coupled with the gear 365 for movement of the material.

At the same time the sewing machines 85 are started, the work-carrier passes rearwardly a sufficient distance to place the severed and completed product on the table 940 when the notch 344 of the trip-ring 300 coöperates with the lever 339 to actuate the cutting-off mechanism for releasing the work from the work-carrier whereby the latter drops the finished product upon the table 940. Thereupon the work-carrier returns to its forward position to receive the hemmed end of another piece of work. Various lengths are obtained by manipulating the lever 368 and 369 or the knob 382 so as to shift the gears which control the speed of the feed-rollers.

In Fig. 4, 19ª and 19ᵇ are supports respectively for the tracks 15ª and 15ᵃᵃ. The tensioning mechanism at the front of the machine and the main feed rollers form one field of taut and smooth goods wherein the cutting and stitch-forming instrumentalities of either or both machines 85 cut and sew (or wherein the machines 85 will merely sew if their cutters are thrown out of action or removed). In this case the transverse plate 360 and the swinging transverse clamp bar 351 (Fig. 67) hold the advancing end-portion of the goods stationary during the operation of the product-severing mechanism consisting of the stationary knife 321 and the movable knife 317. But if the movable cutter-blade be thrown out of action and the transverse reciprocating cutting-and-sewing machine 85ᴬ be thrown into action, then the work-carrier, having clamped the end margin of the advancing product-forming end-portion of the goods and moved rearwardly far enough to take up the slack in such end portion, performs one of its functions, which is that of a tensioning mechanism, by pulling against the bite of the clamping mechanism or the feed-rolls on the goods; and thus a second field of taut and smooth goods is obtained in which the machine 85ᴬ operates when it is employed, its cutter in such case forming the product-severing mechanism.

The jointed horizontal members 975, 976 etc. (Fig. 1ᵇ) above described, constitute a manually operable device for operating the stop-clutch of the main shaft and other parts. Neither sewing machine 85 has a feeding mechanism between the needle and under devices for forming stitches.

The product-severing mechanism, whether it consists of the shearing form described or the cutter carried by sewing machine 85ᴬ, completely severs the product from the advancing end of the goods. This effects an important saving in thread as compared with the well known manufacturing procedure in which numbers of sewn articles are connected at intervals apart by the thread, as for example in "chaining out" on chain stitch machines as commonly used, inspectors being employed to cut and trim off the connecting threads.

From the entrance of an end of the bolt or strip of goods until it has been converted into severed articles stacked in piles of known number on the work table, the movement of the goods, including the severed products, is in a straight path perpendicular to the feeding mechanism, except in the dropping of the products, and this is greatly advantageous in that it insures full and accurate control by the machine of the goods and product at every step in the process of converting the bolt into the desired products.

The described guidance of the band-cutters of machines 85 adjacently to the needles prevents the band-cutters from wabbling in passing through the cloth and insures requisite nicety of the cut adjacent to the seam. This is particularly important when the machine is run at high speed.

Referring again to the flap-control, and raking, and reciprocating feed mechanisms, the accurate coöperation of which is highly important, it is noted that the rake tines in their lifting movement push against the flapper teeth, as the rocking teeth 858 (Fig. 67) may be called, and push them upwardly, thereby lifting the flap or advancing product-forming end of the goods into horizontal position under the transverse grid; the rake tines then rocking forward and pointing rearwardly past the ends of the flapper teeth and extending farther under the flap in the rearward direction. The teeth of the upper and under jaws of the work-carrier pass over and under the advancing end, and in this movement pass between the contacting rake tines and flapper teeth, closing upon the end of the goods and then pulling the flap rearwardly, and thereby tautening the goods on the rear side of the feeding mechanism. The auxiliary agitating-feeder pushes and guides the advancing end toward and into the flap-controlling mechanism and prevents such end from running upwardly between or against the main feed rolls, the knurled surfaces of which have been found to be of practical importance in the machine from which the accompanying drawings have been largely made.

What I claim is,

1. A cutting-and-sewing machine comprising a product-severing mechanism; a tensioning mechanism; a feeding mechanism which is operable across the width of the goods to draw an end portion of the goods in a straight path into position for operation thereon, transversely to the direction of the feed of the goods, of the severing and tensioning mechanisms; a sewing mechanism operable to sew the goods in a tautened portion thereof and located between the tensioning and feeding mechanisms; mechanism operatively connected with the sewing mechanism for causing it to travel while sewing; mechanism for actuating the tensioning and feeding mechanisms positively for tautening the goods between them; means for actuating the product-severing mechanism to cut off predetermined lengths of the sewn goods; and means for holding the advancing end portion of the goods stationary during the severing operation.

2. In a cutting-and-sewing machine, the combination of a sewing machine comprising an upper arm carrying stitch-forming instrumentalities and a lower arm also carrying stitch-forming instrumentalities, with a cutter operatively adjacent to the stitch-forming instrumentalities, the sewing machine also comprising a drive-shaft from which the stitch-forming instrumentalities are operated; a support on which said machine is slidably mounted; means for moving said machine on said support; a feeding mechanism; a master device operatively connected with said means for automatically determining the path of its cutting and stitching operations; a main drive-shaft operatively connected with said master device for actuating it; and means for operatively connecting the main drive-shaft with the drive-shaft of the movable sewing machine during the travel thereof; and means coöperating with the feeding mechanism for tensioning the material during the cutting and stitching operations.

3. In a cutting-and-sewing machine, the combination of a plurality of cutting and stitch-forming structures, with a feeding device common to both structures, and a master device for reciprocating either of the structures transversely to the line of feed.

4. In a cutting-and-sewing machine, the combination of a plurality of cutting and stitch-forming structures, with a feeding mechanism, and a master device operatively connected with each structure for moving the same relatively to the line of feed, and intermediate said structures and device, adjustable members for varying the range of movement of one of said structures during the operation of both structures.

5. In a cutting-and-sewing machine, the combination of a sewing apparatus movable on a support and having an upper and a lower arm, each arm carrying a cutter-supporting wheel; an endless band-cutter mounted on said wheels, one run of the cutter operating to cut an edge to be sewn; means for driving the band-cutter; and means for moving the sewing apparatus on said support.

6. In a cutting-and-sewing machine, the combination of a cutting mechanism; a stitch-forming mechanism; a feeding mechanism; means for effecting simultaneous cutting and stitching operations; means for varying the position of the cutting and stitch-forming mechanisms relatively to the line of feed during the feeding operation; a transverse length-cutter; and means for arresting the feeding movement during the operation of the transverse length-cutter.

7. In a cutting-and-sewing machine, the combination of a main drive-shaft; a master cam roll operatively connected with the main drive-shaft; a support for a movable cutting and sewing structure; such cutting and sewing structure; means operatively connecting such structure with the master cam roll; a transverse length-cutter mechanism; and means operatively connecting it with said master cam roll.

8. In a cutting-and-sewing machine, the combination of a feeding mechanism operative widthwise of the strip; a tautening mechanism spaced apart from the feeding mechanism and operable transversely to the direction of the feed of the goods and wholly across the feed path thereof; a traveling cutting-and-sewing machine movable in the field between the feeding and tautening mechanisms; means comprising a pattern cam for moving the cutting-and-sewing machine during its cutting and sewing operations; and means for operating its cutting and sewing instrumentalities during its traveling movements.

9. In a cutting-and-sewing machine, the combination of a feeding mechanism operative widthwise of the strip; a tautening mechanism spaced apart from the feeding mechanism and operative transversely to the direction of the feed of the goods and wholly across the feed path thereof; a plurality of traveling cutting-and-sewing machines each movable in a field between the feeding and tautening mechanisms; means comprising a pattern-governor for moving both cutting-and-sewing machines during the cutting and sewing operations of each machine; and means for operating the cutting and sewing instrumentalities of each machine during its traveling movements.

10. A cutting-and-sewing machine having a feeding mechanism and a plurality of sewing machines to which the feeding mechanism is common, the sewing machines being movable transversely to the direction of the feed of the goods; and a master pattern cam operatively connected with each sewing machine for moving it; and a cutting mechanism on each sewing machine operative adjacently to its sewing instrumentalities.

11. A cutting-and-sewing machine having a feeding mechanism and a pair of cutting-and-sewing machines to which the feeding mechanism is common; and a cutting-and-sewing machine reciprocable transversely to the feed of the goods; and means for reciprocating the transversely moving sewing-machine.

12. A cutting-and-sewing machine having opposite side frames and mounted therein a member transverse to the path of the feed for holding a cutter in the path of the feed of the goods; a feeding mechanism parallel with said member; a pair of movable sewing machines; and a track therefor parallel with said member.

13. A cutting-and-sewing machine having opposite side frames and mounted therein a shaft transverse to the path of the feed of the goods and parallel with and in front of the feeding mechanism; the feeding mechanism; and means for rotating said shaft during operation of the feeding mechanism, the shaft being adapted to hold a cutter in the path of the feed of the goods; a pair of movable sewing machines; and a track therefor parallel with the feeding mechanism.

14. In a cutting and sewing machine, a front tensioning mechanism and a pair of feed rolls parallel to the front tensioning mechanism, said tensioning mechanism and feed rolls being located to contact with the goods across the width thereof and transversely to the direction of the feed of the goods; a movable cutting and sewing machine, a track therefor parallel with and intermediate the tensioning and feeding rolls; and in front of the cutting and sewing machine, side guides for the goods when distended by a spreader; and the spreader.

15. In a cutting and sewing machine, a front tensioning mechanism and a pair of feed rolls parallel to the front tensioning mechanism, said tensioning mechanism and feed rolls being located to contact with the goods across the width thereof and transversely to the direction of the feed of the goods; a movable cutting and sewing machine, a track therefor parallel with and intermediate the tensioning and feeding rolls; and in front of the cutting and sewing machine, side guides for the goods when distended by a spreader; the spreader; a side member of the spreader having a knife-receiving slot; and a knife located to pass through goods over said slot and into the slot.

16. In a cutting and sewing machine a front tensioning mechanism and a pair of feed rolls parallel to the front tensioning mechanism, said tensioning mechanism and feed rolls being located to contact with the goods across the width thereof and transversely to the direction of the feed of the goods; a movable cutting and sewing machine; a track therefor parallel with and intermediate the tensioning mechanism and the feed rolls; and a folding guide at each side of the feed path of the goods.

17. In a cutting and sewing machine, a front tensioning mechanism and a pair of feed rolls parallel to the front tensioning mechanism; said tensioning mechanism and feed rolls being located to contact with the goods across the width thereof and transversely to the direction of the feed of the goods; a movable cutting and sewing machine; a track therefor parallel with and intermediate the tensioning mechanism and the feed rolls; and a transverse table for supporting attachments mounted between the tensioning mechanism and said track.

18. A cutting-and-sewing machine provided with a plurality of transversely extending tracks which severally project laterally beyond the feed path of the goods; a pair of cutting and sewing machines movably mounted on said tracks; and mechanism for reciprocating them thereon while they are cutting and sewing.

19. The combination, in a machine for operating on goods, of a manually operable device for actuating the stop-clutch of a main shaft; the stop-clutch; the main shaft; and operably connected therewith a change-speed gear mechanism for securing different lengths of product from a pattern cam; the change-speed gear mechanism; the pattern cams; a feed mechanism operatively connected with the change-speed gears; a tensioning mechanism operatively connected with the feeding mechanism; a trip-ring operatively connected with the main shaft; a master cam operatively connected with the main shaft and with a movable machine head having a drive-shaft; such machine head; operative connections between the trip-ring and tape-actuating mechanism for a work-carrier; such tape mechanisms; the work-carrier; operative connections between the master cam and the drive-shaft of the movable machine head; a clamping mechanism for the advancing end of the goods, and operatively connected with the trip-ring; an auxiliary agitating feed-mechanism operatively connected with the trip-ring; a flap-controlling mechanism operatively connected with the trip-ring; a product-severing mechanism operatively connected with the trip-ring; a raking mechanism operatively connected with the trip-ring; and a work-table carrier operatively connected with the trip-ring.

20. A cutting-and-sewing machine comprising, in combination, a main shaft; a trip-ring operatively connected therewith; a work-table carrier operatively connected with the trip-ring; a plurality of work tables on the carrier; and mechanism for reciprocating them endwise.

21. A cutting-and-sewing machine comprising, in combination, a trip-ring operatively connected with the main shaft of the machine; a master cam operatively connected with the trip-ring; and a sewing machine operatively connected with said master cam.

22. A cutting-and-sewing machine comprising, in combination, a manually operable device for actuating a stop-clutch for the main shaft; the stop-clutch; the main shaft; a feed mechanism operatively connected with the main shaft; a mechanism operatively connected with the main shaft for operating a product-severing mechanism; a product-severing mechanism; flap-controlling mechanism; a work-carrier; a master cam operatively connected with the main shaft for moving the sewing machine; and a sewing-machine stop-motion.

23. A cutting-and-sewing machine comprising, in combination, a master cam; a sewing-machine-moving lever operatively engaging the cam; a movable sewing-machine head; and an adjustable connecting rod between the lever and the sewing-machine head.

24. A cutting-and-sewing machine provided with upper and lower band-cutter-wheels, in combination with a mechanism for positively driving one of said wheels and comprising a shaft operatively connected with the drive shaft of the sewing machine; and a band knife, one run of the band-knife operating adjacently to the stitch-forming instrumentalities of the sewing machine.

25. A cutting and sewing machine comprising, in combination, a sewing mechanism, a drive shaft for actuation of the sewing mechanism, a motor fixed to and carried by the framework of the sewing mechanism and having its shaft operatively connected to said drive shaft and also having its shaft operatively connected with mechanism for driving the band cutter; and said mechanism for driving the band cutter; and a band cutter.

26. A cutting-and-sewing machine comprising, in combination, a reciprocating work-clamping carrier, having jaws transverse to the direction of the feed of the goods; and mechanism for reciprocating and operating the carrier; and a plurality of traveling, cutting and sewing machines movable in paths crosswise of the path of the reciprocation of the carrier and to the direction of the feed of the goods; and a pair of feed-rolls parallel to the paths of the cutting and sewing machines and crosswise of the path of the reciprocation of the carrier.

27. A cutting-and-sewing machine, in combination with a goods feeding mechanism, a flap controlling mechanism; a reciprocating work carrier and a device comprising a pair of jaws for arresting the work-carrier at the end of its forward movement for absorption of shock and to prevent rebound of the work-carrier, the latter comprising a member receivable by and disconnectible from the jaws.

28. The combination of a reciprocable work-carrier for a cutting or sewing machine; a support on which the carrier reciprocates; actuating tapes for the work-carrier; and tape-controlling mechanism comprising a ratchet and latch mechanism.

29. A cutting-and-sewing machine comprising, in combination, a sewing machine operatively connected with a master cam; the master cam; a segmental cam mounted projectingly on the master cam; operative connections between the segmental cam and the sewing machine for starting and stopping the stitching operation of the sewing machine.

30. A cutting-and-sewing machine provided with a pair of main feed rolls and an auxiliary feeding-mechanism comprising a crank-shaft and crank-shaft-actuated work-engaging members carried transversely of the path of feed and comprising members which are alternately pushed against and raised from the advancing end of the goods.

31. A cutting-and-sewing machine having, in combination, an auxiliary feeder; means for moving said feeder into an inoperative position during the cutting movement of a transverse product-severing blade; and a transverse product-severing mechanism; and transverse to the path of feed, rearwardly of the auxiliary feeder, flap-controlling means comprising upper and under flap-engaging members.

32. A cutting-and-sewing machine having, in combination, a transverse main feeding mechanism; a transverse product-severing mechanism; and a transverse auxiliary feeding mechanism; the main feeding mechanism comprising separable feed rolls; and automatic actuating means for lifting the auxiliary feeding mechanism into an inoperative position when the main feed rolls are separated for insertion of work.

33. A cutting or sewing machine, comprising a detachably mounted pattern cam; and a driving gear therefor detachably coupled therewith; and an adjustable peripheral cam member rotating with the master cam.

34. A cutting or sewing machine having, in combination, a detachably mounted pattern cam; a driving gear therefor detachably connected therewith; and a trip-ring connected with said driving gear by intermediate gears; and such intermediate gears; and a peripheral circumferentially-extending cam adjustably mounted on the surface of the pattern cam and having an operative length less than the circumference of the pattern cam.

35. A cutting-and-sewing machine comprising, in combination, a sewing machine provided with an upper and lower band-knife carrier, one run having a cutting edge operatively adjacent and in close proximity to the stitch-forming instrumentalities, and having its other run removed from the sewing-machine shafts; and the band knife.

36. A cutting-and-sewing machine having, in combination, a plurality of sewing machines movable from and toward each other and each carrying a band-knife with upper and lower support-wheels therefor, and the goose-neck of each machine carrying a drive-shaft for the stitching instrumentalities, the goose-necks being angularly disposed, relatively to the under arm of the sewing machine, to permit the non-cutting run of each band-knife to pass the drive-shaft without contact therewith while the operating run of the band-knife is in close proximity to the stitch-forming instrumentalities; and the band knife.

37. A cutting-and-sewing machine having, in combination, a plurality of cutting-and-sewing machines reciprocatable from and toward each other in a path parallel with the feeding mechanism and between the feeding mechanism and the tensioning mechanism; each machine being provided with a band-knife and upper and lower wheels therefor, the cutting edge of each band-knife running in close proximity to the stitch-forming instrumentalities and cutting in the general direction of the length of the feed of the goods while the machine moves transversely to the direction of the feed of the goods; the non-cutting run of the band-knife passing through the machine at one side of and out of contact with the driving shaft thereof.

38. A machine comprising sewing instrumentalities carried by a machine head provided with a band-cutter and a band-cutter guide adjacent to the sewing instrumentalities, in combination with means for varying the position of the head during its cutting and sewing operations; and means for actuating the band-cutter during the sewing operation; the band-cutter; and the band-cutter guide.

39. A machine comprising a pair of movable cutting-and-sewing machines; a track therefor; and a pair of feed-rolls parallel with the track; a waste-strip take-up roll operable transversely to the direction of the feed of the goods, spaced apart from the main feed rolls, and rotated synchronously therewith parallel with the track; and a change-speed gear mechanism for the feed-rolls.

40. A machine comprising a reciprocable work-carrier and a work-table mounted horizontally under the path of the work-carrier, the work-carrier being operable to drop severed articles in a pile on the table, the work-table comprising a plurality of table tops; and mechanism for reciprocating each table top endwise, such mechanism comprising means for shifting the table tops alternately out of the path of the feed of the goods.

41. A machine comprising, in combination, main feed-rolls and, parallel therewith and closely adjacent thereto, a toothed flapper and a timed rake, the flapper teeth and rake tines being in alinement; and a work-carrier provided with upper and under toothed jaws, the teeth whereof are located to enter the spaces between the rake tines.

42. A machine comprising, in combination, a pair of main feed rolls; an auxiliary feeder for guiding the advancing end portion of the goods into a flap-controlling mechanism, and operating to prevent such end from engaging with the feed rolls after issuing from them; and the flap-controlling mechanism, the feed rolls, the auxiliary feeder, and the flap-controlling mechanism being located transversely to the path of the feed; and between the auxiliary feeder and the flap-controlling mechanism, a severing mechanism located transversely to the path of the feed, and a goods clamp located transversely to the path of the feed.

43. A machine comprising, in combination, a master cam, a lever operated thereby, a traveling sewing mechanism; a connecting rod between the lever and the traveling sewing mechanism, the connecting rod being adjustable to vary the range of the travel of the sewing mechanism, whereby a cam of given contour may be used in the production of seams varying in contour.

44. A machine comprising, in combination, a master cam having a plurality of master-cam operating surfaces; a plurality of sewing machines; for each sewing machine, a lever operated by a cam-operating surface; and, between each lever and a sewing machine, a connecting rod adjustable in relation to its lever, whereby the sewing machines may be simultaneously operated to form a plurality of seams differing in contour one from the other.

45. A machine comprising, in combination, a product-severing mechanism; a reciprocable work-carrier; means for guiding the portion of the goods to be severed to the work-carrier; a work-table carrier under the path of the work-carrier; a plurality of tables on the work-table carrier; a support for the work-table carrier; and, fixed to the support, a plurality of toothed L-shaped gear tracks; means for reciprocating the work-table carrier; and a gear connection between each track and a table whereby the tables are alternately reciprocated on the work-table carrier transversely to the reciprocation of said carrier.

46. In a cutting or sewing machine, a work-carrier supporting frame in line with the feed path of the goods; a feeding mechanism transverse to the direction of the feed of the goods; and on said support a transverse work-carrying mechanism comprising work-gripping jaws; winding-tape mechanisms for reciprocating the carrier; a winding-tape mechanism for operating another tape which controls the operations of the first-mentioned tapes; and a device for checking movement of the tape-actuating tape.

47. The combination of two movable cutting-and-sewing machines having upper and under stitch-forming instrumentalities; a cutter on each sewing machine operatively adjacent to said instrumentalities and operating to cut in the general direction of the feed of the goods; a traveling mechanism operative to cut and sew transversely to the direction of the feed of the goods; and means for moving both sewing-and-cutting machines simultaneously and for operating them to cut and sew during such travel.

48. The combination of a plurality of tensioning mechanisms and an intermediate feeding mechanism, such mechanisms being parallel one to another and each tensioning mechanism being operable across the width of the goods and located transversely to the direction of the feed of the goods; and a plurality of sewing-and-cutting machines each movable transversely to said direction of feed and intermediate a tensioning mechanism and the feeding mechanism.

49. The combination of a cutting-and-sewing machine movable transversely to the feed of the goods and straddling the path thereof and operable to cut and sew in the general direction of a feed; said feeding mechanism; and another cutting-and-sewing machine straddling the path of the feed of the goods and operable to cut and sew transversely to the direction of said feed.

50. The combination of a cutting-and-sewing machine movable transversely to the direction of the feed of the goods; a feeding mechanism; electrical contact devices in the path of said cutting-and-sewing machine; and an electrically-operated stop-motion for the drive shaft of the cutting-and-sewing machine and in electrical connection with said contact devices.

51. The combination of a goods-holding roll; a roll adjacent the holding-roll and for supporting a roll of goods; a goods roll at one side of such adjacent roll; a pivotally-mounted tension device provided with a plurality of parallel rods; and a pair of feed rolls; all said rolls and rods being located transversely of the direction of the feed of the goods; intermediate the feed rolls and said other rolls, a sewing machine; and intermediate the sewing machine and said tensioning device a member carrying guide rollers and graduated to represent different widths of material; indicator devices; and adjustable guides.

52. The combination of a goods-holding roll; a roll adjacent the holding-roll and for supporting a roll of goods; a goods roll at one side of such adjacent roll; a pivotally-mounted tension device provided with a plurality of parallel rods; and a pair of feed rolls; all said rolls and rods being located transversely of the direction of the feed of the goods; intermediate the feed rolls and said other rolls, a plurality of cutting-and-sewing machines mounted and movable transversely to the direction of the feed of the goods; and intermediate the cutting-and-sewing machines and said tensioning device and parallel therewith a member carrying guide rollers and graduated to represent different widths of material; indicator devices; and adjustable guides.

53. The combination of a goods-holding roll; a roll adjacent the holding-roll and for supporting a roll of goods; a goods roll at one side of such adjacent roll; a pivotally-mounted tension device provided with a plurality of parallel rods; and a pair of feed rolls; all said rolls and rods being located transversely of the direction of the feed of the goods; intermediate the feed rolls and said other rolls, a sewing machine; and intermediate the sewing machine and said tensioning device a member graduated to represent different widths of material; indicator devices; and adjustable guides.

54. The combination of a variable speed tensioning mechanism; a pair of variable speed feed rolls; intermediate the feed rolls and the tensioning mechanism, a sewing machine movable transversely to the direction of the feed of the goods; and intermediate the sewing machine and the tensioning mechanism, a plate forming a table.

55. The combination of a variable speed tensioning mechanism; a pair of variable speed feed rolls; intermediate the feed rolls and the tensioning mechanism, a sewing machine movable transversely to the direction of the path of the feed of the goods; and means for positioning and guiding goods varying in width.

56. The combination of a tensioning mechanism; a pair of feed rolls; intermediate the feed rolls and tensioning mechanism, a traveling cutting-and-sewing machine; guides to coact with a spreader; and the spreader.

57. The combination of a tensioning mechanism; a pair of feed rolls; intermediate the feed rolls and tensioning mechanism, a traveling cutting-and-sewing machine; guides to coact with a spreader; and the spreader, the spreader having projections coöperating with slitting knives; and the slitting knives.

58. The combination of a tensioning mechanism; a pair of feed rolls; intermediate the tensioning mechanism and the feed rolls, a pair of graduated plates; and guiding devices carried by each plate.

59. The combination of a tensioning mechanism; a pair of feed rolls; intermediate the tensioning mechanism and the feed rolls, a pair of graduated plates; and guiding devices carried by each plate; and an anti-friction roller for partially supporting the weight of the goods as they are fed.

60. The combination of a tensioning mechanism; a pair of feed rolls; intermediate the feed rolls and the tensioning mechanism a traveling sewing-machine; and between the tensioning mechanism and the sewing-machine an anti-friction roll for partially supporting the weight of the goods as they are fed.

61. The combination of a tensioning mechanism, a pair of feed rolls; intermediate the feed rolls and the tensioning mechanism, a pair of cutting-and-sewing machines movable from and toward each other; a pattern cam operatively connected with each cutting-and-sewing machine to effect the movements of each machine; and intermediate the cutting-and-sewing machines, graduated plates and devices for positioning and for guiding the goods as they are fed.

62. The combination of a removable, expansible spreader with a cutting-and-sewing machine, a tensioning mechanism; a feeding mechanism operable across the width of the goods; and means for positioning and holding the spreader in working position intermediate the tensioning mechanism and the cutting-and-sewing machine.

63. The combination of a pair of feed rolls; a tensioning mechanism; a cutting-and-sewing-machine track parallel with the feed rolls; a tensioning mechanism located transversely of the direction of the feed of the goods; a pair of sewing machines slidably mounted on the track; a pattern cam operatively connected with each sewing machine, each having a hanger, and each carrying an upper and an under band-cutter wheel; and a band cutter on each pair of wheels, the cutting and sewing instrumentalities operating intermediate the feed rolls and the tensioning mechanism.

64. The combination of a tensioning mechanism and a feeding mechanism each located across the path of the goods fed by the feeding mechanism and transversely to the direction of the feed of the goods; intermediate the tensioning and feeding mechanism, a cutting-and-sewing machine; adjacent the delivery side of the feeding mechanism, a goods-clamping mechanism; rearwardly of the goods-clamping mechanism, a length-cutting mechanism, and rearwardly of the length-cutting mechanism a mechanism which tautens the advanced end portion of the goods across the width thereof while they are clamped and before and during the severing action of the length-cutting mechanism.

65. The combination of a tensioning mechanism; a feeding mechanism; intermediate the tensioning mechanism and the feeding mechanism, a sewing machine; rearwardly of the feeding mechanism, another sewing machine; and rearwardly of such other sewing machine, a mechanism which tautens the goods between the feed rolls and itself for the operation of said other sewing machine.

66. The combination of a tensioning mechanism; a feeding mechanism; intermediate the tensioning mechanism and the feeding mechanism, a sewing machine; rearwardly of the feeding mechanism, another sewing machine; and rearwardly of such other sewing machine, a mechanism which tautens the goods between the feed rolls and itself for the operation of said other sewing machine; each of said sewing machines being equipped with cutting devices, and the first-mentioned sewing machine cutting and sewing in the direction of the length of the feed of the goods and said other sewing machine cutting and sewing transversely thereof.

67. A tensioning mechanism, a goods-feeding mechanism, and a cutting-and-sewing machine in combination with a goods-clamping mechanism operative on a cut and sewn advancing portion of the goods; a controlling mechanism adjacent the clamping mechanism and for directing the cut and sewn portion of the goods to length-cutting and tensioning mechanisms; and such length-cutting and tensioning mechanisms; said mechanism for tensioning the cut and sewn portion of the goods being operative while the goods are clamped, and the length-cutting mechanism being operative to cut the cut and sewn portion of the goods while they are under tension between the clamping and tensioning mechanism.

68. A tensioning mechanism, a goods-feeding mechanism, and a plurality of movable sewing machines operative to sew in the general direction of the length of the feed of goods, in combination with a clamping mechanism operative on a portion of the goods after they are sewn; and a mechanism operative to tension the sewn portion of the goods while the clamping mechanism is in clamping position; the goods feeding mechanism being common to the sewing machines.

69. A tensioning mechanism, a goods-feeding mechanism, and a plurality of movable sewing machines operative to sew in the general direction of the length of the feed of the goods, in combination with a clamping mechanism operative on a portion of the goods after they are sewn; a mechanism operative to tension the sewn portion of the goods while the clamping mechanism is in clamping position; and a cutting-and-sewing machine operative transversely of the tensioned sewn portion of the goods; the goods feeding mechanism being common to the sewing machines.

70. A tensioning mechanism, a goods-feed-mechanism, and a sewing machine operative to sew in the general direction of the length of the feed of the goods, in combination with a clamping mechanism operative on a portion of the goods after they are sewn; a mechanism operative to tension the sewn portion of the goods while the clamping mechanism is in clamping position; intermediate the clamping mechanism and the last-mentioned tensioning mechanism, a length-cutting mechanism operative to cut the sewn portion of the goods transversely while under tension; means for moving the last-mentioned tensioning mechanism away from the transverse cutting mechanism; the last-mentioned tensioning mechanism being constructed to grip the sewn portion of the goods for tensioning and releasing it during severence, and subsequently to release it; and means for accelerating such releasing movement for the purpose of straightening out the gripped end of the severed portion.

71. The combination of tensioning devices, feed rolls, and an intermediate traveling machine head; a goods-clamping mechanism rearwardly of the head; a length-severing mechanism; and means for actuating and driving the aforesaid mechanisms; the head being provided with stitch-forming instrumentalities and an electric motor carried by the head and operatively connected with the stitch-forming instrumentalities to actuate them independently of said actuating and driving means; and means for stopping the stitch-forming instrumentalities on breakage of the thread.

72. The combination of a sewing machine, a track support therefor, means for moving the sewing machine on the track while the sewing machine is in operation; means for stopping and starting the sewing-machine stitching operation automatically; at one side of the sewing machine, a tensioning mechanism, and at its other side a feeding mechanism, the tensioning and feeding mechanisms being located and operative transversely to the direction of the feed of the goods, and operative on the goods across their width.

73. The combination of a traveling sewing machine with a master cam operatively connected with the sewing machine to effect travel thereof while it is sewing; such connection comprising means for varying the travel of the sewing machine within greater and lesser limits and other means for obtaining fine adjustments of such connections.

74. The combination of tensioning and feeding mechanisms with an intermediate traveling sewing-machine, and a master cam roll operatively connected with the sewing machine to effect its travel; the master cam roll being journaled at its opposite ends on endwise-movable bearings; and horizontal tracks below the cam for supporting the cam during removal and placement of the cam, and such endwise movable bearings.

75. The combination of tensioning and feeding mechanisms with an intermediate traveling sewing-machine, a master cam roll and operative connections between the cam roll and the sewing machine to effect its travel, the cam roll being mounted near one end on a journal-forming member provided with a driving gear detachably connected with the cam roll, and means operatively connected with said gear for rotating the cam roll, and such journal-forming member and driving gear.

76. The combination of a master cam roll; means for rotating it; a traveling sewing-machine; operative connections between the sewing machine and the cam roll to effect the travel of the sewing machine; means for actuating the stitch-forming instrumentalities of the sewing machine including its drive shaft; a stop-motion for the drive-shaft; and operative connections between the drive-shaft and the master cam roll for throwing the stop-motion into and out of action.

77. The combination with a plurality of traveling sewing-machines, a master cam roll and operative connections between the cam roll and each sewing-machine to effect its travel; of means for actuating the stitching instrumentalities of each sewing machine including its drive-shaft; a stop motion for each drive-shaft; each stop-motion having a sliding connection with a jointed stop-motion actuating-frame; and operative connections between a frame section and a radially-operating cam carried by the master cam for mechanical actuation of each stop motion; and such frame.

78. The combination with a plurality of traveling sewing-machines, a master cam roll and operative connections between the cam roll and each sewing-machine to effect its travel; of means for actuating the stitching instrumentalities of each sewing machine including its drive-shaft; a stop motion for each drive-shaft; each stop-motion having a sliding connection with a jointed stop-motion actuating-frame; operative connections between a frame section and a radially-operating cam carried by the master cam for mechanical actuation of each stop motion; said actuating frame comprising a shaft operatively connected with a clutch actuator; the main shaft of the machine; and a clutch on said main shaft; said shaft forming a part of the actuating frame being operable by manual actuation of the frame.

79. The combination of a pair of traveling sewing machines, a track therefor, means for moving them on the track during their sewing operation, each sewing machine comprising a drive shaft operatively connected to the needle bar of its stitch-forming instrumentalities, a stop motion for and acting directly on each drive shaft, each stop motion being carried by the framework of the sewing mechanism and each stop motion having a trolley member, a jointed framework upon which the trolley members ride during the travel of the sewing machines, a main shaft for the machine, mechanism operatively connecting the main shaft with the sewing machines for effecting their travel during their stitch-forming movements, a manually operable clutch mechanism, and means for actuating said stop motions automatically.

80. The combination of a pair of traveling sewing machines, a track therefor, means for moving them on the track during their sewing operations, each sewing machine comprising a drive shaft operatively connected to the needle bar of its stitch-forming instrumentalities, a stop motion for and acting directly on each drive shaft, each stop motion being carried by the framework of the sewing mechanism and each stop motion having a trolley member, a jointed framework upon which the trolley members ride during the travel of the sewing machines, a main shaft for the machine, mechanism operatively connecting the main shaft with the sewing machines for effecting their travel during their stitch-forming movements, a manually operable clutch mechanism, means for actuating said stop motions automatically; and adjusting means to regulate the drive shaft stopping action of the stop motions.

81. The combination of a tensioning mechanism, a feeding mechanism and intermediate such mechanism a traveling cutting-and-sewing machine; a clamping mechanism for a sewn portion of the goods; a mechanism for tensioning the sewn portion of the goods; a length-severing mechanism operative on the sewn portion of the goods; a master cam operatively connected with the cutting-and-sewing machine to effect the travel of the cutting-and-sewing machine; means for actuating the stitch-forming instrumentalities of the sewing machine; means under the control of the operator for starting and stopping the entire machine; other means to start and stop the stitch-forming instrumentalities; other means to stop the stitch-forming instrumentalities on breakage of the thread; and other means to start and stop the sewing machine when a predetermined portion of the goods has been stitched.

82. The combination of goods-tensioning rolls; a pair of feed rolls; intermediate the goods tensioning rolls and the feed rolls a pair of traveling cutting-and-sewing machines, each comprising a drive-shaft, movable from and toward each other and operable to cut and sew in the general direction of the feed of the goods; of means for driving said rolls and means for effecting the travel of the cutting-and-sewing machines at a speed that is low relatively to the speed of the drive-shafts; and means for rotating the drive-shafts at high speed during the operation of the rolls and the travel of the cutting-and-sewing machines.

83. The combination of a traveling sewing machine comprising a drive shaft; a track for the sewing machine; means for effecting the travel of the sewing machine during its stitch-forming operation, such means comprising a main shaft and clutch mechanism therefor; mechanism for actuating the clutch mechanism; and electrically-controlled devices for actuation of a thread-engaging lever to set the clutch-actuating mechanism in action when the lever is freed from operative engagement with the thread in consequence of the breaking or slacking thereof; thread-supplying and guiding devices for the thread; a stop motion for the drive-shaft; and the thread-engaging lever.

84. The combination of a pair of traveling sewing-machines each having its own drive-shaft with mechanism to effect, the travel of the machine, such mechanism comprising a main shaft; mechanism for rotating the drive-shafts; a stop-motion for each drive-shaft; a clutch mechanism for the main shaft; connections between the clutch-mechanism and the stop motions; an electrically-actuated thread-engaging lever; and electrical devices for affecting engagement and disengagement of the clutch members of the main shaft and thereby actuating the connections between the clutch mechanism and the stop motions, whenever the thread-engaging lever is out of control by the thread which it engages.

85. The combination of a traveling sewing-machine comprising a drive shaft; a track for the sewing machine; means for effecting the travel of the sewing machine during its stitch-forming operation, such means comprising a main shaft and clutch mechanism therefor; mechanism for actuating the clutch mechanism; and electrically-controlled devices for actuation of a thread-engaging lever to set aside the clutch-actuating mechanism in action when the lever is freed from operative engagement with the thread in consequence of the breaking or slacking thereof; thread-supplying and guiding devices for the thread; a stop motion for the drive-shaft; the thread-engaging lever; and an electric signal energized through connection with said electrical devices during the disengagement of the thread-engaging lever by the thread.

86. The combination of a stitch-forming machine, means for moving it on a straight track; said track; a pair of feed rollers parallel with the track; and a change-speed gear mechanism operatively connected with the feed rolls.

87. The combination of a stitch-forming mechanism; means for moving it; a feeding mechanism; a change-speed gear mechanism operatively connected with the feeding mechanism; and a length-cutting mechanism operatively connected with the change-speed gear mechanism.

88. The combination of stitch-forming and goods-feeding mechanisms with a length-cutting mechanism; mechanism comprising a master cam for moving the stitch-forming mechanism during its sewing operation; the master cam, having a calibrated scale; and mechanism for actuating the length-cutting mechanism, such actuating mechanism comprising a gear having a pointer and comprising a notched trip-ring and members to engage with the notches.

89. The combination of a traveling stitch-forming mechanism; a feeding mechanism; a length-cutting mechanism; and means for timing the cutting operation of the length-cutting mechanism and a pattern cam-controlled mechanism for determining the contour of the seam formed by the stitches.

90. The combination of a traveling stitch-forming mechanism; a feeding mechanism; a length-cutting mechanism; means for timing the cutting operation of the length-cutting mechanism; a goods-clamping mechanism operative during the cutting action of the length-cutting mechanism; and means for timing the clamping action of the clamping mechanism and a pattern cam-controlled mechanism for determining the contour of the seam formed by the stitches.

91. The combination of a traveling stitch-forming machine; a feeding mechanism; a length-cutting mechanism; a goods-clamping mechanism operative during the cutting action of the length-cutting mechanism; a reciprocating goods gripping, tensioning and releasing mechanism; and mechanism for actuating said other mechanism synchronously during the sewing operation of the stitch-forming machine and a pattern cam-controlled mechanism for determining the contour of the seam formed by the stitches.

92. The combination of a stitch-forming machine; a feeding mechanism; a length-cutting mechanism; a goods-clamping mechanism operative during the cutting action of the length-cutting mechanism; a reciprocating goods gripping, tensioning and releasing mechanism; mechanism for actuating said other mechanisms synchronously during the sewing operation of the stitch-forming machine; and mechanism for moving the stitch-forming machine in a predetermined path during its operation.

93. The combination of a stitch-forming machine; a feeding mechanism; a length-cutting mechanism; a goods-clamping mechanism operative during the cutting action of the length-cutting mechanism; a reciprocating goods gripping, tensioning, carrying and releasing mechanism; mechanism for actuating said other mechanism synchronously during the sewing operation of the stitch-forming machine; mechanism for moving the stitch-forming machine in a predetermined path during its sewing operation; and other means for actuating the stitch-forming machine to sew.

94. The combination with a traveling sewing machine, of a pair of feed rolls; a length-cutting mechanism; an auxiliary feeding mechanism; and means for moving its feeding members out of and into the path of the goods.

95. The combination of a traveling sewing machine with a main feeding mechanism; an auxiliary feeding mechanism; a length-cutting mechanism; and means for actuating the auxiliary feeder as the length-cutting mechanism becomes ineffective to cut and a pattern cam-controlled mechanism for determining the contour of the seam formed by the sewing machine.

96. The combination of a sewing machine with a pair of main feed rolls; on the delivery side of the feed rolls and at one side of the path of the fed goods, a work plate, a length-cutting member adjacent thereto, and a series of rockable fingers; and a rockable rake having tines which during their initial rearward movement engage and lift the fingers and during the remainder of their movement come into the path of the fed goods; and, on the delivery side of the feed rolls at the other side of the path of the fed goods, an auxiliary feeding mechanism adjacent to the feed rolls, and having members which alternately push downwardly and rearwardly for lifting and feeding the fed goods; a goods-clamping member, a length-cutting member and a grid; and rearwardly of all said mechanisms, a mechanism for gripping, tensioning, carrying and releasing the product; all of said mechanisms except the sewing machine being effectively operative transversely to the direction of the feed of the goods, and the devices on opposite sides of the path of the fed goods operating to control the advancing end of the goods and to deliver such end to said product-gripping mechanism.

97. The combination of a traveling sewing machine; a pair of feed rolls parallel to the path of the travel of the sewing machine; a bar parallel to the feed rolls; a transverse shaft parallel to the bar; an adjustable knife mounted on the bar and projecting into the path of the fed goods; and cutter-actuating connections between it and the shaft.

98. The combination of a traveling sewing-machine; a pair of feed rolls parallel to the path of the travel of the sewing machine; a bar parallel to the feed rolls; a transverse shaft parallel to the bar; an adjustable knife mounted on the bar and projecting into the path of the fed goods; cutter-actuating connections between it and the shaft; a master cam operatively connected with the sewing machine to effect its travel; and operating connections between said shaft and master cam.

99. The combination of a traveling sewing-machine; a pair of feed rolls parallel to the path of the travel of the sewing machine; a bar parallel to the feed rolls; a transverse shaft parallel to the bar; an adjustable knife mounted on the bar and projecting into the path of the fed goods; cutter-actuating connections between it and the shaft; a master cam operatively connected with the sewing machine to effect its travel; operating connections between said shaft and master cam; the point of the knife being hooked; and a work-spreader having a side opening with which the point of the knife registers.

100. The combination of a sewing machine operative to sew in the direction of the feed of the goods; a feeding mechanism and a tensioning mechanism for the fed end of the goods, each being operable across the width of the goods; a traveling sewing-machine movable across the width of the goods intermediate the feeding and tensioning mechanisms; and means for severing the end portion of the goods when it has been transversely stitched.

101. The combination of a sewing machine operative to sew in the direction of the feed of the goods; a feeding mechanism and a tensioning mechanism for the fed end of the goods, each being operable across the width of the goods; a traveling sewing-machine movable across the width of the goods intermediate the feeding and tensioning mechanisms; and means for severing the end portion of the goods when it has been transversely stitched; the sewing machine operative to sew in the direction of the feed of the goods being provided with hem-forming and stitching instrumentalities, and the transversely-movable sewing-machine being provided with hem-forming and stitching instrumentalities.

102. The combination of a pair of sewing machines operative to stitch in the direction of the feed of the goods; a feeding mechanism operative across the width of the goods; flap-controlling mechanism for the advancing end portion of the goods; a tensioning mechanism therefor; a transversely-movable stitching machine operative across the advanced end of the goods; and means for severing such advanced end when it has been stitched; a pair of hem-forming devices operative in the direction of the feed of the goods; and a hem-forming device operative to form a hem transversely of the path of the feed of the goods.

103. The combination of sewing and product-severing mechanisms with a mechanism for gripping, carrying and releasing the severed product and comprising means for accelerating the movement of the gripping, carrying and releasing mechanism as it releases the product to prevent the released product from folding upon itself; and a platform on which the released product is deposited.

104. The combination of sewing and product-severing mechanisms with a gripping, carrying and releasing mechanism; a winding tape mechanism for moving such carrying mechanism toward the product-severing mechanism; other winding tape mechanism for moving it away from the product-severing mechanism; and means for kicking the tape of the latter mechanism to accelerate the rearward movement of the gripping, carrying and releasing mechanism as it releases the product.

105. The combination of sewing and product-severing mechanism with a product-gripping, carrying and releasing mechanism; supporting rails for the latter mechanism; and for reciprocating it on the rails, mechanism comprising spring wound tapes.

106. The combination of a movable sewing-machine; a track therefor; a pair of feed rolls parallel with the track, one of the rolls being laterally movable from and toward the other roll; and a manually-operable weighted mechanism connected with the laterally movable roll.

107. The combination of sewing and feeding mechanisms with length-cutting members and a work-carrier having jaws, and adjusting means for effecting a movement of a jaw under the length-cutting member when very short lengths are to be cut off.

108. The combination of sewing and feeding mechanisms with a product-severing mechanism and a work-carrier having jaws with means for adjusting the angular relation of the jaws when open, to suit different kinds of material.

109. The combination of a movable cutting and sewing machine, a track therefor, a pair of feed rolls for the cutting and sewing machine and parallel to said track; a product severing mechanism parallel to said track; a reciprocating work carrier having work-seizing members parallel to said track, and means for operating the product severing mechanism when the work-carrier reaches a predetermined distance in its rearward movement from the product-severing mechanism; a goods clamping mechanism parallel with the product-severing mechanism and adjacent thereto, and the feeding mechanism, product-severing mechanism, work clamping mechanism, work-seizing members of the work carrier, all being located to engage the goods across the width thereof and transversely to the direction of the feed thereof.

110. The combination of a movable sewing-machine and a feeding mechanism therefor, with a change-speed gear mechanism operatively connected with the feeding mechanism, a goods-tensioning mechanism, and a change-speed gear mechanism operatively connected with the tensioning mechanism and a reciprocating work-carrier.

111. The combination of a movable sewing-machine and a feeding mechanism therefor, with a change-speed gear mechanism operatively connected with the feeding mechanism, a goods-tensioning mechanism, a change-speed gear mechanism operatively connected with the tensioning mechanism, and another goods-tensioning mechanism operatively connected with a change-speed gear mechanism therefor.

112. The combination of a movable cutting-and-sewing machine head; a pattern-cam mechanism for moving the machine head during its cutting-and-sewing operation; a tensioning mechanism at one side of such machine; and a pair of feed-rolls at the other side of said machine; the stitch-forming instrumentalities of the machine comprising a drive-shaft and a stop-motion for and acting directly on the drive-shaft.

113. The combination of a movable cutting-and-sewing machine; a pattern-cam mechanism for moving the cutting-and-sewing machine during its cutting and stitch-forming operations; a tensioning mechanism at one side of the cutting and sewing mechanism; a pair of feed-rolls at the other side thereof; the stitch-forming instrumentalities comprising a drive-shaft; a stop-motion therefor; means for actuating the stop-motion automatically from the pattern-cam mechanism, other means for actuating the stop-motion on the breakage or slacking of the thread, and other means for operating the stop-motion manually through a connection with another stop-motion for the main shaft of the machine; and such other stop-motion.

114. The combination of a movable sewing-machine; a pattern-cam mechanism for controlling the movements thereof; a front tensioning mechanism; a pair of feed-rolls; and a work-carrier adapted to tension the goods against resistance of the feed-rolls; and manually operable change-speed gear mechanisms operatively connected with the front tensioning mechanism, the feed-rolls and work-carrier, for varying the speed of the roll members of the front tensioning mechanism and of the feed-rolls and for varying the speed of reciprocation of the work-carrier in performing its tensioning function.

115. In a machine of the type described, the combination of a pattern-cam mechanism; a main shaft and a pair of transversely-movable cutting-and-sewing machines operatively connected with the pattern-cam mechanism, each cutting-and-sewing machine comprising a drive-shaft therefor; means for rotating the drive-shafts at a speed higher than the rotational speed of the main shaft; means under the control of the operator for starting and stopping the drive-shafts, such means comprising a stop-motion for each drive-shaft and for the main shaft to stop it simultaneously with the stopping of the drive-shaft; and other means for automatically actuating both stop-motions to stop each drive-shaft on breakage or undue slacking of the thread of either machine and for then actuating the stop-motion of the main shaft.

116. The combination with a traveling cutting-machine and mechanism for effecting travel thereof during its cutting operation, said mechanism comprising a pattern-cam; of tensioning and feeding mechanisms and change-speed gear mechanisms for the tensioning and feeding mechanisms whereby the length of goods cut, according to the contour of the pattern-cam, may be varied during the operation of the cutting mechanism; and stitch-forming mechanism.

117. The combination of a movable sewing machine; a pair of separable feed-rolls with an auxiliary feeding mechanism parallel with the feed-rolls; mechanism for separating the feed-rolls; and mechanism for lifting and holding the auxiliary feeding mechanism lifted during the separation of the feed-rolls.

118. The combination of a plurality of movable machine heads each having a drive-shaft for actuation of devices carried by it for cutting or stitching; an electric motor carried by each machine head and operatively connected with each drive-shaft for rotating it; a goods-feeding mechanism common to a plurality of the machine heads; a stop-motion for each drive-shaft; and mechanism operatively connected with the stop-motions for operating them simultaneously.

119. The combination of a track; a pair of sewing machines slidably mounted on said track; a pattern cam formed with a cam surface for each sewing machine; a device operatively connecting each sewing machine with each cam surface; a clutch for each sewing machine; and automatically operating mechanism for actuating each clutch to stop the seam-making operations of both sewing machines when either of them fails in its seam-making operation.

120. The combination of a track; a pair of sewing machines slidably mounted thereon; a pattern cam for each machine; a connecting device between each machine and its pattern cam; a stopping mechanism for each machine, comprising a member coöperating with each pattern cam, each such member operating to stop the machine with which it is connected during the operation of the pattern cams.

121. The combination of a track; a pair of cutting-and-sewing machines slidably mounted on the track; a pattern cam operatively connected with each machine; and mechanism for interrupting the sewing operation of either machine during the cutting operation of the other machine.

122. The combination of a continuously-operating goods-feeding mechanism, with a pair of movable cutting-and-sewing machines to which the feeding mechanism is common, and mechanism for intermittently arresting the sewing operations of both machines during the cutting operations thereof.

123. The combination of a raisable and lowerable frame forming a track for traveling stop-motions; a pair of stop-motions working on the track; and a pair of traveling machine-heads each having a shaft with which one of the stop-motions engages.

124. The combination of a pair of feed-rolls; a goods-clamping mechanism parallel therewith; a severing mechanism for cutting the goods transversely to the direction of the path of feed; and a goods gripping and delivering mechanism reciprocable in the direction of the path of the feed of the goods said path being at right angles to the axis of the feed rolls.

125. The combination with a feeding mechanism constructed to engage goods across their width, of a goods gripping and carrying mechanism constructed to grip the goods across their width and to reciprocate in the direction of the path of the feed of the goods, said mechanisms being constructed to move the goods in substantially a straight path; and a product-severing mechanism intermediate the feeding mechanism and the goods gripping and carrying mechanism.

126. The combination of a track; a pair of cutting-and-sewing machines slidably mounted on the track; a pattern cam operatively connected with both cutting-and-sewing machines; and mechanism for interrupting the cutting and sewing operations of either machine while the other machine is cutting and sewing, and during the movement of the machine on its track.

127. The combination of a pattern cam with a pair of traveling sewing-machines; a track for the sewing machines; a thread-supply, and thread-tensioning devices carried by each sewing machine; a pair of feed-rolls parallel with the track and common to both sewing machines; a goods-tensioning mechanism in front of the track and parallel therewith; a length-cutting mechanism parallel with and rearwardly of the track; and a goods gripping, tensioning and delivering mechanism parallel with and rearward of the length-cutting mechanism.

128. The combination of a pattern cam with a pair of traveling sewing-machines; a track for the sewing machines; a thread-supply, and thread-tensioning devices carried by each sewing machine; a pair of feed-rolls parallel with the track; a goods-tensioning mechanism in front of the track and parallel therewith; a length-cutting mechanism parallel with and rearwardly of the track; a goods gripping, tensioning and delivering mechanism parallel with and rearward of the length-cutting mechanism; and intermediate the goods gripping, tensioning and delivering mechanism and the feed-rolls, a track parallel with the feed-rolls, and a sewing machine slidably mounted on the latter track.

129. The combination of a pair of sewing machines with mechanism for moving them during their sewing operation; a goods-feeding mechanism common to both sewing machines and extending across the path of the feed of the goods; for each sewing machine, a thread-engaging lever carried by the machine; for the drive-shaft of each sewing machine a stop-motion carried by the machine and operative directly on the drive-shaft; mechanism for use in effecting simultaneous action of the stop-motions; and electrical connections for the thread-engaging levers whereby on the breaking of a thread in either machine, the mechanism for use in effecting the simultaneous action of the stop-motions is automatically operated.

130. The combination of a pair of movable cutting-and-sewing machines; a pattern-cam mechanism for moving them during their cutting and stitch-forming operations; a tensioning mechanism at one side of the cutting-and-sewing machines; a pair of feed rolls at the other side thereof and common thereto; the stitch-forming instrumentalities comprising a drive-shaft; a stop-motion for each drive-shaft and acting directly thereon; means for actuating the stop-motions automatically from the pattern-cam mechanisms; and other means for operating the stop-motions manually through a connection with another stop-motion for the main shaft of the machine; and such other stop-motion.

131. The combination of a track; a sewing machine movable on the track; an endless band-cutter operatively mounted on the sewing machine; a guide adjacent the path of the needle and parallel with the path of the needle for a run of the band-cutter; a tensioning mechanism located in front of the track and operating transversely of the feed of the goods; and rearward of the track, a goods-feeding mechanism parallel with the track; the whole operating to keep the goods while being fed smooth and taut across their width during the operation of the cutting and sewing instrumentalities, and to keep the effective run of each band-cutter steady and parallel with the path of the needle during the cutting and stitch-forming movements.

132. The combination of a pair of feed-rolls with a change-speed gear mechanism operatively connected with the feed-rolls; a front tensioning mechanism comprising rolls; mechanism operatively connecting the feed-rolls with the tensioning-mechanism rolls whereby the rotational speed of the latter is kept uniform with the rotational speed of the feed-rolls; a reciprocating work-carrier; a change-speed gear mechanism operatively connected with the work-carrier to vary the speed of its reciprocation correspondingly to variations in the speed of the aforesaid rolls; and a change-speed gear mechanism operatively connected with said two other change-speed gear mechanisms.

133. The combination of a pair of feed-rolls with a change-speed gear mechanism operatively connected with the feed-rolls; a front tensioning mechanism comprising rolls; mechanism operatively connecting the feed-rolls with the tensioning-mechanism rolls whereby the rotational speed of the latter is kept uniform with the rotational speed of the feed-rolls; a reciprocating work-carrier; a change-speed gear mechanism operatively connected with the work-carrier to vary the speed of its reciprocation correspondingly to variations in the speed of the aforesaid rolls; a change-speed gear mechanism operatively connected with said two other change-speed gear mechanisms; and a length-cutting mechanism transverse to the path of the feed.

134. The combination of sewing and cutting mechanisms a reciprocable work-carrier; a support on which the work-carrier reciprocates; actuating tapes for the work-carrier; a tape-controlling mechanism; and a feeding mechanism which delivers to the work-carrier.

135. The combination of a reciprocable work-carrier; a support on which the work-carrier reciprocates; actuating tapes for the work-carrier; a tape-controlling mechanism; a feeding mechanism which delivers to the work-carrier; and a change-speed gear mechanism connected with the tape-controlling mechanism.

136. The combination of a reciprocable work-carrier; a support on which the work-carrier reciprocates; actuating tapes for the work-carrier; a tape-controlling mechanism; a feeding mechanism which delivers to the work-carrier; a change-speed gear mechanism connected with the tape-controlling mechanism; and a length-cutting mechanism; and a device intermediate the tape-controlling mechanism and the length-cutting mechanism for intermittently connecting the tape-controlling mechanism and the length-cutting mechanism.

137. The combination of a sewing machine with band cutter supports carried by the machine; a band cutter; and adjacent the path of the needle, a vertical guide for one run of the band cutter, to maintain that run in substantial parallelism to the needle during simultaneous cutting and stitching operation.

In testimony whereof I have hereunto set my hand in the presence of two subscribing witnesses, this 27th day of May 1913.

JOHN P. WEIS.

Witnesses:
ALBERT H. WEIS,
EDWARD L. RUSSELL.